C. HOLLY.
BOX MACHINE.
APPLICATION FILED JAN. 16, 1911.
1,253,690.
Patented Jan. 15, 1918.
36 SHEETS—SHEET 6.
Fig. 11.
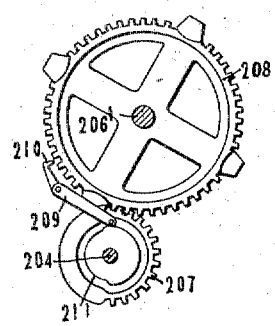
Fig. 6.
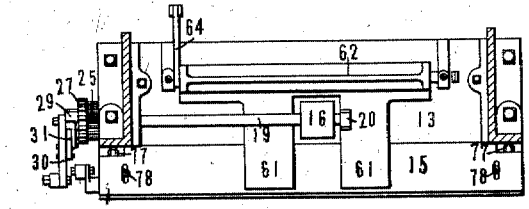
Fig. 7.
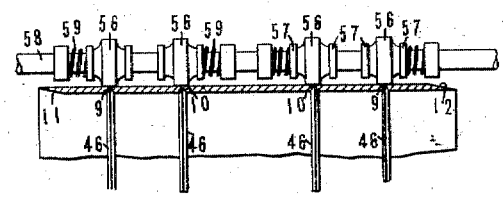
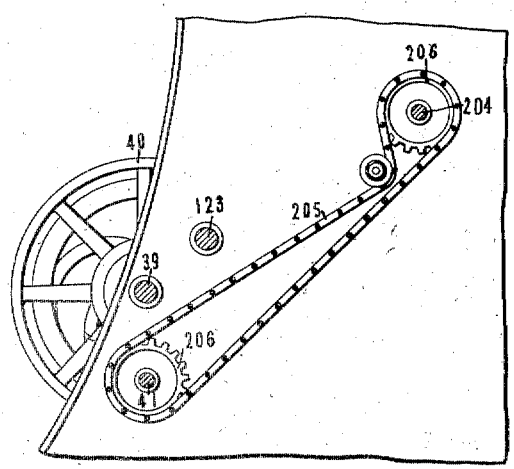
Fig. 8.
Fig. 9.
WITNESSES
Leonard Watson
INVENTOR
C. Holly
BY
Duell, Warfield & Duell
ATTORNEYS

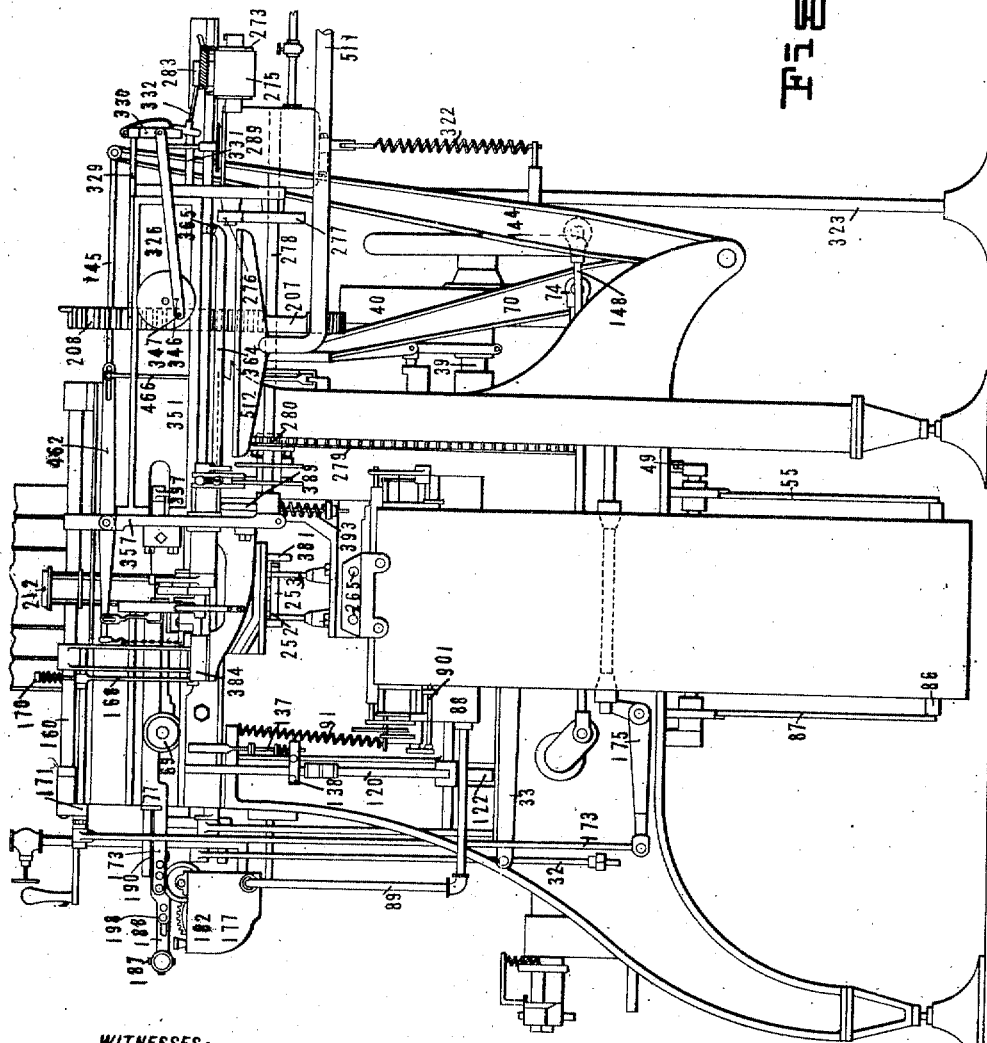

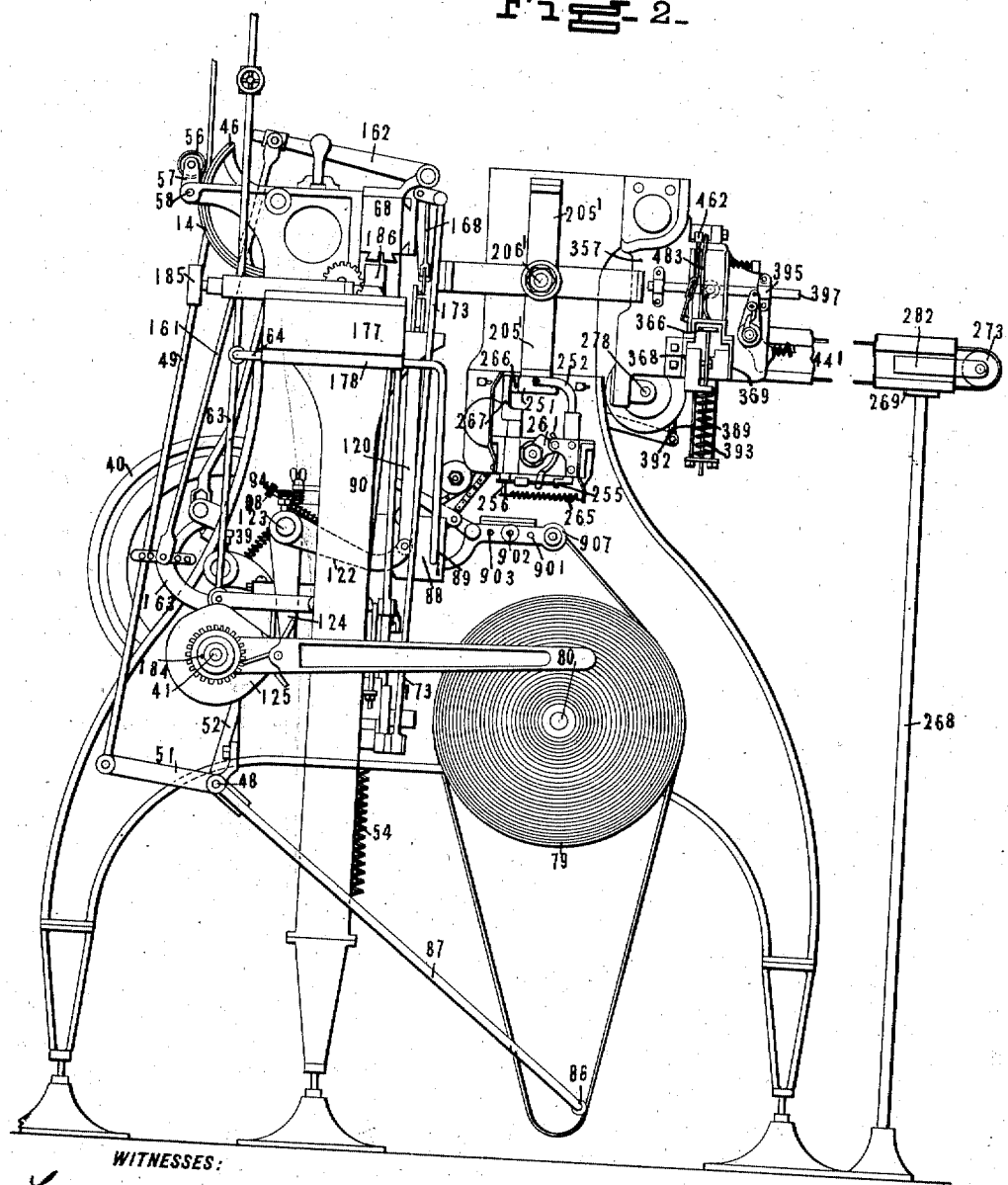

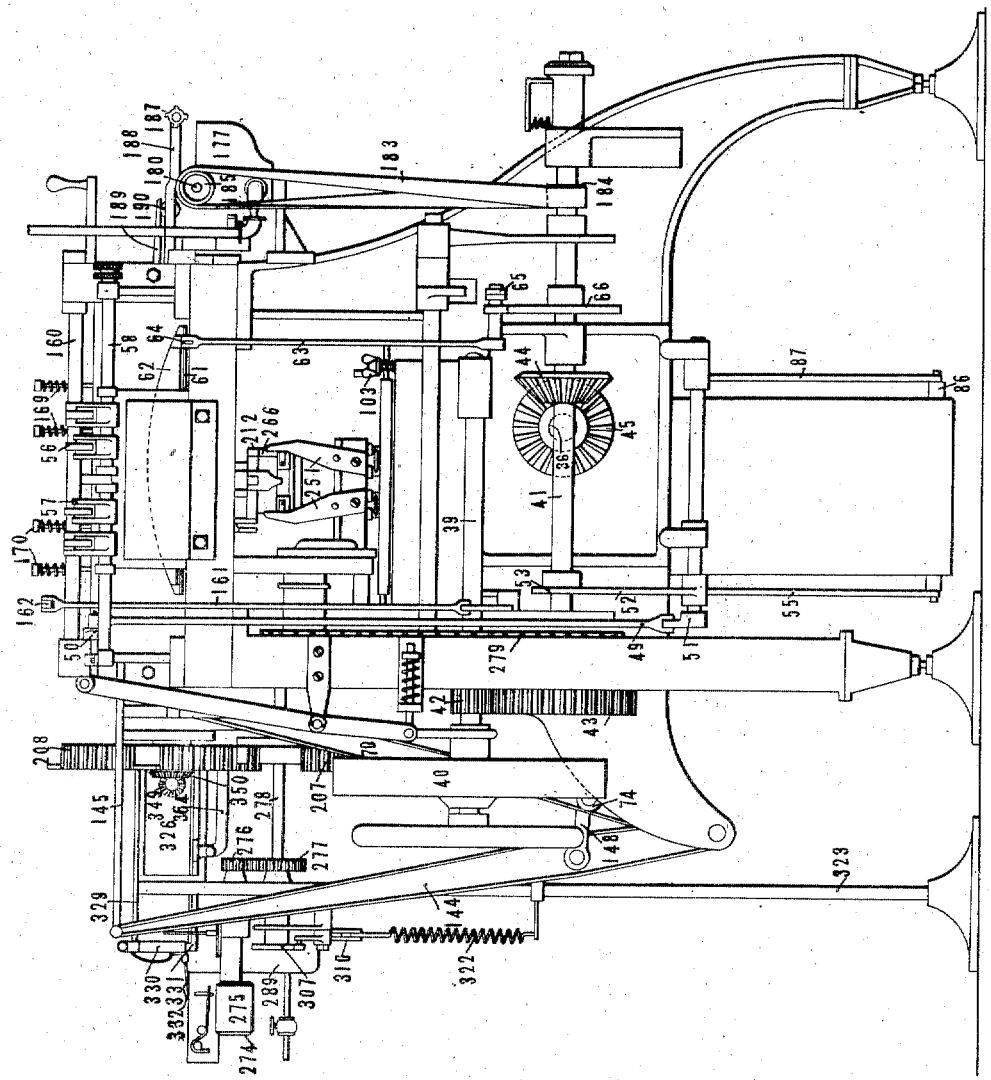

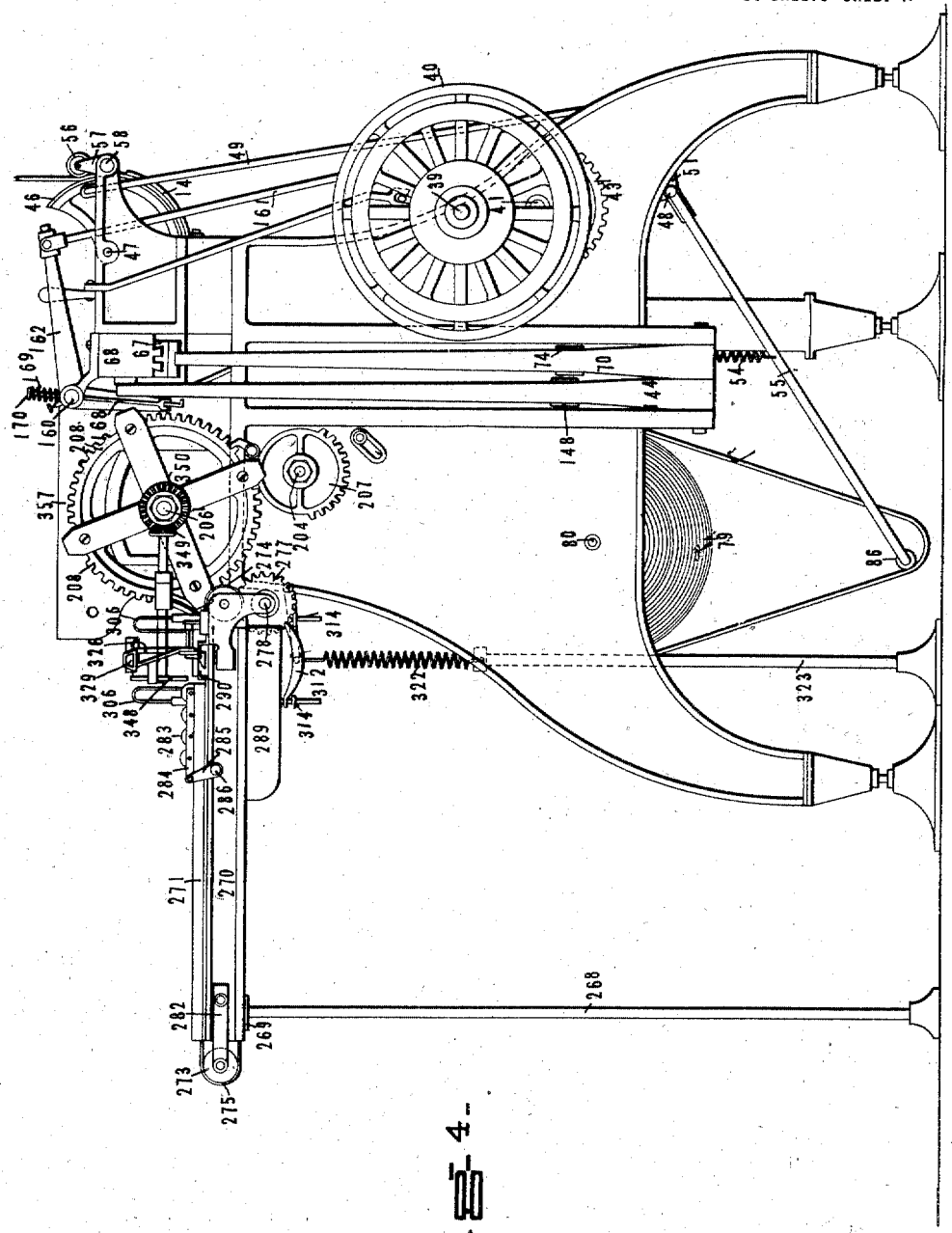

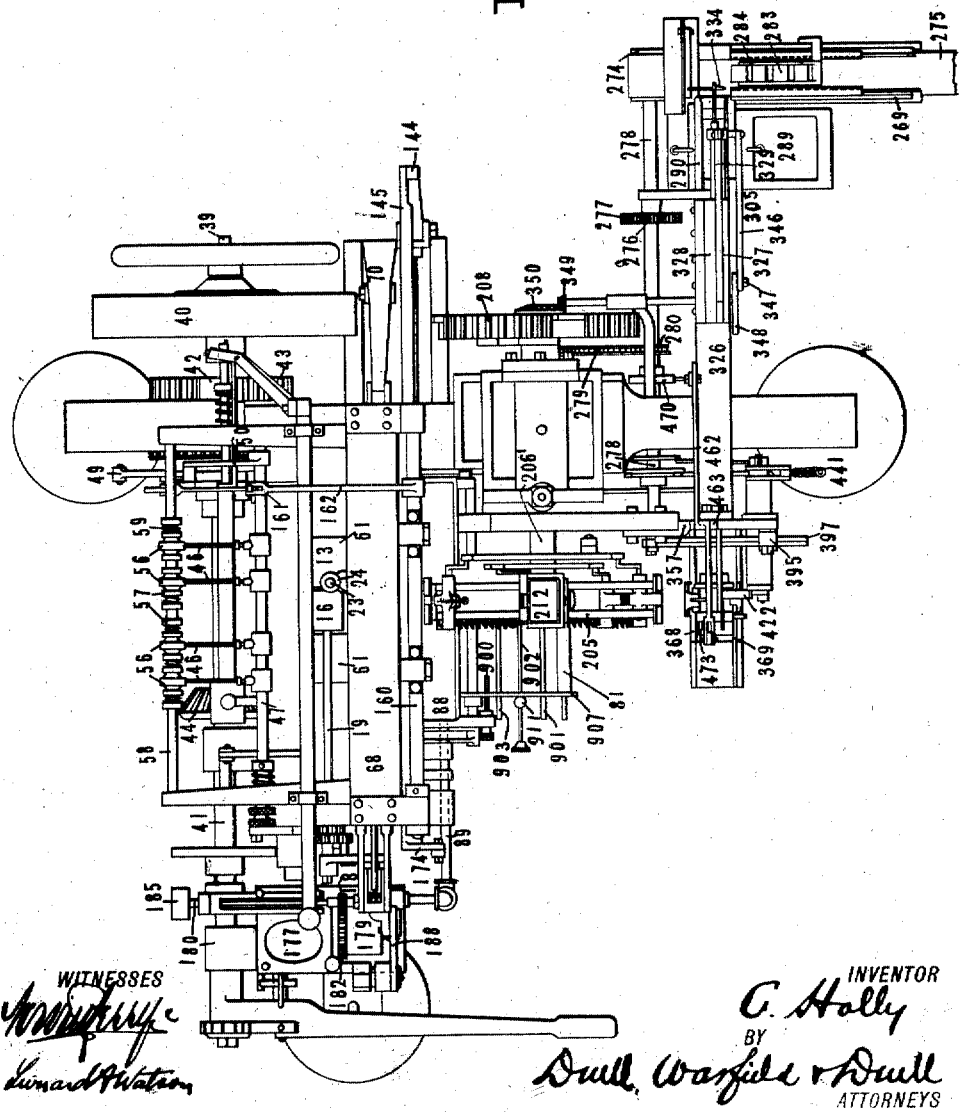

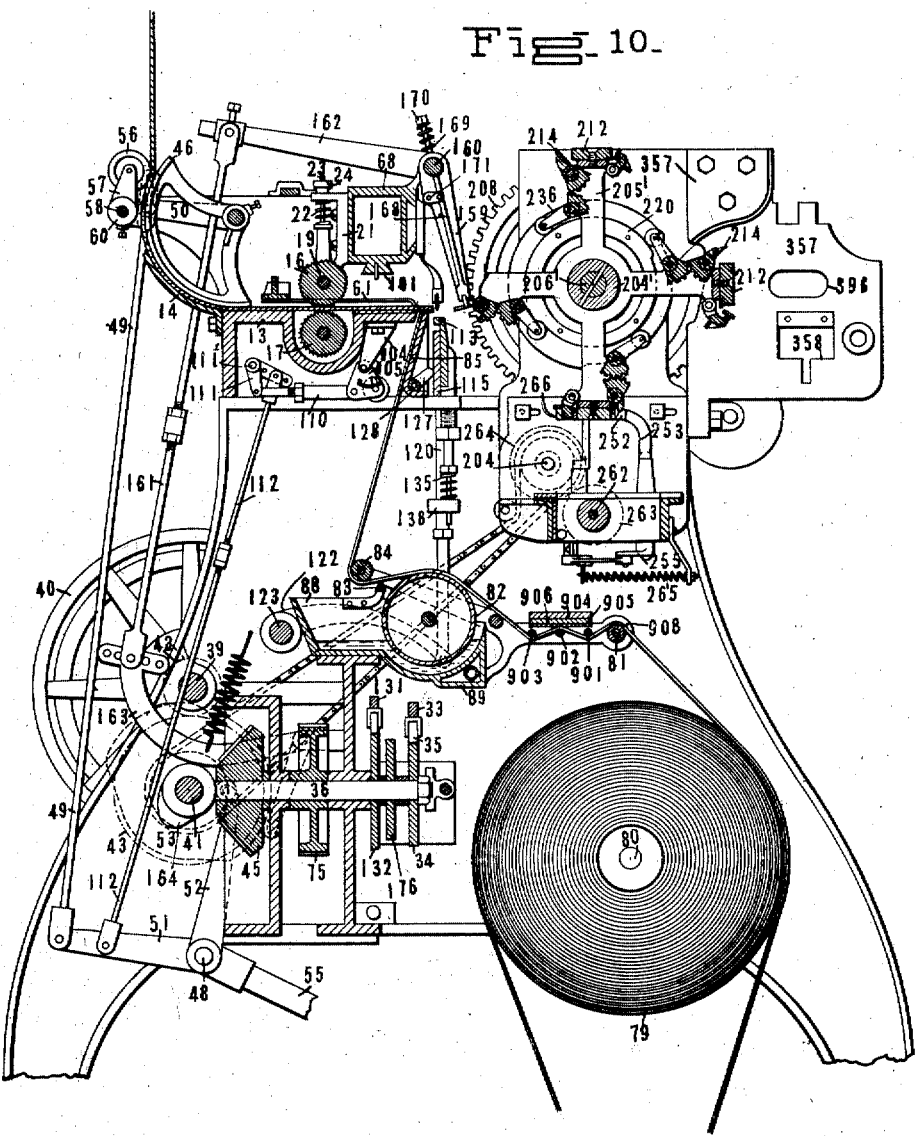

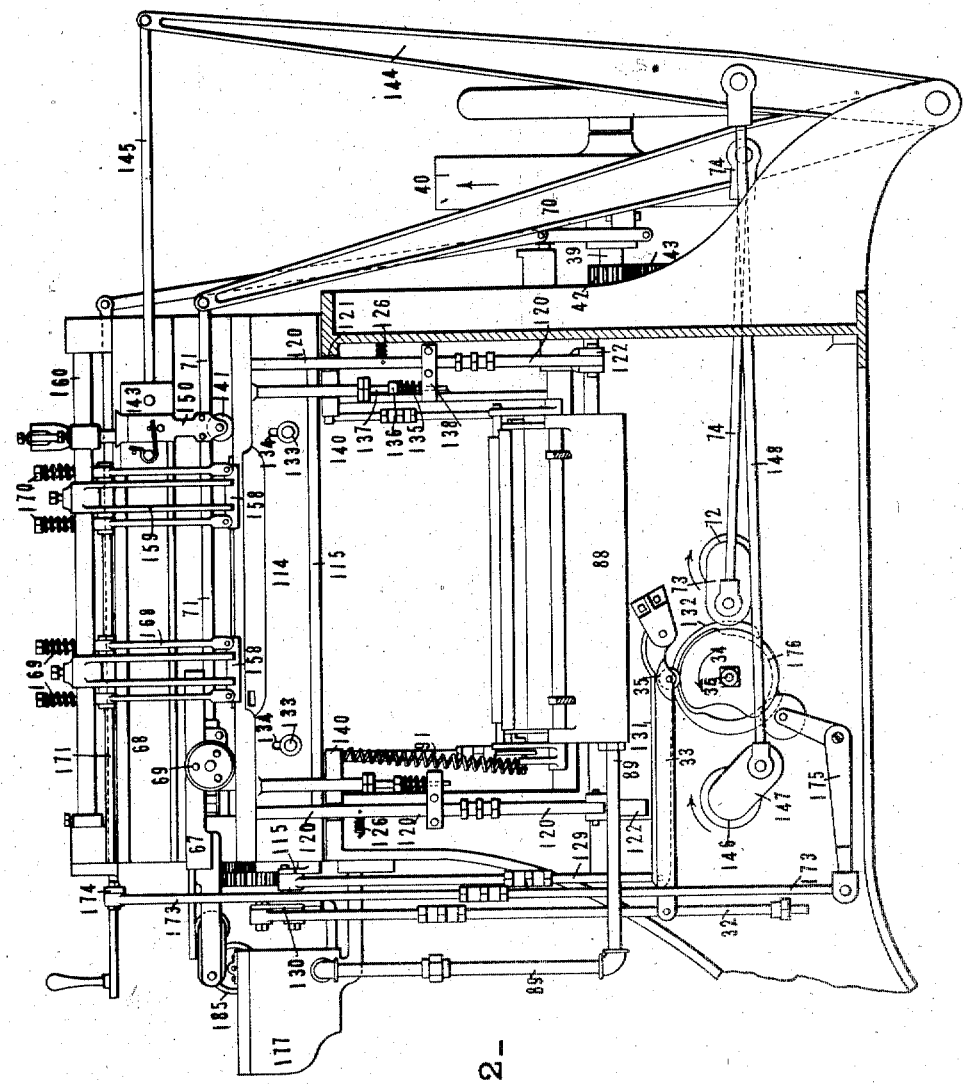

C. HOLLY.
BOX MACHINE.
APPLICATION FILED JAN. 16, 1911.

1,253,690.

Patented Jan. 15, 1918.
36 SHEETS—SHEET 9.

WITNESSES

INVENTOR
C. Holly
BY
Duell, Warfield & Duell
ATTORNEYS

C. HOLLY.
BOX MACHINE.
APPLICATION FILED JAN. 16, 1911.
1,253,690.
Patented Jan. 15, 1918.
36 SHEETS—SHEET 10.
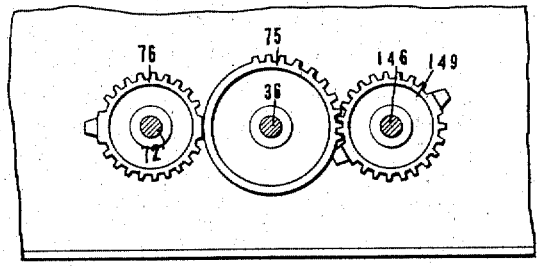
Fig. 14.
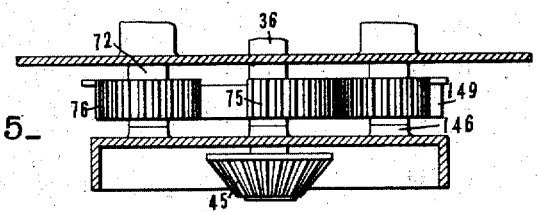
Fig. 15.
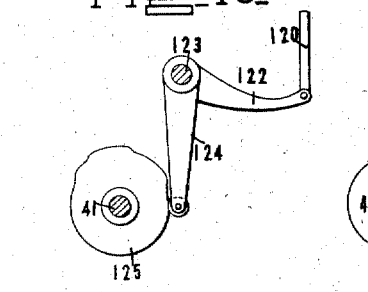
Fig. 16.
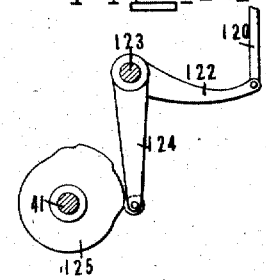
Fig. 17.
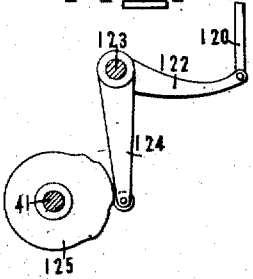
Fig. 18.
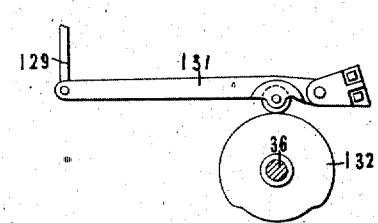
Fig. 19.
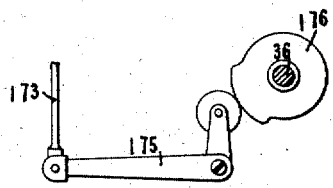
Fig. 20.
Fig. 21.
WITNESSES
INVENTOR
C. Holly
BY
Duell, Warfield & Duell
ATTORNEYS

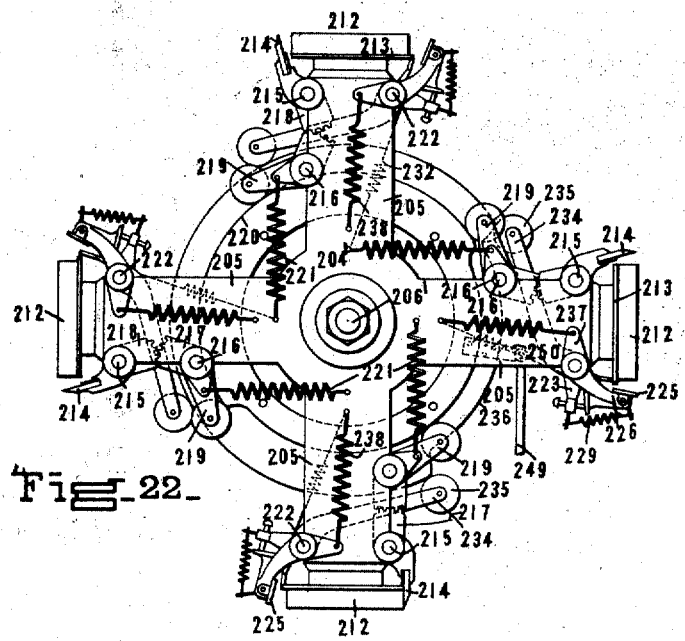

C. HOLLY.
BOX MACHINE.
APPLICATION FILED JAN. 16, 1911.
1,253,690.
Patented Jan. 15, 1918.
36 SHEETS—SHEET 12.
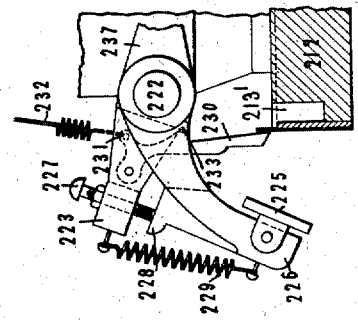
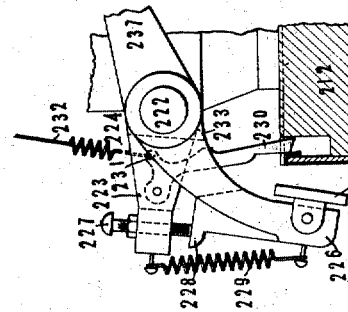
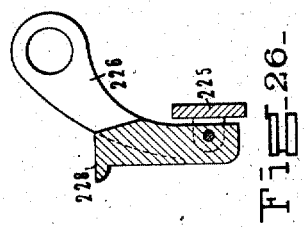
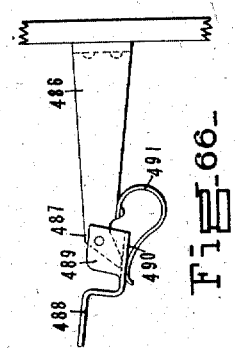
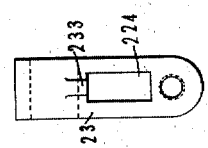
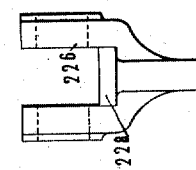
WITNESSES
INVENTOR
C. Holly
BY
Dull, Warfield & Dull
ATTORNEYS

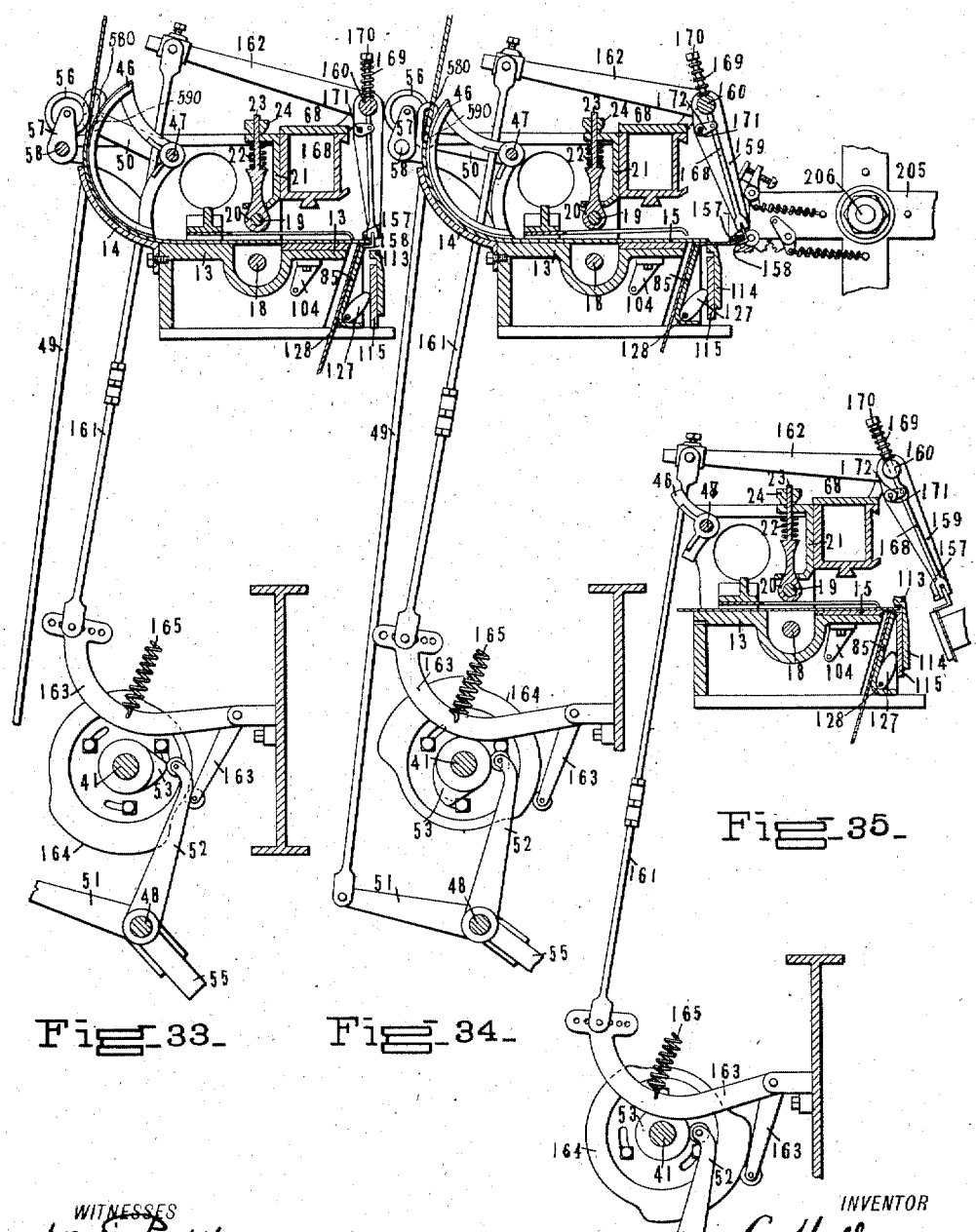

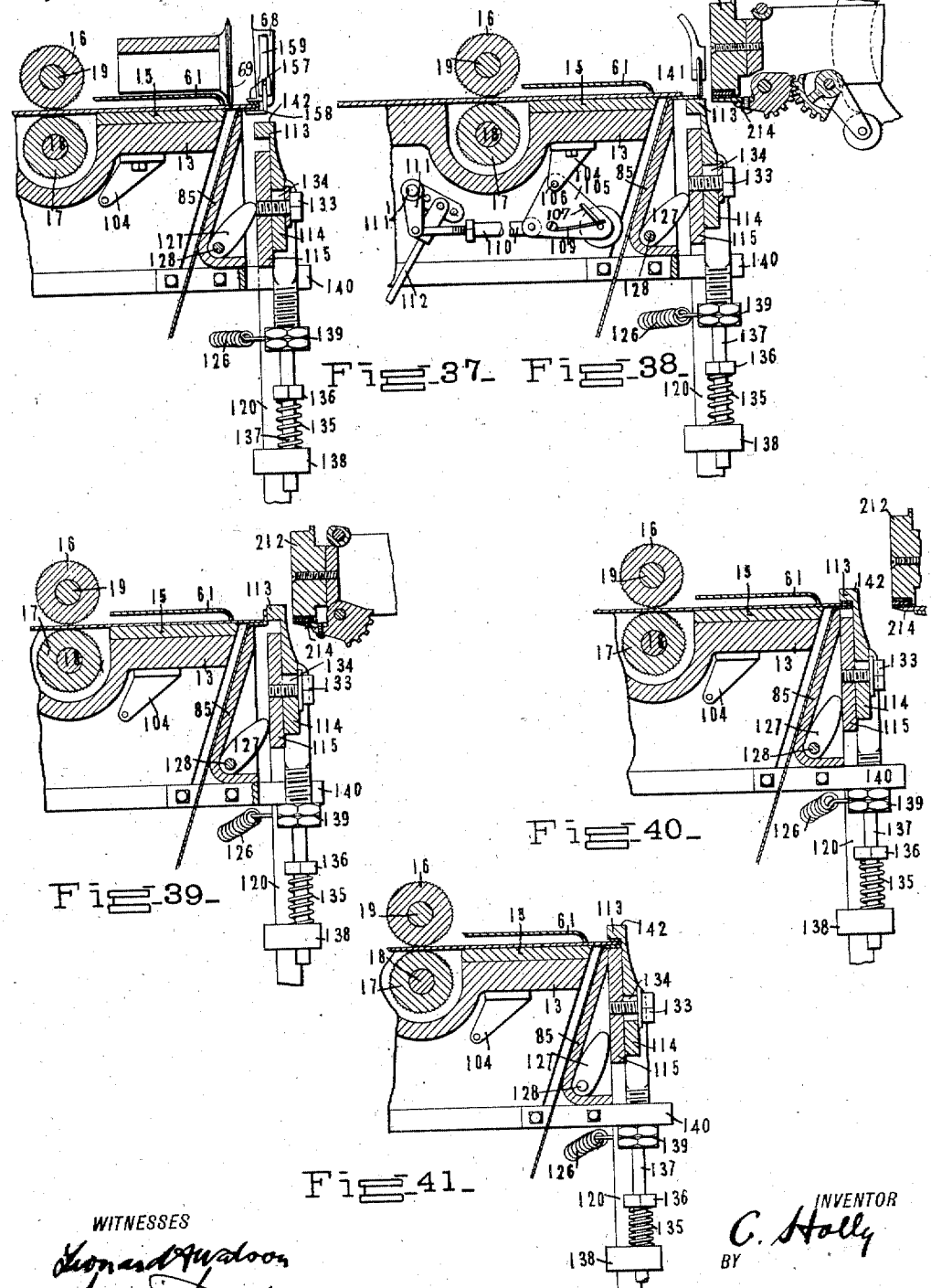

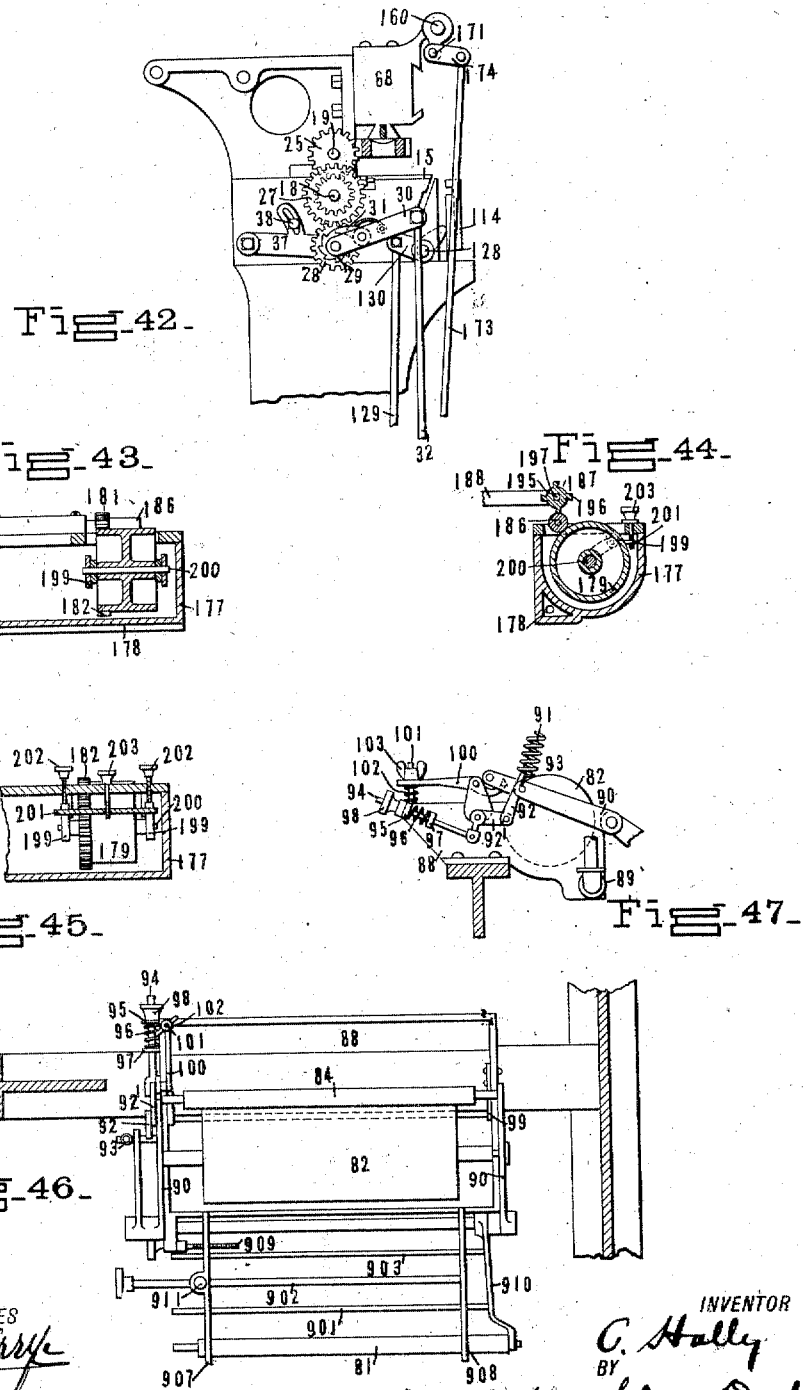

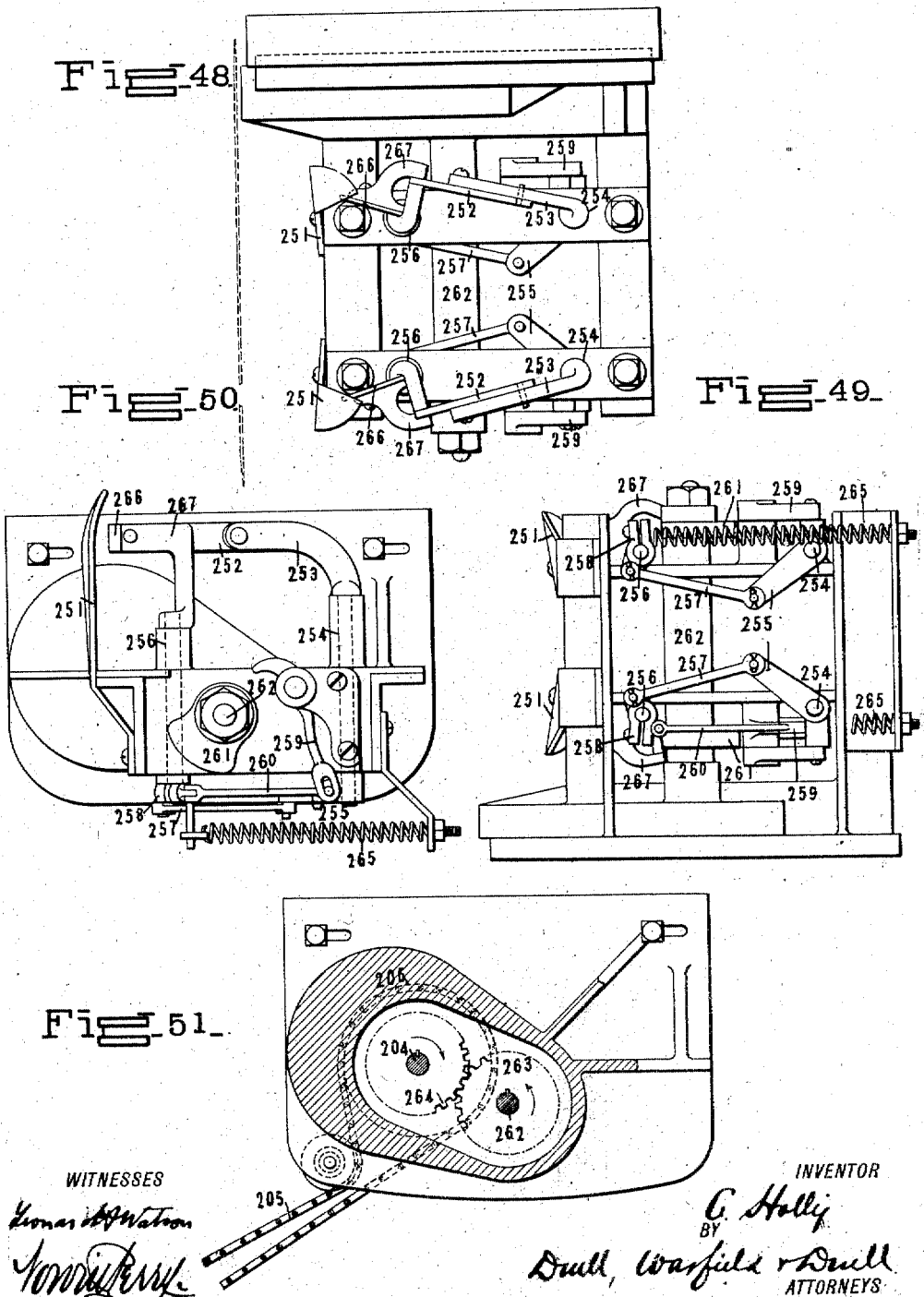

C. HOLLY.
BOX MACHINE.
APPLICATION FILED JAN. 16, 1911.
1,253,690.
Patented Jan. 15, 1918.
36 SHEETS—SHEET 17.
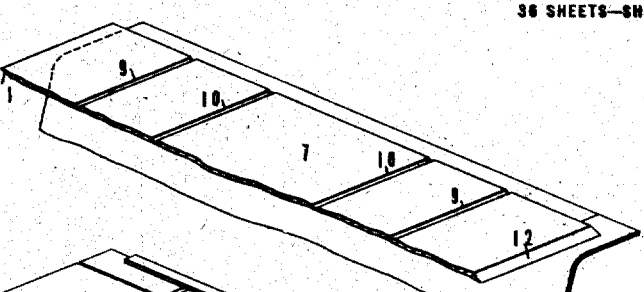
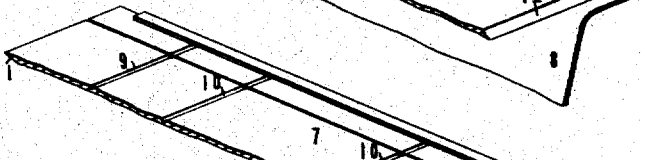
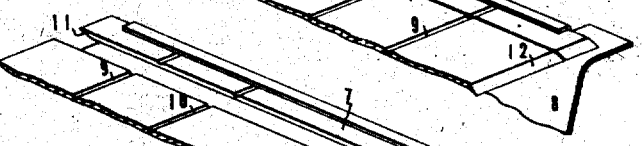
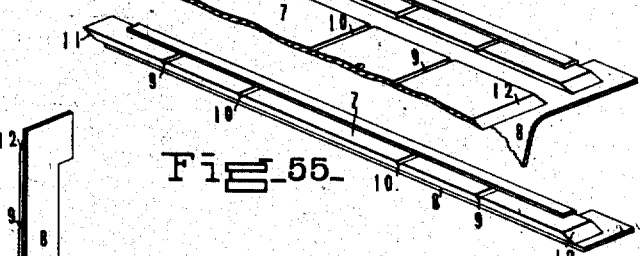
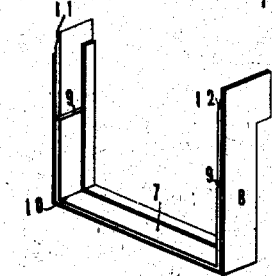
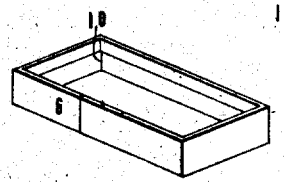
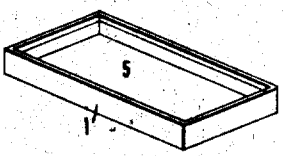
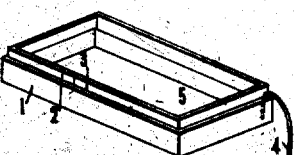
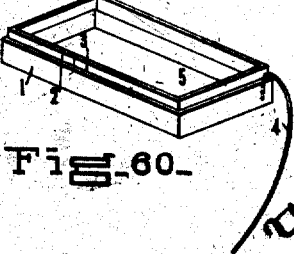

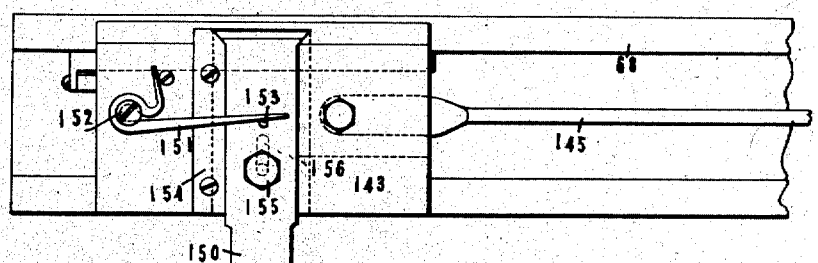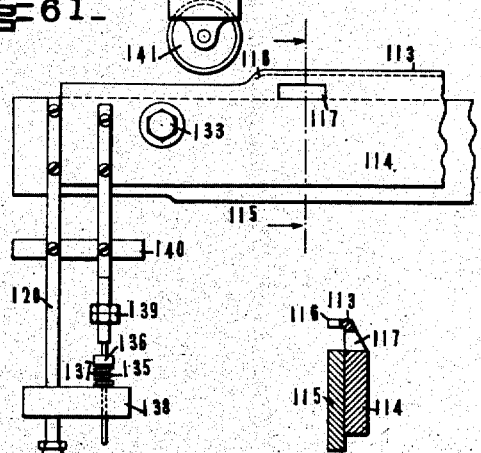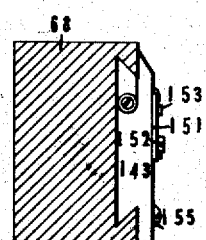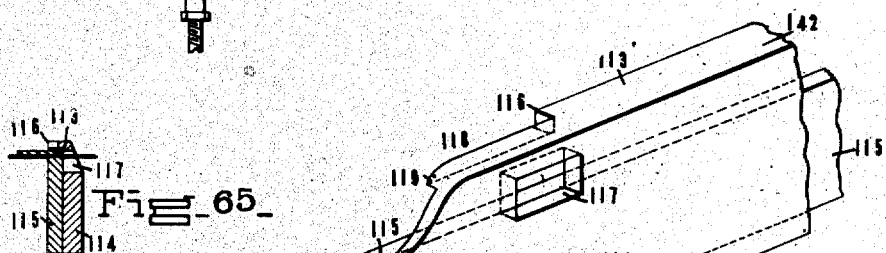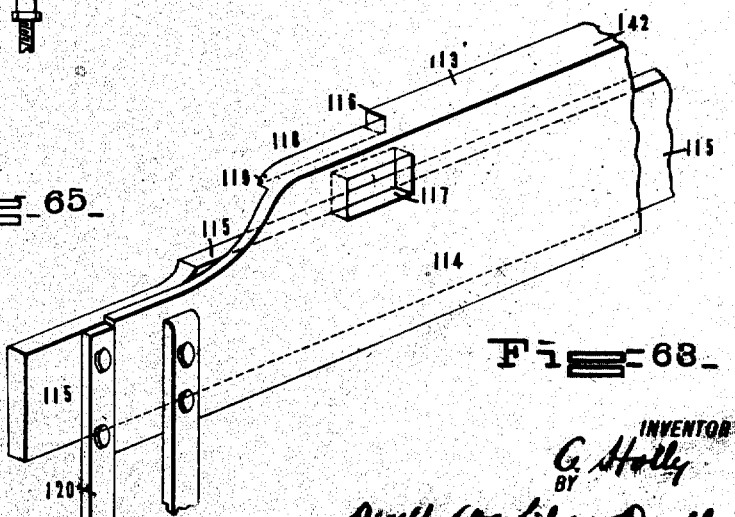

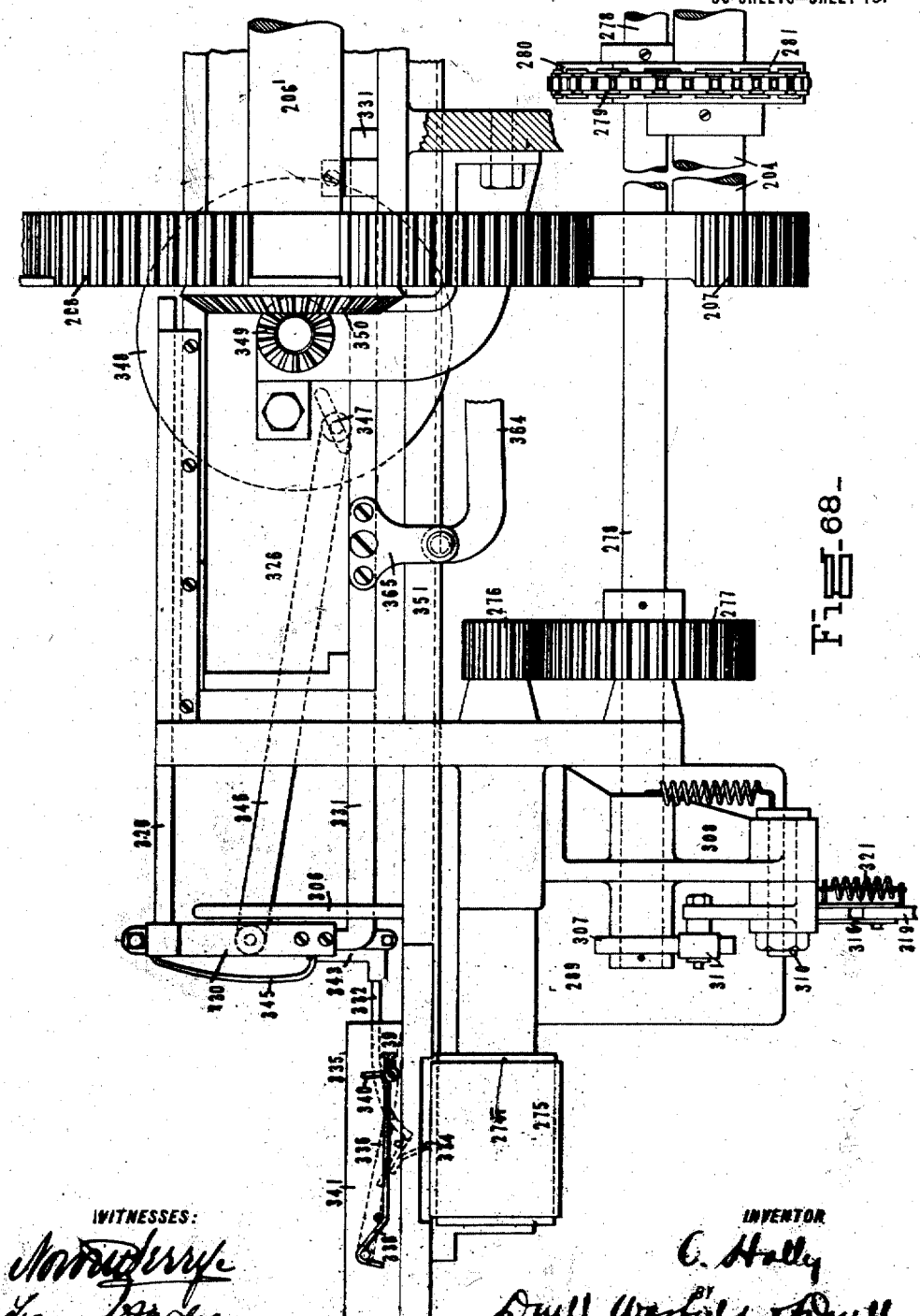

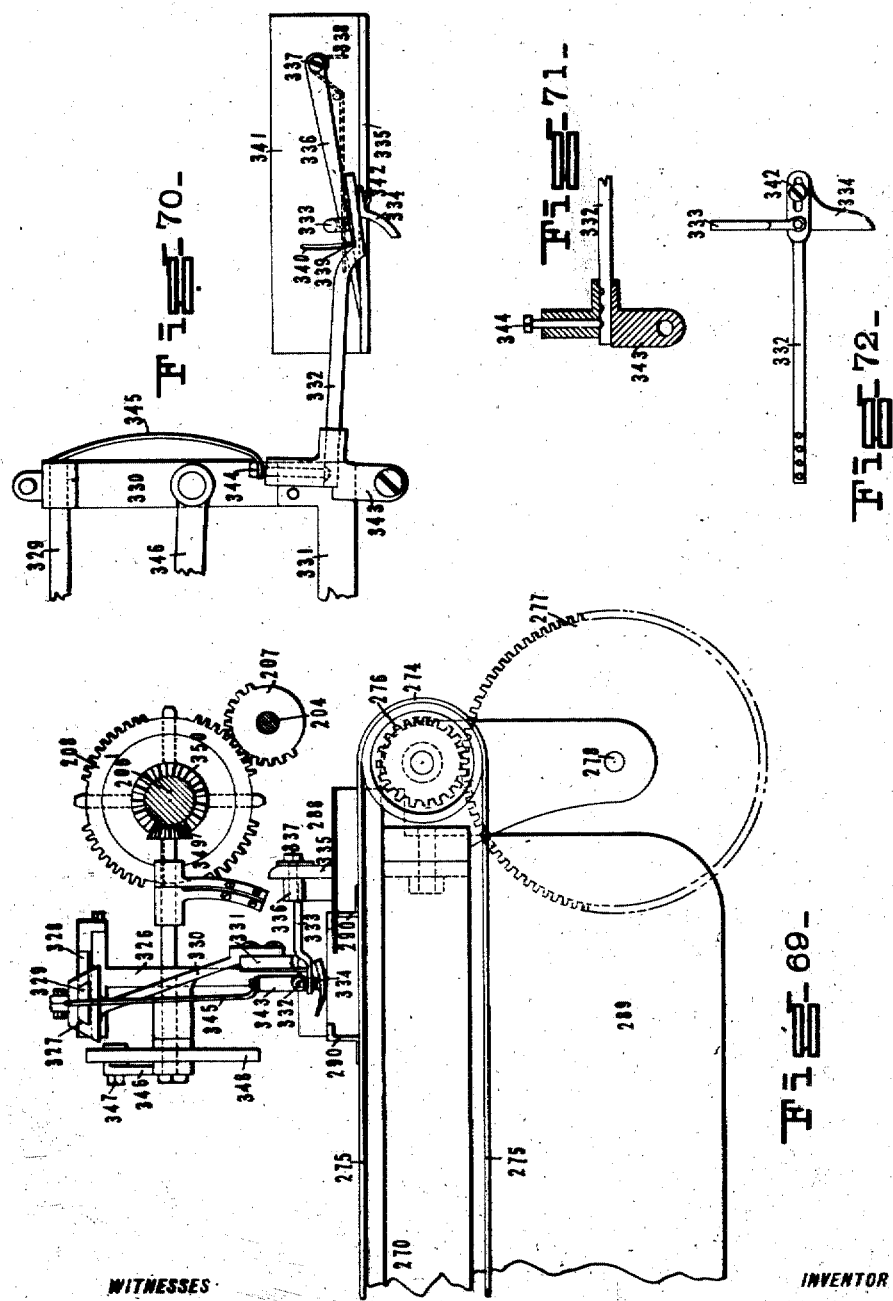

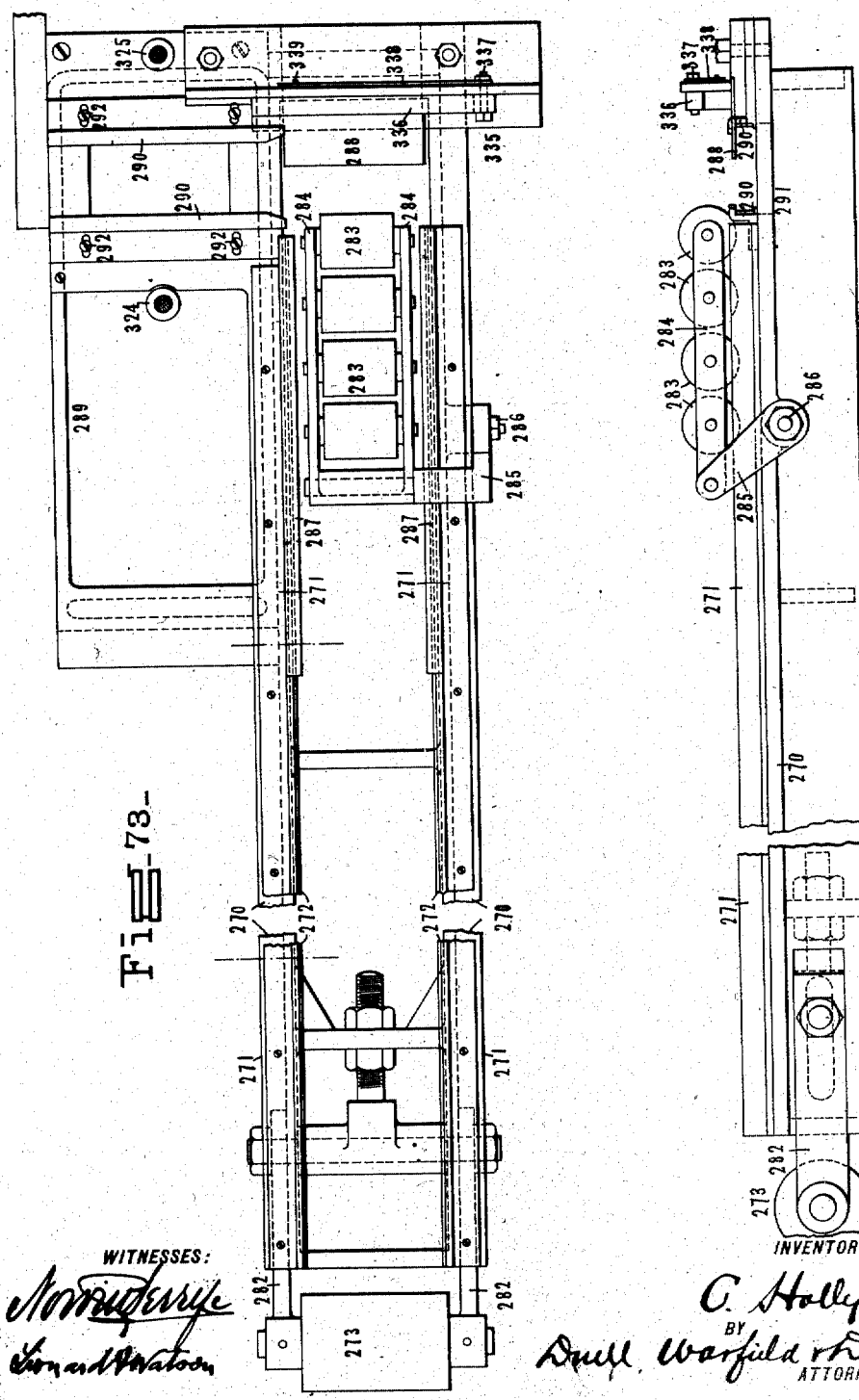

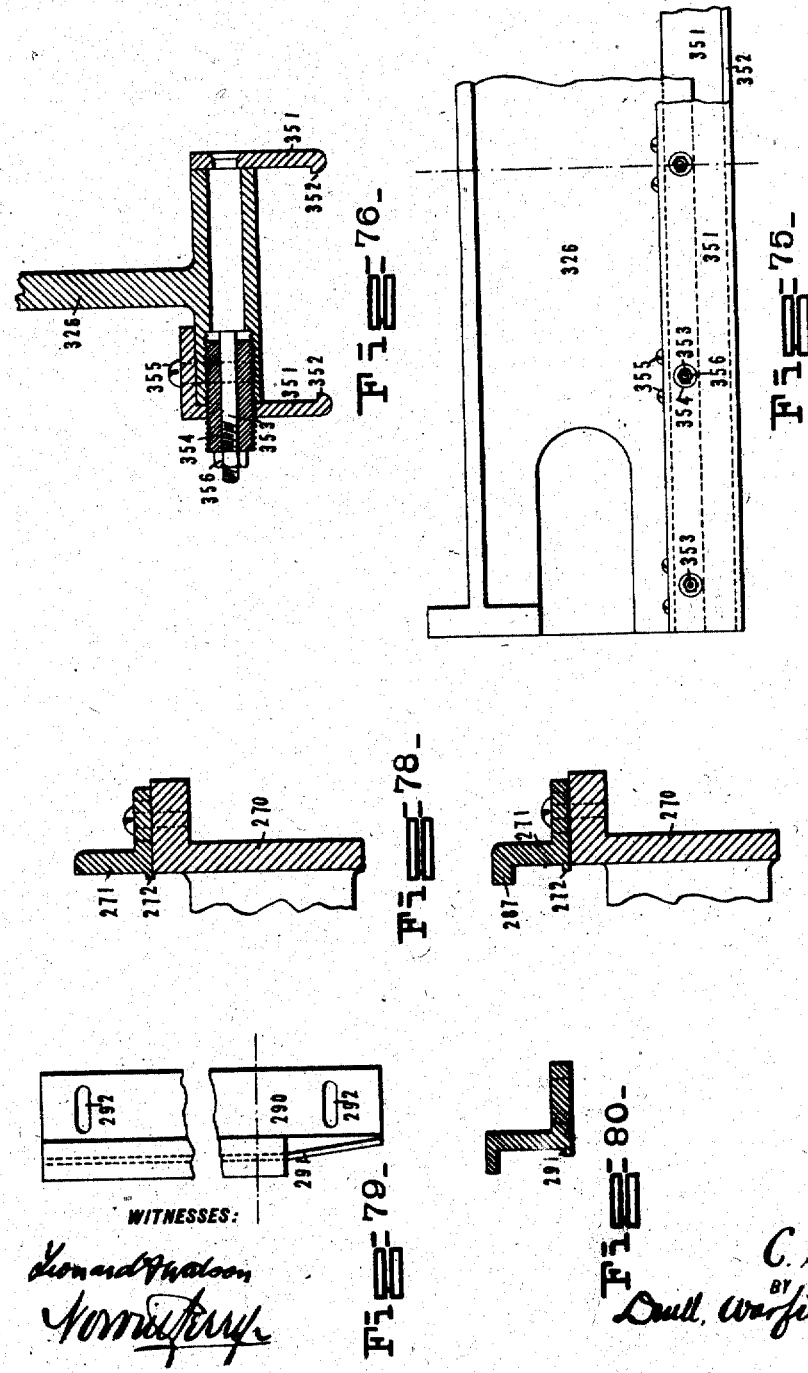

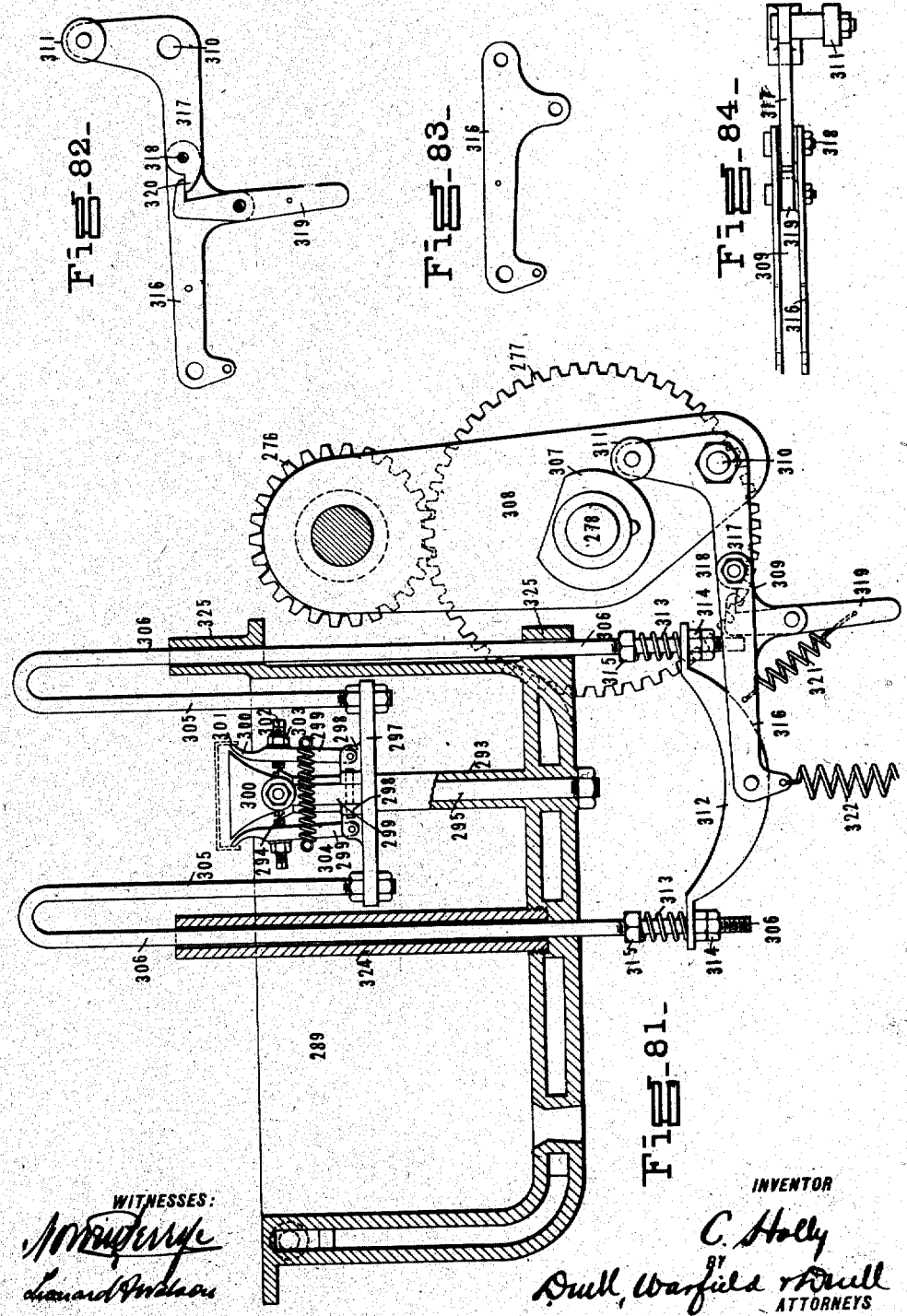

C. HOLLY.
BOX MACHINE.
APPLICATION FILED JAN. 16, 1911.
1,253,690.
Patented Jan. 15, 1918.
36 SHEETS—SHEET 24.
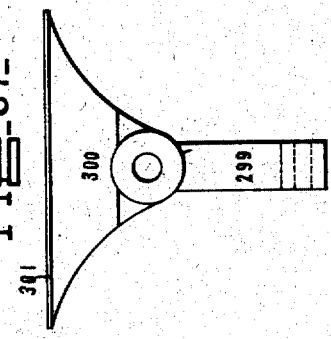
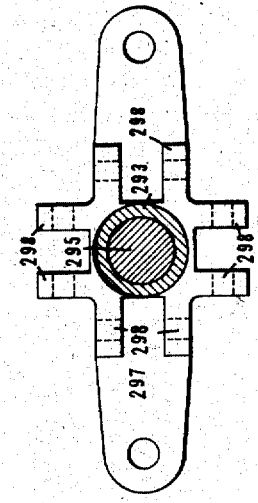
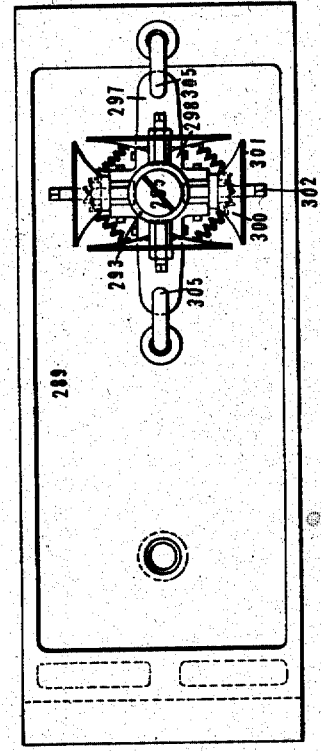
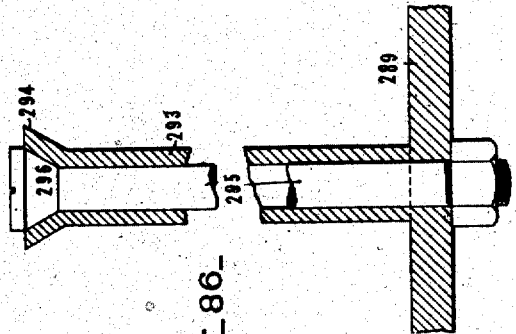
WITNESSES:
INVENTOR
C. Holly
BY
Duell, Warfield & Duell
ATTORNEYS

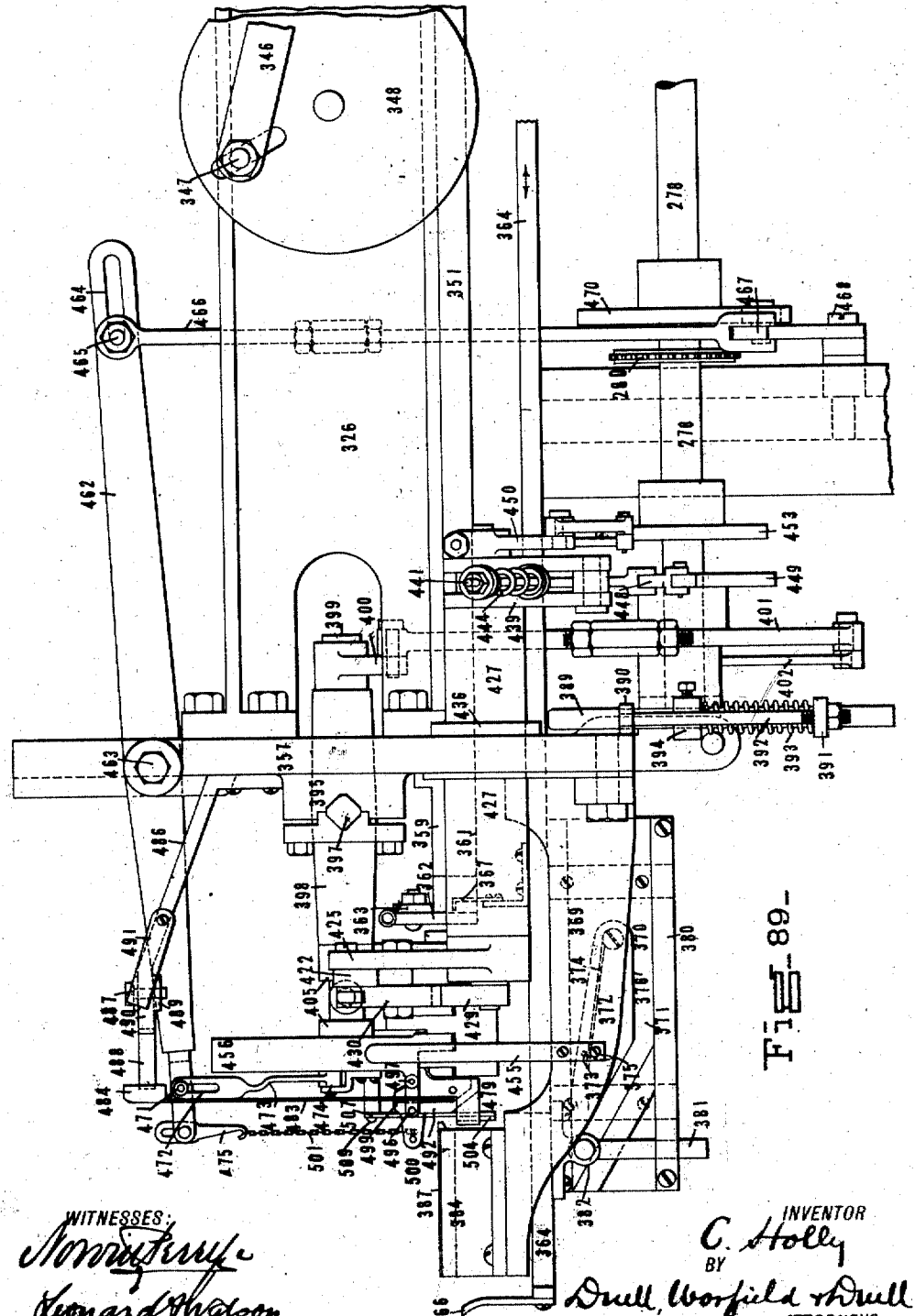

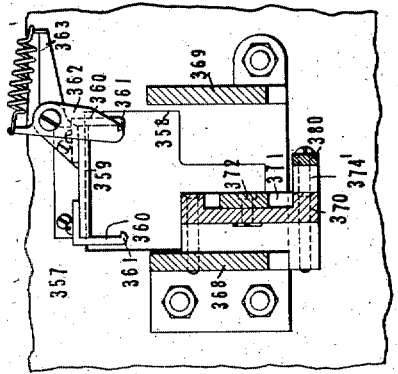
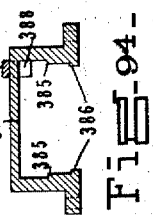
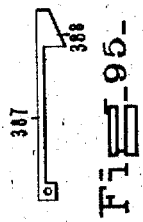
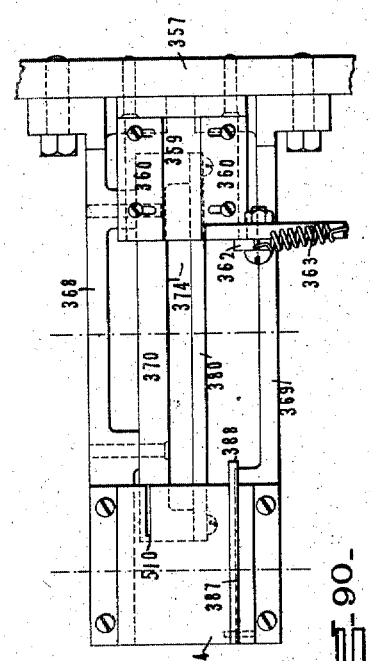
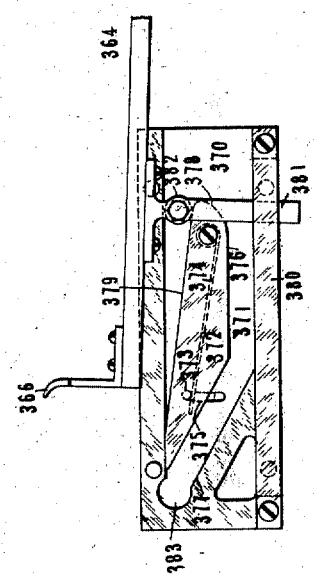
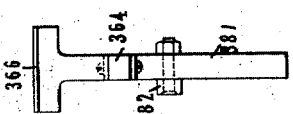

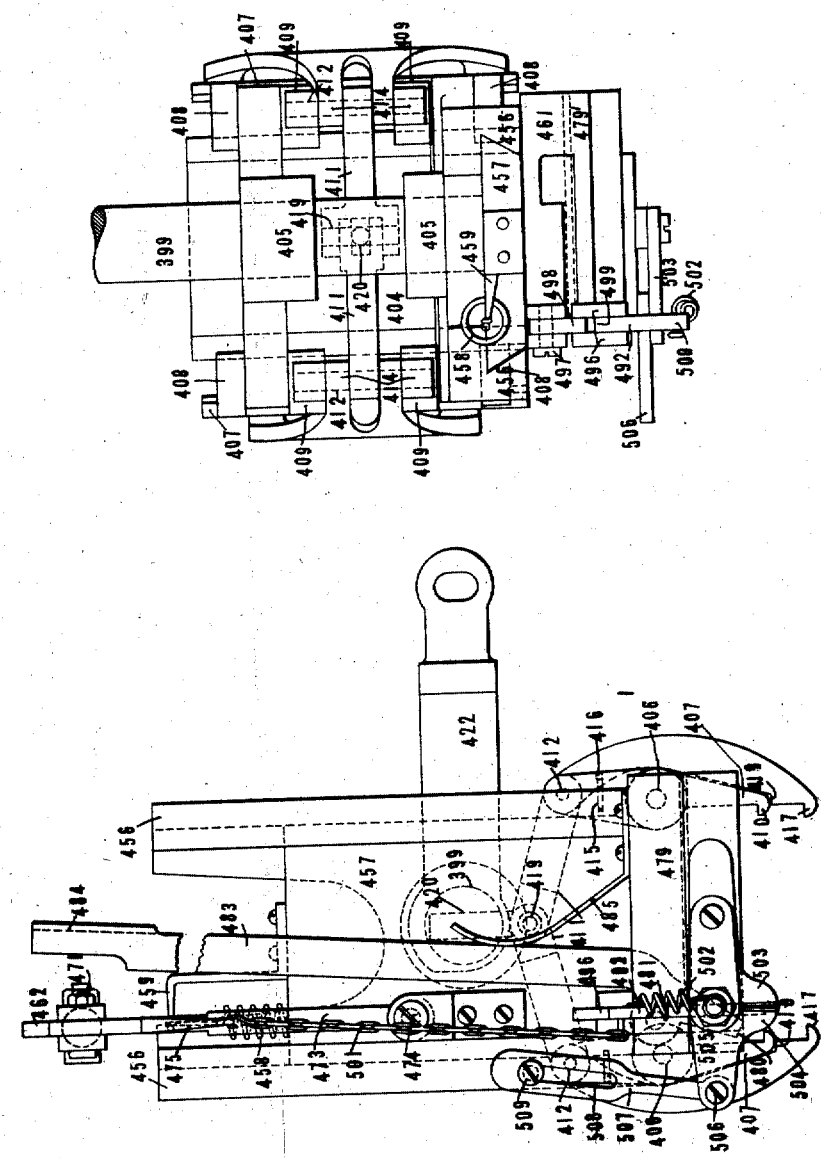

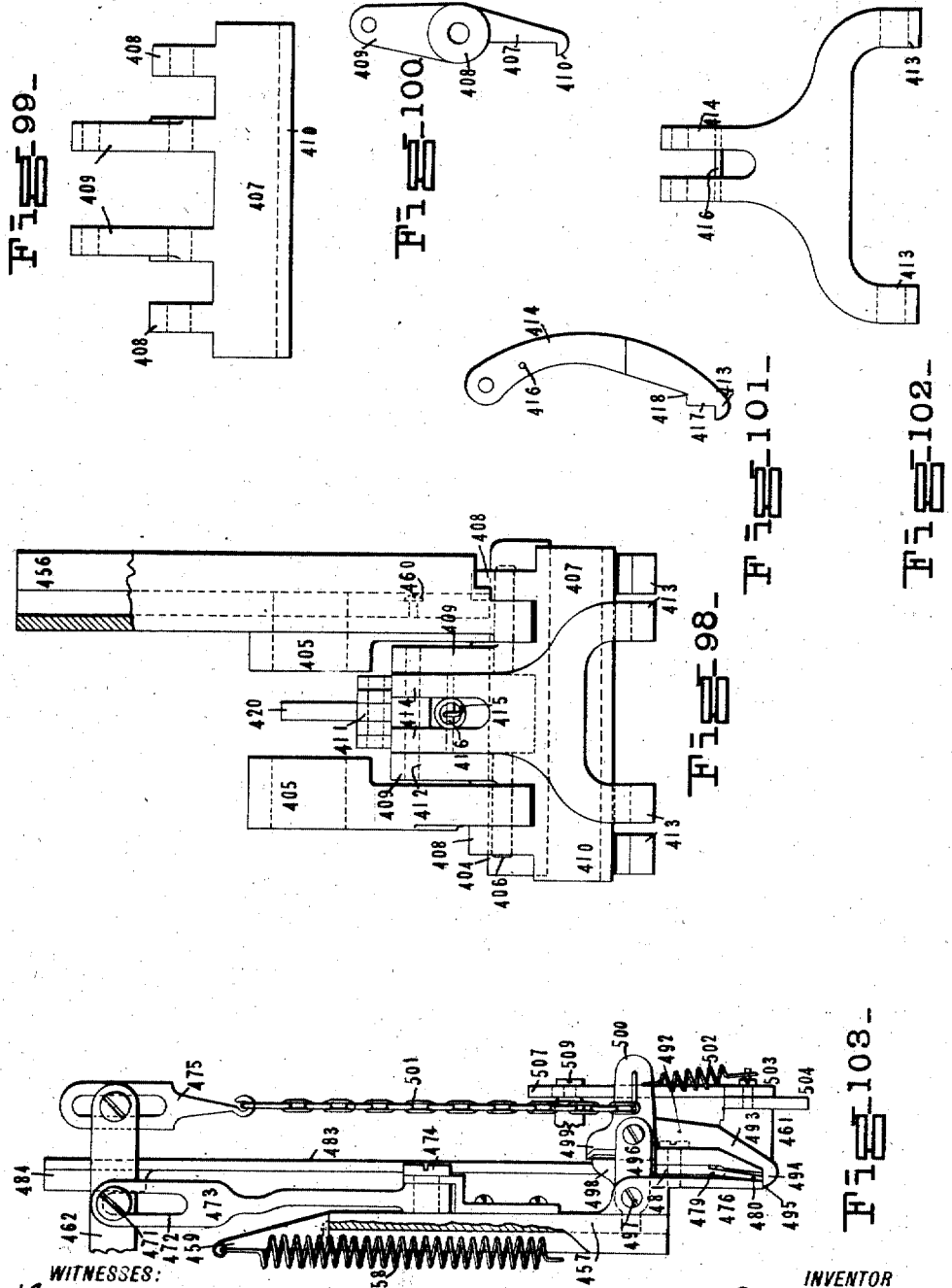

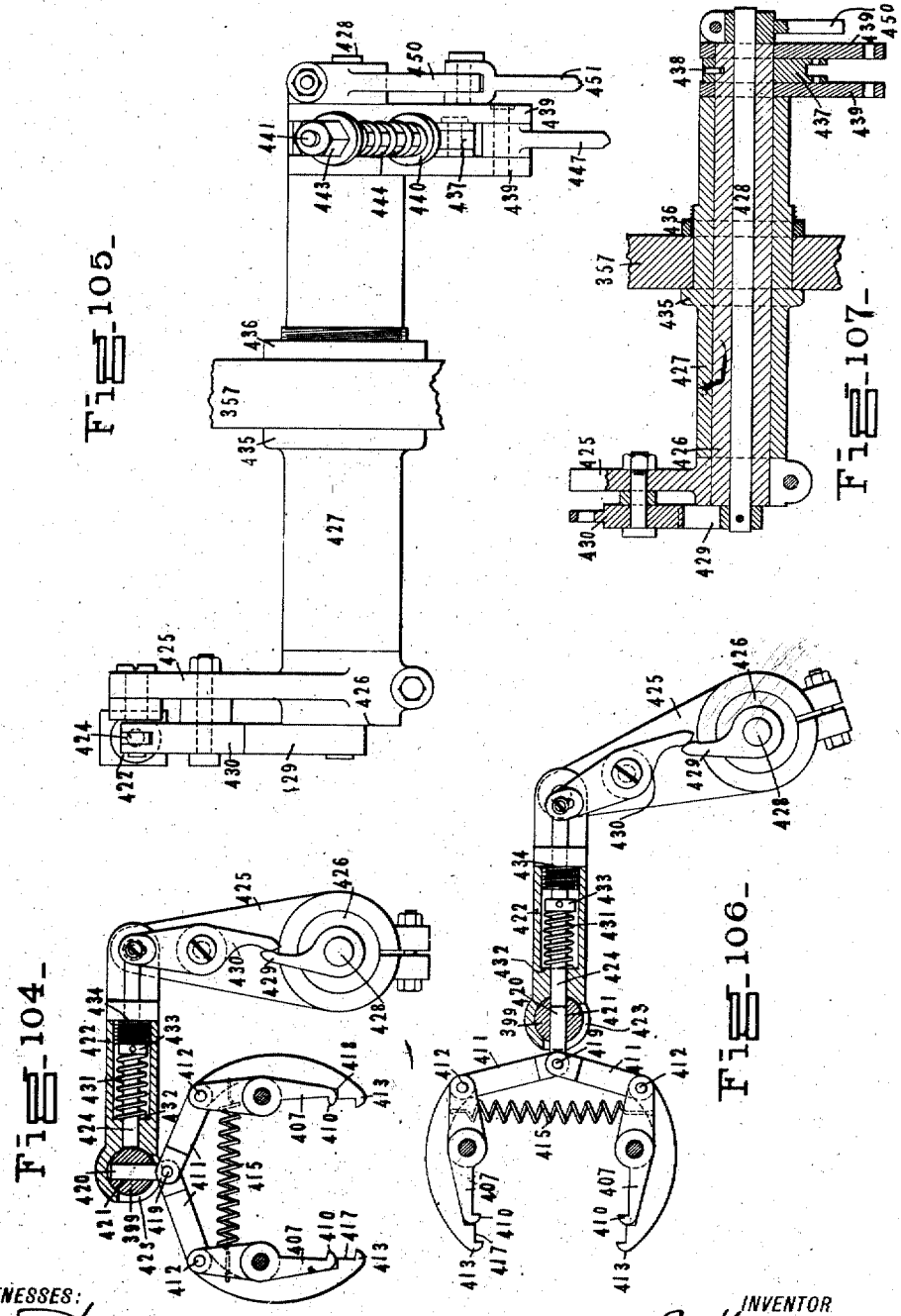

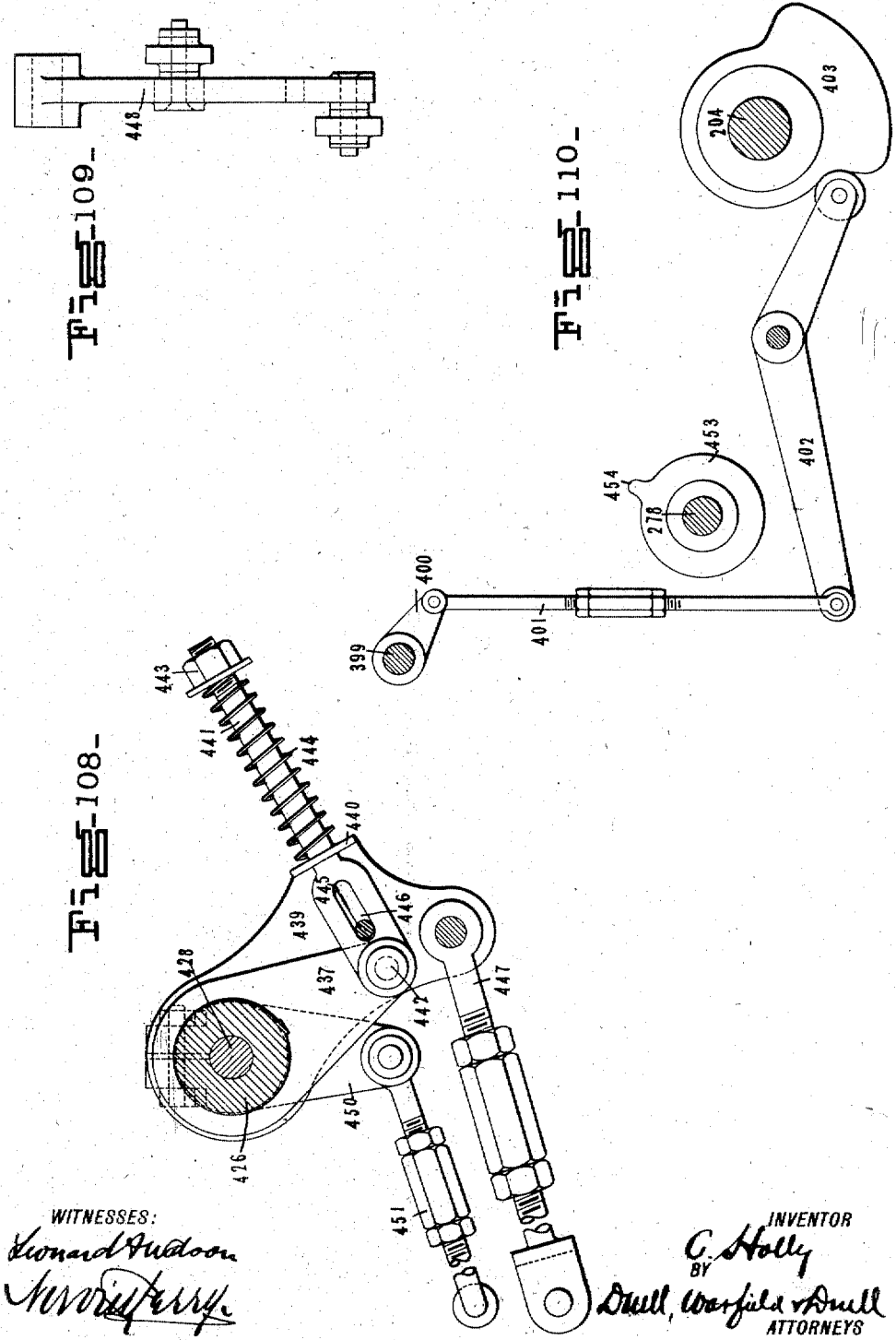

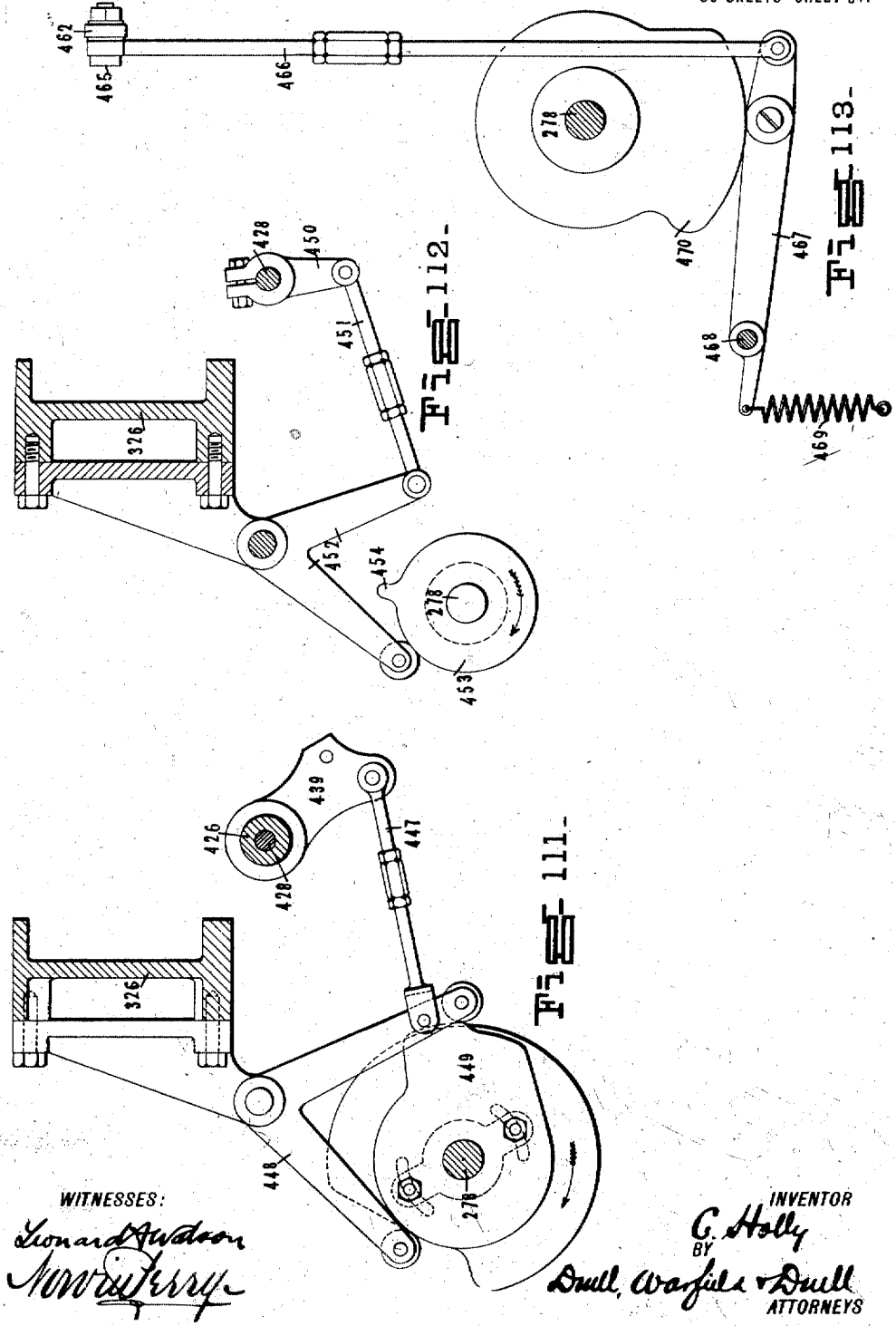

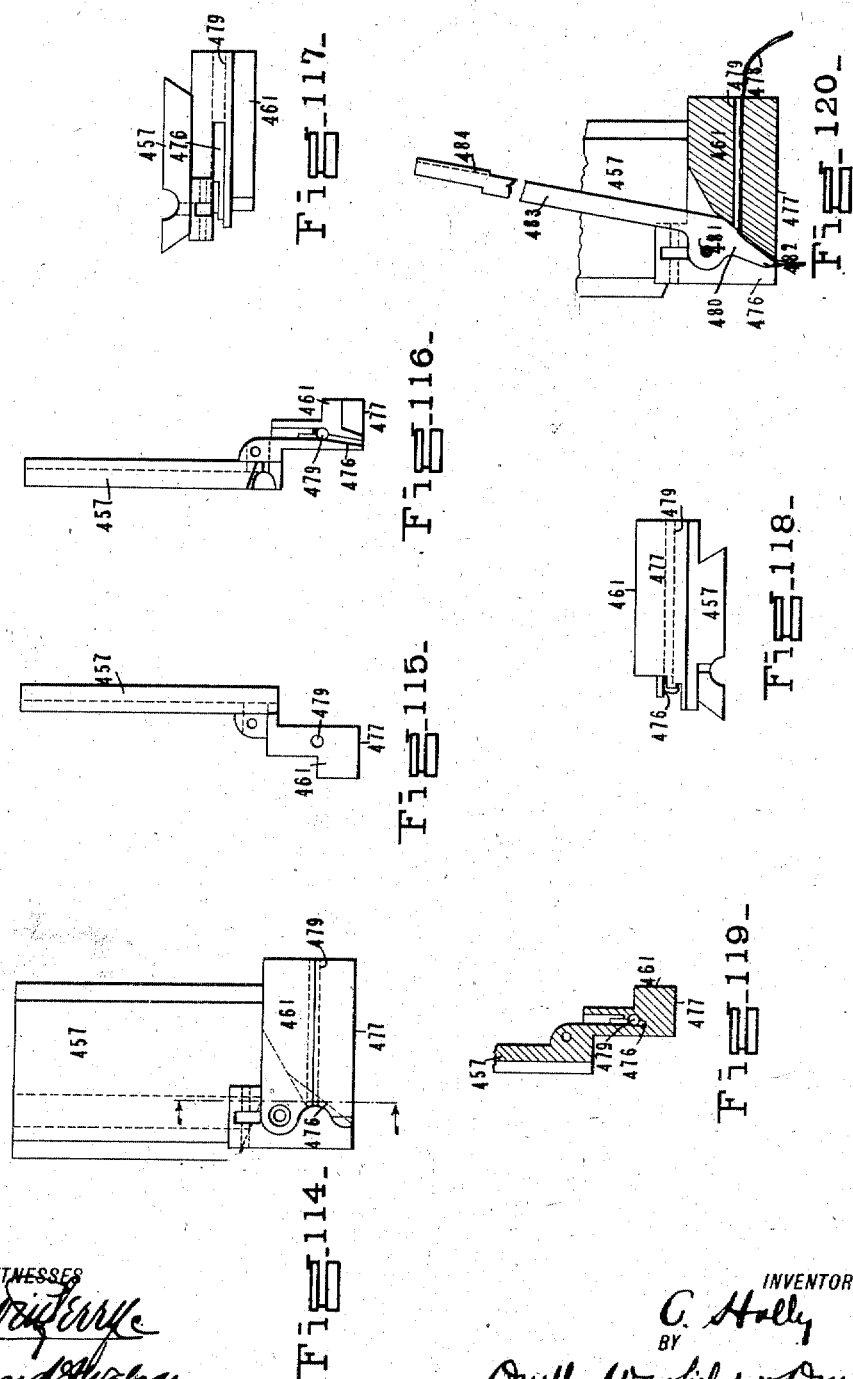

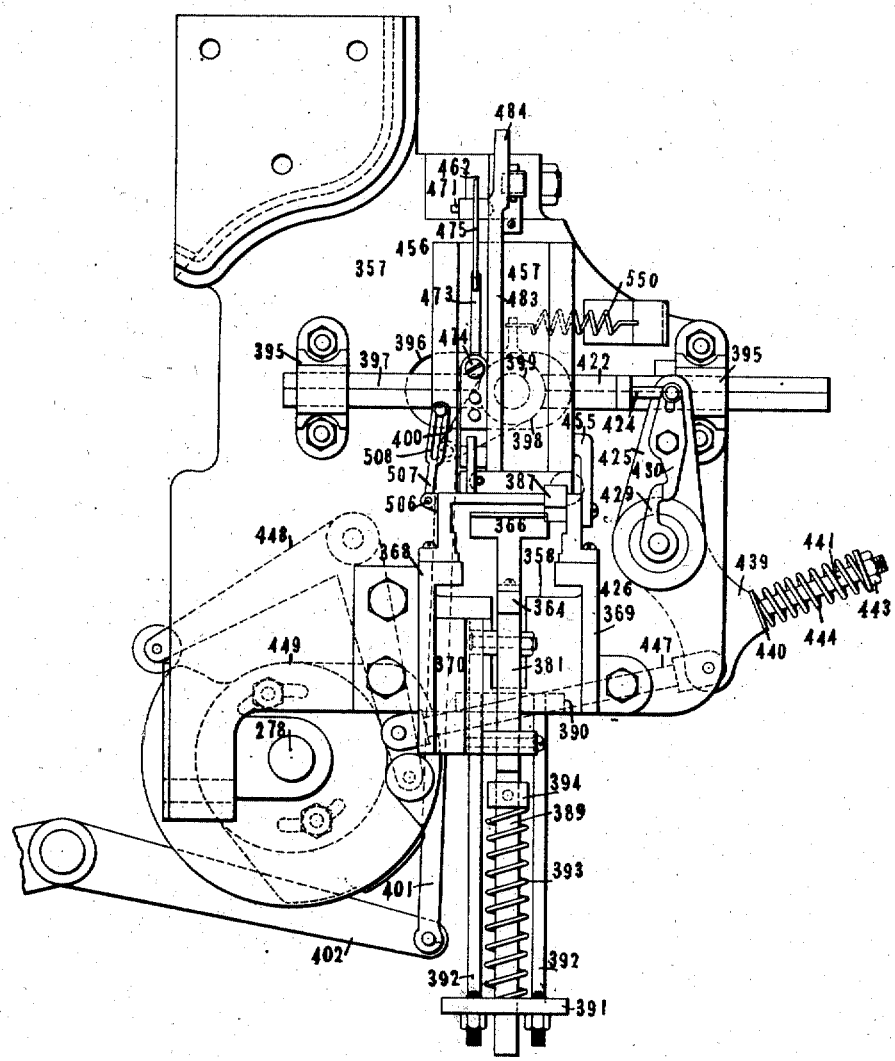

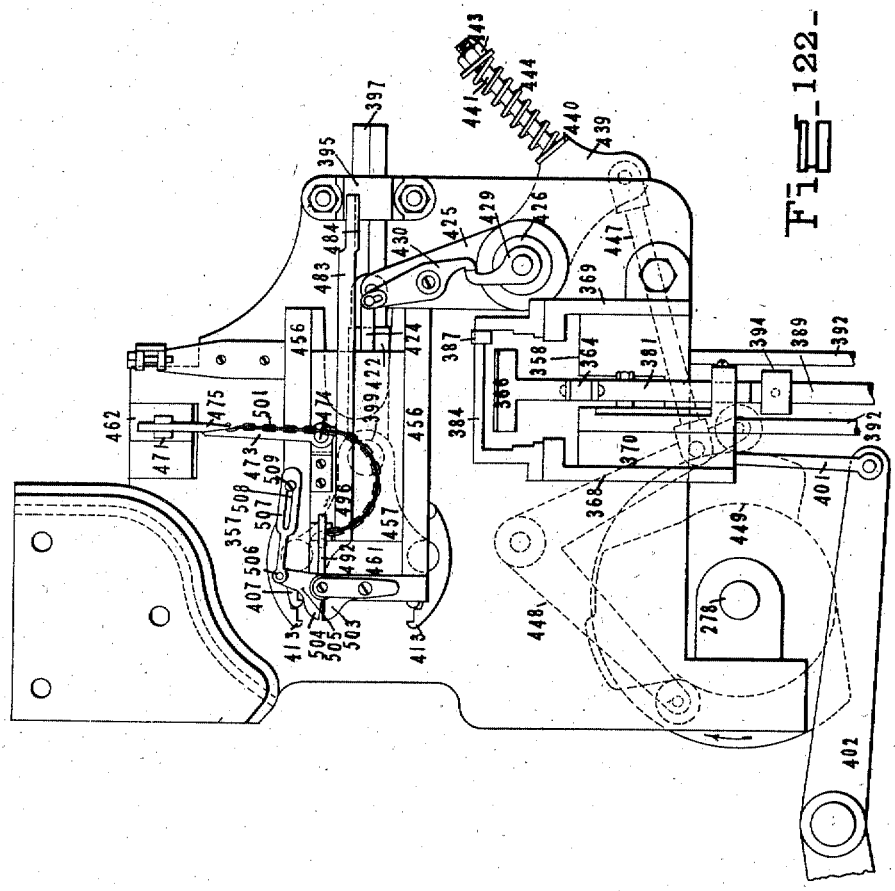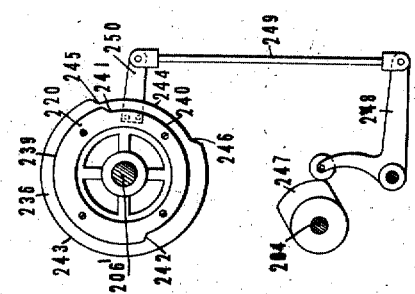

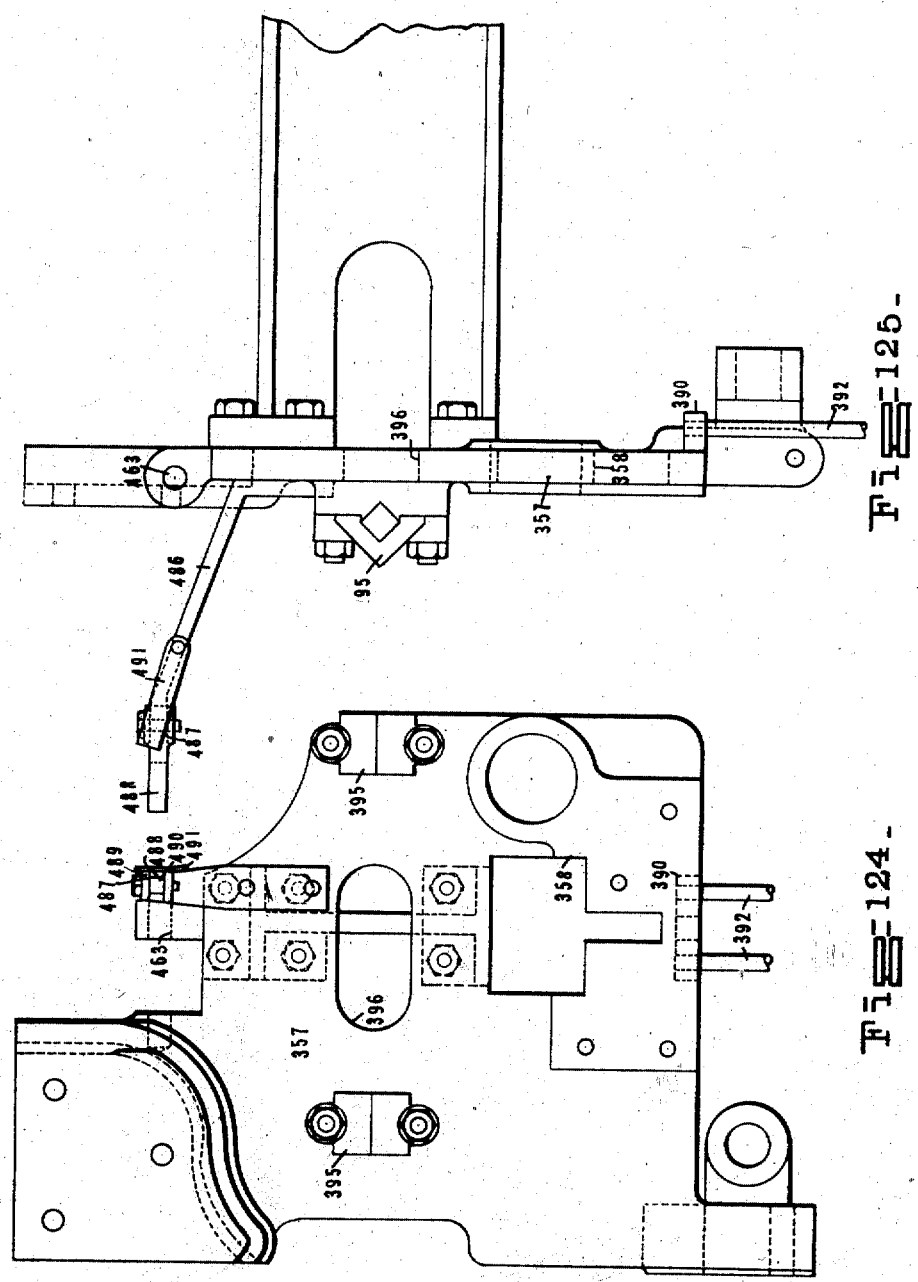

C. HOLLY.
BOX MACHINE.
APPLICATION FILED JAN. 16, 1911.

1,253,690.

Patented Jan. 15, 1918.
36 SHEETS—SHEET 36.

Fig. 126.

WITNESSES

INVENTOR
C. Holly
BY
Duell, Warfield & Duell
ATTORNEYS

UNITED STATES PATENT OFFICE.

CARLOS HOLLY, OF LOCKPORT, NEW YORK, ASSIGNOR TO THE F. N. BURT COMPANY, LIMITED, OF BUFFALO, NEW YORK, A CORPORATION OF ONTARIO, CANADA.

BOX-MACHINE.

1,253,690. Specification of Letters Patent. Patented Jan. 15, 1918.

Application filed January 16, 1911. Serial No. 602,862.

*To all whom it may concern:*

Be it known that I, CARLOS HOLLY, a citizen of the United States, residing at Lockport, in the county of Niagara and State of New York, have invented certain new and useful Improvements in Box-Machines, of which the following is a full, clear, and exact description, such as will enable others skilled in the art to which it appertains to make and use the same.

This invention relates to machines and methods for making boxes, and more particularly to machines for the rapid and continuous manufacture of boxes out of paper, cardboard and such like flexible material.

One of the objects of this invention is the provision of a machine which rapidly and automatically makes practical boxes having shouldered portions.

Another object of the invention is the provision of a machine for the efficient manufacture of boxes of flexible material having secured thereto a cord to aid in opening the box.

Another object of the invention is to provide a machine which makes a practical box from flexible material and wherein the joints are securely fastened and substantially concealed.

Another object is the provision of efficient mechanism for the production of a box presenting no raw or uncovered portion such as might detract from its appearance.

Still another object is the provision of means to produce, from flexible material, a continuous collar or neckpiece for a box which shall be fully covered and present a uniform appearance.

Another object is the provision of a machine to efficiently and expeditiously apply necks or collars to a box body.

Another and special object of the invention is the provision of a completely automatic machine adapted to make rectangular composite collars from body and cover paper materials and to snugly assemble, or insert, such collars in rectangular box bodies with the covered portion of the collar protruding therefrom in the form of a neck, the outer edge of which latter is surrounded by the cover material.

Another object of the invention is the provision of a practical means to secure a cord to a box body.

Another object of the invention is the provision of simple mechanism for accurately applying adhesive substance to boxes and for delivering the glued boxes to position for further manipulation.

Another object of the invention is the production of a method of making boxes efficiently and expeditiously and with practically no waste of material.

Other objects will be in part obvious and in part pointed out hereinafter.

The invention accordingly consists in the several steps and the relation and order of one or more of such steps with relation to each of the others thereof, and in the features of construction, combinations of elements and arrangement of parts, which will be exemplified in the method hereinafter disclosed and the construction hereinafter set forth, and the scope of the application of each of which will be indicated in the following claims.

In the accompanying drawings wherein similar reference characters refer to similar parts throughout the several views, Figure 1 represents a front elevation of the machine;

Fig. 2 is an elevation of the machine from the left side, parts thereof being omitted for the sake of clearness;

Fig. 3 is a rear elevation of the machine;

Fig. 4 is an elevation of the machine from the right;

Fig. 5 is a plan of the machine;

Fig. 6 is a detail plan, partly in section, showing the web feeding and holding devices;

Fig. 7 is a view showing the body web and its guiding devices;

Fig. 8 is a side view showing a connection for driving certain parts of the machine;

Fig. 9 is a side sectional view showing the operating mechanism for the holding plate for the body web;

Fig. 10 is a vertical section through the machine showing the relationship of several parts, some parts being omitted for the sake of clearness;

Fig. 11 is a view of the gearing which moves the former;

Fig. 12 represents a vertical transverse section through the machine in front of the assembly mechanism for the webs;

Figure 13:
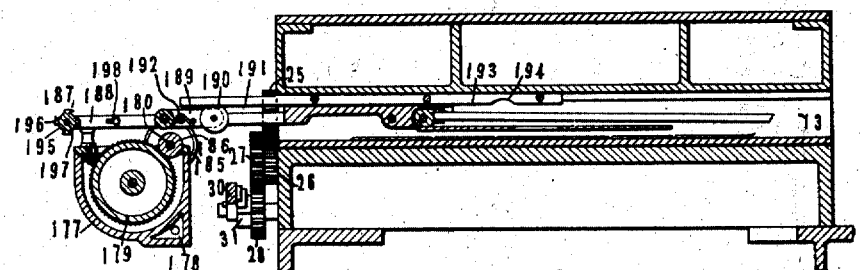
Fig. 13 is a sectional detail of the dauber for the upwardly facing scarf of the body web.
Figure 36:
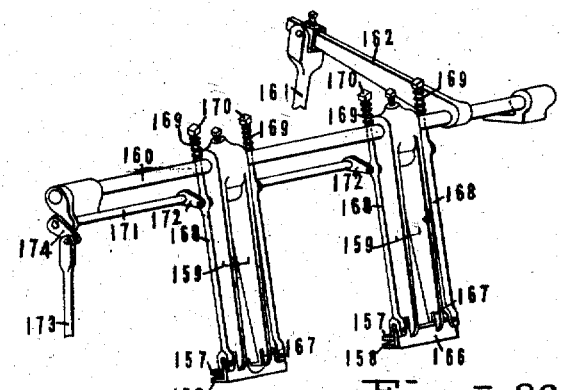
Figure 67:
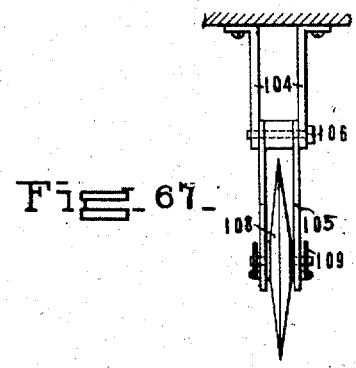

Figs. 14 to 21 inclusive are detail views of several parts of the mechanism;

Figs. 22 and 23 are side elevations of the carrier and its clamping and folding devices, showing them in two positions respectively;

Fig. 24 is a front elevation of the carrier;

Fig. 25 is a perspective view showing details of the head or former for the collar;

Figs. 26 to 32 inclusive are enlarged views showing the tongue or tab folding mechanism and its details;

Figs. 33, 34 and 35 are vertical longitudinal sections through the web feeding and collar transferring mechanism;

Fig. 36 is a perspective view of the transferring mechanism for the collar;

Figs. 37 to 41 inclusive are sectional views representing the different positions of the device for folding the end of the cover web over the body web, severing, and slitting the same;

Figs. 42 to 47 inclusive show details of the gluing device and the glue feeding mechanism for the body web and the cover web;

Fig. 48 is a top plan view of the mechanism for folding the collar around the former;

Figs. 49 and 50 are bottom and side views, respectively, of said folding mechanism;

Fig. 51 is a section showing the details for transmitting motion to the folding device shown in Figs. 48 to 50;

Fig. 52 shows the body web and the cover web in assembly position;

Fig. 53 shows the main portion of the cover web folded over the edge of the body web, the latter being severed;

Fig. 54 shows the same parts when the cover web has been fed to separate the body portion from the body web, the latter having been advanced to contact the cover web;

Fig. 55 is a perspective view of the collar blank immediately after it has been severed from its webs;

Figs. 56, 57 and 58, show respective stages in the folding of the collar blank shown in Fig. 55 into a collar;

Fig. 59 represents a box;

Fig. 60 shows the box and collar assembled, with a cord attached thereto;

Fig. 61 is a front view of the cutting mechanism for the cover web;

Fig. 62 is a transverse view from the section for the cover web;

Fig. 63 is an enlarged perspective view of the bars for folding and pressing the ends of the body web and the cover web;

Fig. 64 is a transverse section through Fig. 63 on a reduced scale;

Fig. 65 is a sectional view representing the folding and pressing bars in pressing position with the tongue of the cover web extending freely through an opening in the folding bar;

Fig. 66 is a plan view of the pawl in connection with which the cord gripping mechanism operates;

Fig. 67 is a front view showing the slitter for the cover web;

Fig. 68 is a rear view of the left hand upper portion of the machine showing the picker mechanism to feed the box, and its operating connections;

Fig. 69 is a front view of the picker mechanism;

Fig. 70 is a side view of the picker mechanism;

Figs. 71 and 72 are detail views of the picker mechanism;

Figs. 73 and 74 are a plan and side elevation of the means for carrying the box bodies into position to be fed by the picker mechanism;

Figs. 75 to 80 inclusive are detail views of certain guiding devices for the box bodies;

Fig. 81 is a transverse section through the mechanism which applies glue to the inside of the box bodies;

Figs. 82, 83 and 84 are details of certain parts of the construction shown in Fig. 81;

Fig. 85 is a plan view of the glue pot and the expansible dauber shown in Fig. 81;

Figs. 86, 87 and 88 are detail views of portions of this gluing mechanism;

Fig. 89 is an enlarged front elevation of a portion of the machine showing means for feeding the box bodies into the carriage, and certain other details;

Fig. 90 is a top plan view of the end of the guideway for the box bodies;

Fig. 91 is a transverse section thereof;

Fig. 92 is a side view thereof;

Figs. 93, 94 and 95 are details thereof;

Figs. 96 and 97 are a side elevation and a top plan view of the carriage and the cord-applying and cutting device;

Fig. 98 is a front elevation of the jaw pieces and supporting arms for the box and the strippers;

Figs. 99 to 102 are details of the supporting arms and strippers;

Fig. 103 is a front view showing the supporting pieces carrying the cord directing finger and the shears for cutting the cord;

Figs. 104 and 105 are views from two positions showing the relative positions of the carriage supporting arms for the boxes; and their operating mechanism;

Figs. 106 and 107 are similar views of these parts in a different position;

Figs. 108 to 113 inclusive are detail views showing operating mechanisms for the jaw pieces, etc.;

Figs. 114 to 118 inclusive are views of the jaw pieces of the carriage from different positions;

Fig. 119 is a vertical section through Fig. 114;

Fig. 120 is a view partly in section showing the cord gripping device in relative positions;

Fig. 121 is a view from the left side of the machine showing the arrangement of the pusher mechanism, the carriage and its supporting and operating devices;

Fig. 122 is a similar view to 121 showing the parts in different positions;

Fig. 123 is a view showing the relationship of the cams for operating the tab folding and collar clamping devices of the carrier;

Figs. 124 and 125 are side and end views, respectively, of a supporting plate for the carriage and its operating mechanisms; and Fig. 126 is a diagrammatic view showing the operating connections of the machine.

The disclosure of this invention will be facilitated by the following brief explanation:

The box resulting from the specific embodiment of the invention herein described and illustrated in the accompanying drawings is illustrated in Fig. 60 and consists of a body 1 having a neck 2, an intermediate shoulder 3 and a cord 4 secured to the box. The body 1 is preferably of rectangular outline and embodies a bottom 5 having upright walls, sides, or flanges, forming a hollow body open at one end. The neck is formed by a collar 6, also of rectangular outline to comport with the outline of the body and designed to be inserted and accurately or snugly fit within the opening of the body with its walls extending from above the opening to a sufficient distance within the opening to be secured thereto by the adhesive material employed, and preferably said walls rest upon the bottom or head of the body. Between the inner face of the body wall and the outer face of the collar wall an end of the cord 4 is placed, and is secured in position, being held by the adhesive material and the juxtaposed faces. The outer extended portion of the collar thus forms a neck 2 for the box. It will be evident from what hereinafter appears that the invention, viewed in some aspects, admits of the manufacture of the several parts of the box in any efficient manner, but in the present embodiment of the invention the body and collar are separately made and brought into the relationship resulting in the complete box by mechanism hereinafter described.

As a portion of the collar may be exposed to view when the box is used, it is desirable that that portion present an attractive appearance, and to obtain this result and make the box economically, it is preferred to make the collar of superposed materials, comprising paper of pleasing and attractive appearance, whereby the collar will be of a substantial nature and the exposed portion attractive. In the present embodiment, therefore, the collar is formed from two continuous webs 7 and 8 of suitable flexible material placed in a convenient position to be fed to the mechanism which subsequently acts thereon to form the collar. It will be apparent from what hereinafter appears that parts of the mechanism may by mere adjustments be employed to produce the sides or flange of a box, but that the embodiment herein illustrated is particularly adapted and adjusted to produce a collar, as described. The two webs from which the collar is formed are herein denominated the body web and the cover web, respectively, in order to distinguish them in the further description. The body web or foundation strip 7 is composed of material of substantial consistency, such as cardboard, strawboard, etc., having sufficient stiffness to form the body of the collar, while the cover web or finishing strip 8 is of more pliable material, such as thin paper.

Before being delivered to the mechanism which feeds the body web to that portion of the machine which severs the web transversely to produce a body blank of a proper depth to be folded into a collar, the body web is preferably cut to a width corresponding to the length of body blank to be employed, and is longitudinally scored along lines 9, 9, 10, 10 corresponding to the corners or folds of the collar to be produced. The edges of the body web are also scarfed on opposite faces, respectively, as at 11, and 12, and when the blank is folded into a collar the scarfed portions are adapted to overlap and be secured by paste, cement, glue or other suitable adhesive. In the present embodiment the downwardly facing scarf 11 of the body web is provided with adhesive before reaching the feeding devices of the machine, the adhesive becoming dry or tacky before the blank is folded to produce the collar. A better joint thus results than if both scarfed edges were glued just prior to being joined. In case a butt joint is to be formed, the scarfing may be omitted, if desired, as is obvious. Any suitable mechanism may be employed to glue the downwardly facing scarf of the body web in the manner described, but the means described in application No. 492,029, hereinafter referred to, is preferred. The body web, as it approaches its feeding mechanism in the machine, is of the structure illustrated in Fig. 52 wherein the scores 10, 10, are a distance apart corresponding to one dimension of the collar, and the scores 9, 9, are separated from the scores 10, 10, respectively, a distance corresponding to the other dimension of the collar, the distance between the scores 9, 9, and the respective adjacent scarfed edges of the web being such that when the body blank is folded to form the collar the scarfed edges will overlap, and a wall or side of the collar formed equal in length to the opposite wall thereof. It is obvious that the scarfed joint described may be located at any portion of the collar, but it is preferred to locate it at the central portion of one of the longer sides, as shown. Furthermore, and before the body web reaches its feeding mechanism in the machine it is preferred to provide a loose or slack portion therein in order that said feeding mechanism may not have to overcome the inertia of more than a small portion of the body web. Any suitable mechanism may be employed to support the body web, cut it to proper width, score it, scarf the edges, and provide slack, as hereinbefore described, but it is preferred to employ the mechanism for performing similar operations on the flange web, or body web as fully set forth in applicant's application, Serial Number 492,029, filed April 24, 1909.

In the illustrative embodiment of the invention found herein, the body web 7 has its end portion positioned on the cover web 8, in rear of the end of the latter. As will appear hereinafter the end of the cover web is longitudinally divided or slit from its front edge and adjacent the scarf 12, and after the body web has been placed thereon in the relation specified, the longer division of the cover web is folded over the edge of the body web and pasted thereto. The body web and the cover web are severed transversely at a distance back of the front edge of the body web corresponding with the depth of collar desired, and in a manner hereinafter described, resulting in a composite collar blank as shown in Fig. 55, having a projecting tab or tongue. The collar blank in the form of a duplex strip is then folded on the scored portions into a rectangular collar or tubular element, having continuous walls or sides, as shown in Figs. 57 and 58, with the scarfs overlapping and glued. The tab or tongue is then folded over the edge of the collar at the scarfed joint and glued, thus concealing said joint and further assisting in securing the same. The collar so formed is assembled with a box body as shown in Fig. 59, preferably telescoping with the flange thereof, and a cord is inserted between the collar and box body, resulting in the completed box with cord attached shown in Fig. 60.

The mechanism for forming the collar and assembling the same with the box body and cord will now be described.

Prepared as hereinbefore described, the body web is engaged with mechanism which intermittently feeds it to a severing or cutting mechanism by which blanks are cut successively and transversely from the front edge of the web, the scarfings and scorings being thus arranged transversely to the length of the blank after the same has been severed from the web.

That portion of the machine which supplies or feeds the body web is constructed and operates as follows, the same being similar in construction to the flange feeding mechanism disclosed in applicant's aforesaid application.

The numeral 13 represents a horizontal cross-piece which is arranged transversely in the upper rear part of the machine and forms part of the stationary main frame and which serves as a feed table for the body web feeding mechanism. The body web which has been previously provided with the scores and scarfs in another machine provided for this purpose, passes downwardly along the concave side of a curved guide plate 14 arranged at the rear end of the feed table and thence horizontally forward over this table and over a cutter blade or plate 15 which is arranged upon the front edge of said table. 16, 17 represent upper and lower feed wheels or rollers which are arranged on opposite sides of the path of the body web in a position about centrally between the front and rear edges of the feed table and have their peripheries knurled or roughened so that these surfaces of the feed wheels, which engage with the under and upper sides of the horizontally moving portion of the body web midway of its width, obtain a firm grip upon the same and operate to feed it reliably forward when the feed wheels or rollers are turned forwardly. The lower feed roller 17 is arranged in a cavity formed in the upper side of the feed table 13 and is mounted on a transverse shaft 18 which is journaled in stationary bearings on the adjacent part of the frame. The upper feed roller 16 is mounted on a transverse shaft 19 which is journaled loosely at one end in a bearing on the frame, so as to be capable of a slight vertical oscillation to permit the upper feed roller to adapt itself to slight variations in the thickness of the paper or other stock of which the body web is made. The upper feed roller is yieldingly held downwardly in engagement with the upper side of the body web so as to firmly grip the latter between the feed rollers and insure reliable feeding of the same. The preferred means for this purpose comprise a vertically movable bearing 20 in which the free end of the upper feed roller shaft is journaled, a bracket 21 secured to the adjacent part of the main frame and provided on its lower part with a guide which controls the vertical movement of the bearing 20, and a spring 22 surrounding an upwardly projecting rod 23 on this bearing and engaging at its lower end against a shoulder on this rod and at its upper end against the bracket 21 in which the upper end of the rod 23 is guided.

For the purpose of raising the upper roller a sufficient distance above the lower roller to permit of easily pushing the body web between the same when getting the machine ready, a lifting device is provided which preferably consists of a screw nut 24 applied to the upper threaded end of the rod and adapted to bear against the upper side of the bracket 21.

Upon turning the screw nut 24 in one direction the upper roller 16 is raised to clear the space between the same and the lower roller and permit the body web to be freely inserted between these rollers and after the body web has been thus inserted the screw nut is loosened to permit the spring 22 to press the upper roller against the web and cause the latter to be gripped between the upper and lower feed rollers.

The two feed rollers are compelled to turn in unison by means of intermeshing like gear wheels 25, 26 secured respectively to their shafts, and an intermittent rotary forward movement is imparted to these wheels or rollers so that they feed the body web forwardly step by step by a mechanism which consists of a gear wheel 27 secured to the shaft of the lower feed wheel 17, a pinion 28 meshing with the gear wheel 27 and provided with a ratchet wheel 29, a ratchet lever 30 pivoted concentrically with the pinion and ratchet wheel and provided with a spring pressed pawl 31 engaging with the ratchet wheel, an upright shifting rod 32 connected at its upper end with the ratchet lever 30, a transverse rock lever 33 pivoted on the lower front part of the frame and connected with the lower part of the shifting rod 32, a rotatable cam 34 engaging with its upper sides against a roller 35 on the rock lever 33 and operating to turn the ratchet lever 30 so as to turn the body web feed rollers forwardly, and a horizontal longitudinal shaft 36 journaled in the lower part of the frame and carrying said cam 34. The idle return movement of the ratchet lever 30 is effected by gravity but may be aided by a spring, if desired.

To permit of varying the extent of the forward movement of the body web at each step to suit the width of collar desired on the boxes, the pinion 28 may be changed for one of larger or smaller size. For this purpose this pinion is mounted on an adjustable support 37 having preferably the form of an arm pivoted to swing vertically on the frame and held adjustably in place by a screw 38 on the frame passing through a segmental slot in the adjustable arm.

39 represents the main driving shaft of the machine which is journaled horizontally and transversely in bearings on the lower central part of the main frame and which may be driven by a driving belt passing around a pulley 40 at the outer end of this shaft or any other suitable means. Motion is transmitted from this driving shaft to the longitudinal shaft 36 previously referred to by means of a counter-shaft 41 journaled horizontally and transversely in the lower part of the machine below the main driving shaft and operatively connected with the latter by means of a pinion 42 on the main shaft meshing with a gear wheel 43 on the counter-shaft and also operatively connected with the longitudinal shaft 36 by means of intermeshing beveled gear wheels 44, 45 secured respectively to the counter-shaft and longitudinal shaft. While the body web is being fed forward to the mechanism where body blanks are cut off from the front end of the same and assembled with the cover, the body web is guided so as to hold it in place against lateral movement and insure its proper presentation to the mechanism which subsequently operates upon the same. This guiding mechanism is constructed as follows:

46 represents a plurality of segmental guiding blades or fingers which are arranged in front of the curved guide plate 14 and each of which engages with its convex face in a longitudinal score or groove of the body web. The several guiding blades or fingers are mounted on a horizontal rock shaft 47 journaled transversely in bearings on the adjacent part of the main frame, which shaft is rocked by means of a horizontal rock shaft 48 journaled horizontally and transversely on the lower part of the frame, an upright connecting rod 49 connected at its upper end with a rock arm 50 projecting rearwardly from one end of the upper rock shaft 47 and at its lower end with a rock arm 51 projecting rearwardly from the lower rock shaft 48, an upright rock arm 52 secured to said lower rock shaft and engaging with a rotatable cam 53 on the countershaft, as shown in Figs. 3 and 10, and a spring 54 which connects a forwardly-projecting arm 55 on the lower rock shaft with part of the stationary frame. A slack or loose joint is provided somewhere in the mechanism, whereby the movement of the cam 53 is transmitted to the guide blades 46, this being preferably effected by means of a slot 580 in the upper end of the rod 49 and receiving a pin 590 on the respective upper rock arm 50. During each rotation of the cam 53 the high part of the same upon engaging the upper right rock arm 52 causes the guiding blades or fingers to be turned backwardly by engagement of the lower end of the slot 580 with the pin 590. When the low part of this cam is presented to the rock arm 51, the spring 52 actuates the intermediate connecting mechanism, so as to move the rod 49 and disengage the lower end of its slot 580 from the pin 590 and leave the guide blades in their rearward position free to be moved forward by the pull of the body web as the latter is subsequently fed forward by the rollers 16, 17. The means for actuating these blades or fingers are so timed that the same are moved backwardly while the feed rollers 16, 17 are at rest and by their grip upon the body web hold the same against backward movement, thereby permitting the feeding blades to slide backwardly in the scores or grooves of the body web independently of the latter, but during the forward or feeding movement of the feed rollers, the guiding blades turn forwardly in unison with the same by the pull of the body web, thereby eliminating the friction on the body web and the undue strain on the latter, which otherwise would be the case if the blades were stationary and the feeding rollers were obliged to pull the body web around the convex edges of the several blades.

In order to hold the body web with its scores or grooves reliably in engagement with the convex edges of the blades or fingers 46, pressing means are provided which preferably consists of a plurality of vertical rollers 56 which are arranged above the upper edge of the curved guide plate 14 and each of which engages with the rear or unscored side of the body web in line with one of the scores therein and an opposing guiding and feeding blade and is yieldingly held in its operative position by means of a vertically-swinging upright arm 57 carrying the presser roller at its upper end and turning loosely at its lower end on a horizontal transverse rod 58 secured to the main frame, and a coiled spring 59 surrounding said rod and connected at its opposite ends with said supporting arm and a supporting collar 60 adjustably secured to the rod.

After the body web issues from the front side of the feed rollers 16, 17, the same is presented to the mechanism whereby successive body blanks are cut off from the front end of the same and assembled with the covers for forming the collars. In order to reliably hold the front portion of the body web against displacement while the front edge thereof is being cut off and other operations are being performed, a clamping device is provided which holds the body web in place immediately in rear of the cutting line and in front of the feeding rollers 16, 17. This clamping or holding device is preferably constructed as follows:

61 represents a pair of clamping jaws which are arranged lengthwise above the feed table and lower cutter blade on opposite sides of the body web feeding rollers 16, 17 and which are preferably constructed from a single piece of spring steel or other metal and have their front operative ends turned downwardly to form gripping edges or flanges. At their rear ends these jaws are connected with a vertically-rocking bar 62 which is journaled transversely on the adjacent stationary part of the machine and oscillated by means of an upright connecting rod 63 connected at its upper end with an upper rock arm 64 projecting rearwardly from the rocking bar 62 and at its lower end with a lower rock arm 65 projecting rearwardly from the lower part of the frame, and a rotatable cam 66 mounted on the counter-shaft and engaging with the lower rock arm 65. As the high part of the cam 66 engages the lower rock arm 65, the clamping jaws 61 are depressed and caused to bear downwardly upon the body web thereby gripping the latter between said jaws and the lower cutter blade 15, so that the same is positively held against displacement while that portion of the body web in front of the clamping jaws is being operated upon. When the low part of the cam 66 is presented to the lower rock lever 65, the clamping jaws are raised into their inoperative position owing to the preponderating weight of the rock arms and connecting rod which effect this raising of the clamping jaws by gravity although the same may be aided, if desired, by a spring. This operation of the clamping jaws is so timed that the body web is gripped while the feeding mechanism is at rest and released when the feeding mechanism is in operation, thereby insuring control of the body web at all times. By making the clamping jaws of spring metal the throw of the high part of the cam may be slightly in excess of that required for bringing the clamping jaws into engagement with the body web and thereby cause these jaws to be strained or flexed slightly after such engagement, thereby enabling this clamping device to adapt itself to slight variations in the thickness of the body web and reliably hold the same in place without requiring any fine adjustment of the parts and without liability of breaking or straining the same.

At the end of each forward movement of the body web a strip is cut off transversely from the front end or edge of the same to be subsequently associated with a cover strip and box body. The preferred form of mechanism for thus severing a collar body blank or strip from the front end of the body web is constructed as follows:

67 represents a transversely and horizontally movable carriage or slide which is arranged above the lower cutter plate or blade 15 and is guided on the underside of a cross piece 68 on the adjacent stationary part of the frame. 69 represents a circular cutter, blade or disk which is pivoted on the front side of the carriage so as to be capable of rotating in a vertical plane transversely of the machine and which coöperates with the front edge of the lower cutter blade 15 for severing a strip from the front edge or end of the body web which is projected by the feed mechanism in front of the cutting line. The carriage upon which this rotary cutter is pivoted is reciprocated intermittently preferably by means of a vertically-swinging upright rock lever 70 pivoted at its lower end on the main frame at the right hand side thereof and connected at its upper end with the cutter carriage by means of a link 71, a crank-shaft 72 journaled lengthwise on the frame of the machine parallel with the longitudinal shaft 36 and having the crank 73 at its front end connected by a connecting rod 74 with the upright rock lever 70 between its upper and lower ends, and a mutilated master gear wheel 75 secured to the longitudinal shaft 36 and meshing with a corresponding pinion 76 secured to the adjacent part of the crank shaft, said pinion being one-half the size of the master gear wheel and provided on diametrically opposite sides with dwells or locking faces which are adapted to be engaged successively by the concentric dwell face of the master wheel and on opposite sides of said dwells with toothed segments which are adapted to be engaged successively by the toothed segment portion of the master wheel. By this means an intermittent rotary movement is imparted to the crank shaft from the longitudinal shaft 36 which rotates continuously in the same direction, each step of this movement causing the crank shaft 72 to make half a turn and to move the cutter disk 69 alternately from one side to the other of the path of the body web and causing the same to rest momentarily upon reaching the end of the stroke in either direction and before commencing the stroke in the opposite direction. While the cutter disk is at rest at one end of its stroke on one side of the path of the body web, the latter is fed forwardly one step or space and projected beyond the severing line of the cutter disk and blade a distance equal to the width of the collar which is desired on the box. After the body web has been fed forward to this extent by its feeding mechanism and has come to rest, the cutter disk sweeps transversely across the body web and severs a strip from the front end thereof and then comes to rest momentarily on the opposite side of the body web. The latter is now fed forward another step equal to the width of a body strip and after coming to rest the cutter disk returns again to the opposite side of the body web and during this movement severs another strip therefrom. It will be noted that by this operation of the cutter disk, a body strip is cut from the body web during each stroke of the cutter disk in either direction. For the purpose of permitting of adjusting the relation of the two cutters 15, 69, for adapting the same to the particular thickness of the body web and also for taking up wear upon these cutters, the lower cutter blade or plate 15 is mounted on the feed table 13, so that the same is capable of moving horizontally relatively to the upper rotary cutter. This adjustment of the lower cutter 15 is effected preferably by means of horizontal adjusting screws 77 interposed between opposite ends of its rear edge and the adjacent stationary parts of the frame, and after adjustment this blade is held in position by means of clamping screws 78 passing through longitudinal slots in this cutter blade and into the adjacent part of the feed table.

The mechanisms for supplying the cover web, assembling the same with the body web, severing strips from the front end thereof after the same have been attached to the body strip, and folding the front edge of such cover strips around the front edge of the body strip are constructed as follows:

The cover web is preferably supplied from a roll 79 mounted on a drum or mandrel 80 which is supported horizontally on the lower front part of the frame for vertical rotation and the cover web is unwound downwardly from the rear side of this roll. From the rear side of the supply roll the cover web passes downwardly and then upwardly along the front side of the same forming a depending loop below the roll, thence rearwardly in zig-zag fashion alternately with its opposite side in engagement with a front horizontal tension roller 81 and a plurality of rear tension or retarding rods or bars 901, 902, 903, arranged horizontally one behind the other in a longitudinal row, thence rearwardly over the top of the periphery of a glue feeding or delivery roller 82, thence rearwardly over a scraper 83, thence upwardly around an adjusting roller 84 and through a throat or guide way formed between the front end of the body web feed table 13 and a guide bar 85 arranged transversely in front of this table, and thence horizontally forward over the upper edge of this guide bar which latter terminates with its upper edge nearly flush with the upper side of the cutter blade 15. In order to relieve the devices which feed the cover web from the work of unwinding the cover web from its supply roll and thus permit such mechanism to do its work without undue interference, means are provided whereby such unwinding of the cover web is effected independently of this feed device. For this purpose a loop is constantly formed below the cover web supply roll which provides a constant supply of cover web which is free and easily drawn by the feed device past the glue applying mechanism and to the position where the cover web is assembled with the body web and severed into strips. The means shown in the drawings are suitable and preferred for this purpose and comprise a vertically movable pull bar 86 which is arranged horizontally and transversely within the loop of the cover web below its supply roll and supported at one end from the rock shaft 48 by the rock arm 55 which is connected with the spring 54 and at its opposite end by a similar rock arm 87 connected with the rock shaft 48. During each operation of the machine, the pull bar 86 rises and falls by reason of the action of the cam 53 and spring 54 which operate to rock the shaft 48 and as the pull bar descends it engages with the lower end of the loop and draws the same downwardly, thereby causing a sufficient amount of stock to be unwound from the roll of cover web to keep pace with the amount which is cut off from the front end of this web in the formation of the successive cover strips. In passing successively over and underneath the tension roller and bars or rods, a frictional resistance or tension is produced on the cover web which operates to retard the forward movement of the cover web, and causes the same to always remain comparatively taut in passing over the glue applying roller, scraper, adjusting roller and the guide bar 85, and thereby enables these parts to operate properly upon this web. For the purpose of applying a further tensioning and braking effect on the cover web, a presser block 904 is provided which has a belt facing 905 on its underside whereby the same engages with the top of the cover web as the same passes between the bars 901, 903, and which has a weight 906 on its upper side for producing the desired pressure.

As the cover web passes around the tension roller 81 and the several tension rods 901, 902, 903, the same is also guided so as to be held in the proper position laterally for subsequent assembling with the body web. For this purpose two side guides 907, 908 are provided which are capable of lateral adjustment, the left guide 907 being adjustably connected with the adjacent stationary part of the machine by a transverse adjusting screw 909 and slidable on the roller 81 and rods 901, 903 which are held relatively stationary by a bracket 910 connected with one end thereof, and the right hand guide 908 being shifted transversely by connecting the same with the right end of the rod 902 which is slidable in the left guide 907 and adjustably connected therewith by a set screw 911. The lower part of the glue supply roller is immersed in a bath of liquid glue contained in a supply tank or pot 88 below the delivery roller, the glue being retained in a liquid condition of the proper consistency by a heating or warming device of any suitable construction, but preferably by means of a jacket 89 which is arranged adjacent to the lower front side of the glue tank or pot and through which hot water, steam or other heating medium is circulated by any suitable means. As the cover web is drawn rearwardly over the top of the periphery of the glue delivery roller, the latter deposits a coat of glue on the respective side of the cover web and the delivery roller is turned by frictional contact with this web, thereby causing the same to constantly pick up new glue and delivering the same to the following parts of the cover web.

For the purpose of causing a greater or lesser portion of the cover web to engage with the glue delivery roller and thus vary the amount of glue which is picked up by the web from this roller, the web adjusting roller is provided with means whereby the same may be raised or lowered relatively to the scraper which means are also so constructed that the adjusting roller may be lifted clear of the glue pot and delivery roller when access is required to these parts for cleaning, inspection or repairs. The means for this purpose which are preferred comprise a pair of rock arms 90 which are pivoted at their front ends for vertical rotation on opposite sides of the front part of the glue pot and pivotally support the adjusting roller at its opposite ends, a spring 91 connected with one of the rock arms 90 and tending normally to raise the adjusting roller, a hook or catch 92 adapted to engage with a pin or shoulder 93 on one of the adjusting roller arms and hold the latter in its lowered operative position, an elbow lever 92' pivoted on the side of the glue pot and having the hook or catch 92 pivoted on one of its arms, an adjusting rod 94 passing through a lug 95 on the side of the glue pot and pivotally connected at its front end with the other arm of the elbow lever, a spring 96 surrounding the adjusting rod between the lug 95 on the glue pot and a collar 97 on the rod and operating to push the rod forwardly, and a screw nut 98 applied to the threaded rear end of the adjusting rod and engaging with the rear side of the lug 95. Upon turning the screw nut 98 in one direction or the other, the same in coöperation with the spring 96 causes the adjusting rod 94 to be moved either forwardly or backwardly and thus turn the elbow lever 92' so that the adjusting roller 84 is either raised or lowered, thereby enabling the web to be deflected more or less by the scraper and thereby vary the scarfing effect of the latter and leaving a film or coating of glue on the cover web of the desired thickness. When the adjusting roller 84 is to be temporarily raised clear of the glue pot and delivery roller, this may be done quickly and conveniently by disengaging the catch 92 of the elbow lever from the respective arm of the adjusting roller and when the latter is again returned to its operative position the same may be as quickly held in place by reëngaging the catch of the elbow lever with the shoulder or pin on the respective adjusting roller supporting arm.

The surplus glue which is removed by the scraper from the cover web is returned to the pot. In order to permit the scraper to be adjusted so that it is parallel with the web and leaves a film of glue thereon which is of uniform thickness all the way across the web, means are provided for adjusting this scraper relatively to the coated surface of the web. The means preferred consist of a bracket 99 rising from one side of the glue pot and supporting the fixed end of the scraper, a rock lever 100 pivoted on the opposite side of the glue pot and having one of its arms connected with the other movable end of the scraper, a vertical adjusting screw 101 connected at its lower end with the glue pot and passing upwardly through the other arm of the scraper adjusting lever, a spring 102 surrounding the adjusting screw between the top of the glue pot and the underside of the scraper lever and operating to turn the lever, when free, in the direction for lowering the movable end of the scraper, and a screw nut 103 which is applied to the upper threaded end of the adjusting screw and bears against the rear arm of the scraper lever which when tightened causes the scraper lever to be turned in the direction for elevating the movable end of the scraper and move the same toward the coated surface of the cover web, thereby enabling the scraper to be placed in parallelism with the cover web for obtaining a film of glue of uniform thickness throughout its width.

In the present instance it is designed to cover the entire outer face of the collar with ornamental material, and the cover web is made of sufficient width for that purpose. Preferably it is of a width extending from the inner edge of the inside scarfed edge of the body to the extreme opposite edge or slightly beyond the opposite edge, so that when the body blank is folded into a collar the glued scarfed faces of the body blank may be superposed, and the resulting joint concealed and covered by the overlapping covering material. As the described embodiment of the means for forming the collar contemplates the superposition and simultaneous folding of the body blank and the cover blank, a finished joint at the place where the scarfed ends meet is produced by slitting the cover longitudinally from its forward end a sufficient distance from its edge to produce a tongue or tab adapted to bridge the joint, in the present instance the overlapping scarfed joint in the completed collar. When the ends of the cover web and the body web are joined, the tab is not then folded, but only the remaining extended portion of the cover web. After the blank comprising the superposed body and cover portions has been folded into a collar with the scarfed surfaces abutting, the tongue or tab is folded over the edge of the collar and against its inner face, thus not only securing but concealing the joint at the edge of the collar. The preferred mechanism for forming the tab comprises the following:

A bracket 104 is adjustably bolted beneath the cross-piece 13, and a slitter or cutter is pivotally supported thereby in rear of the cover web where it passes the guide bar 85. The slitter or cutter comprises mechanism adapted to slit or cut the cover web at proper intervals so that the cover web, when fed to assembly position with the body web, will present a slitted front edge ahead of the end of the cover web, and preferably adjacent that scarfed edge of the latter which is upwardly presented. The slitting mechanism may be of any suitable construction for the purpose, and in the present embodiment comprises two parallel substantially triangular supporting plates 105, 105, pivotally connected at 106 to the bracket 104, each plate having curved slotted portions 107 within which plays the axle of a rotary slitting knife comprising an edged cutting disk 108, the cutting edge of which projects beyond the margin of the supporting plates. Springs 109 secured at one end to the plates 105 and with their free ends contacting the axle of the edged disk hold said disk yieldingly at one end of the curved slots. Intermittent motion is communicated to the slitting knife by means of a link 110, adjustable in length pivotally joined at one end to the plates 105 and at its other end to one arm 111' of a rock shaft 111 supported at a convenient point transversely of the cross-piece 13. To another arm of the rock shaft 111 in one of a series of holes provided for adjustment is pivoted a connecting rod 112, adjustable in length by means of a turnbuckle and pivotally connected to the arm 51 on the rock shaft 48. As the rock shaft 48 is operated by its cam 41, hereinbefore described, the edged disk 108 is moved at the proper time into contact with the cover web which is then being drawn over the guide bar which now serves as a platen. Said guide bar serves as a backing or support for the cover web, and as the web is drawn along the guide bar by its feeding mechanism, a series of longitudinal alined slits is cut in the web, the length of each slit being determined by the duration of contact between the cutting disk and web while the web is in motion. The springs 109, when the cutter disk 108 is thrown against the cover web, keep the cutter against the web so as to cut and also permit the cutting disk to yield to accommodate different thicknesses of web, and prevent jamming thus stopping its rotation and tearing the web. The cutting disk is so located, and the movement thereof and of the cover web are so timed that the cover web is slit at a substantial distance from that edge which corresponds with the upwardly facing scarfed edge of the body web when the two webs are assembled, as hereinafter described, and the slitting device is preferably so adjusted that each slit will intersect the front end of the body web and extend from a point in advance of the front end of the body web to a point in rear of said edge, the unslitted portion of the cover web between the slits being located at that portion of the web which will correspond to the face of the cover blank, when severed from the web.

As the front end of the cover web passes horizontally forward over the upper edge of the guide bar 85, its glued upper side becomes attached to the under side of the adjacent front edge of the body web and when these two webs come to rest, the front edge of the body web projects forwardly beyond the cutting lines of the cutters 15 and 69 equal to the depth of a box collar and the cover web projects forwardly beyond the front edge of the body web a sufficient distance to provide the width of folding edge which it is desired to fold around the outer edge of the collar and against the inner side of the same, so as to surround this edge the slit of the cover extending across the front edge of the body web and terminating within the margin of the blank or strip to be severed from the body web. It will be noted that the feeding mechanisms of the webs are associated so that the advance end portions of the webs are brought adjacent each other whereby as the body web is severed, a severed edge of the body web will be within the edge of the cover web so that the cover web may be readily folded over said severed edge. While the front edges of the body web and cover web are in this relative assembled position, the front or projecting edge of the cover web between the slit and the farthest edge of the cover web is turned upwardly, rearwardly and downwardly, so as to fold this portion of the cover web around the front edge of the body web and adhesively secure the same to the upper side of the body web across the grooves 9, 10, which side ultimately becomes the inner side of the wall of the collar in the completed box. The mechanism whereby this last-mentioned operation is performed is constructed as follows:

113 represents a bar or jaw which is arranged horizontally and transversely in front of the guide bar 85 and performs the triple functions of a folding bar, pressing jaw or die and a cutter blade in connection with the other parts of the machine. This bar is capable of both a vertical reciprocating and also a horizontal reciprocating movement lengthwise of the machine and is arranged on the upper edge of a guiding and supporting plate 114, so that it overhangs the latter rearwardly. While a previously assembled and completed body strip and cover strip forming a composite collar blank are being carried, or fed forwardly away from the body web and cover web and the latter are being fed forward in position for forming the next collar blank, the combination bar 113 is arranged a considerable distance below the path of the front edge of the cover web and separated therefrom by an intervening space, so as to avoid interference with the devices which carry away the completed and assembled body strip and cover strip and advance the cover web. After the body web and cover web have been advanced into the relative position for severing the cover strip from the cover web, the combination bar rises into the position in which it engages with the under side of the front edge of the cover web with its rear side vertically in line with the front edge of the body web, at which time the cover associated with the previous body is severed from the cover web by means which will be more fully described hereinafter. After the upper side of the combination bar thus engages its upper side with the under side of the front edge of the cover web, it continues its upward movement until its under side is in line with the upper side of the body web, whereby the projecting main front end of the cover web is turned upwardly at right angles to the adjacent body portion of the cover web. The combination bar is now moved horizontally rearward, so that it folds or turns the main front edge of the cover web backwardly and downwardly over the upper side of the body web. While in this position, a coöperative die, presser bar, plate or jaw 115 rises with its upper side or face into engagement with the under side of the front portion of the cover web and body web vertically in line with the upper combination bar and causes the folded portions of the cover web and the front edge of the body web within the folded portion of the cover web to be firmly pressed together and insure a reliable connection between these parts by means of the adhesive previously applied thereto. This last-mentioned lower presser bar also has a combined vertically reciprocating motion and a horizontally reciprocating motion lengthwise of the machine.

As at this stage in the operation of the machine it is not designed to fold the "tab" or "tongue" of the cover web, the combination bar 113 at its folding edge does not extend across the slit onto the tongue, but terminates, as at 116, short of the slit in the cover web so that as it moves to fold the front edge of the cover web in the manner hereinbefore described, the main portion only of the edge of the binder web is folded, leaving the "tongue" or "tab" unfolded. To prevent the plate 114 from contacting with the tongue in the folding operation, it is provided with a preferably rectangular opening 117 therethrough sufficiently wide to clear the sides of the "tab" and the upper and lower walls of which are spaced a sufficient distance apart to permit the up and down movements of the plate and the combination bar without folding the tab, but allowing the tab to extend freely therethrough in all positions of this part. While the front edge of the combination bar 113 terminates short of the tab, said bar at its base portion is continued across the tab and preferably a short distance beyond the sides of the webs, as at 118, the end of the extension having an inclined or curved surface 119, the extended portion of the bar serving as a support for the cover web in the subsequent operation of severing the cover web, as will be hereinafter explained.

The presser bar 115 rests beneath the combination bar, with its upper face sufficiently below the same not to fold the tab in the folding operation. Preferably the upper surface of the presser bar 115 in its lowest position is substantially flush with the lower wall of the opening 117.

It will thus be seen that as the combination bar and the presser bar operate to fold the main portion of the extended end of the cover web over the end of the body web and press the same together, the tab is not folded, but remains as a freely extending portion of the cover web. It will be observed, however, that the lower face of the projecting portion 118 of the combination bar cooperates with the portion of the body web within the width of the tab to support the body and the cover webs and slightly press the same within said width, so that the cover web is securely joined to the body at the base of the tab.

After the folding of the cover web around the front edge of the body web and the pressing together of the same has been completed in the manner described, the lower presser bar first descends so as to release the assembled ends of the webs and then the two bars 113, 115 are first moved horizontally forward together so as to clear the front edges of the assembled body web and cover web and also, substantially, the tab, and then are lowered into the position shown in Fig. 37, preparatory to the next folding and pressing operation.

The mechanism whereby the upper and lower bars 113, 115 are raised and lowered and moved horizontally forward and backward in the manner described, is constructed as follows:

120 represents two upright supporting bars which are secured at their upper ends to opposite ends of the lower pressing bar 115 and which engage on their lateral outer sides with guide faces or ways 121 formed on the adjacent stationary part of the machine and operating to control the movement of these bars relatively to the length of the frame, and confine them against lateral movement. At their lower ends these supporting bars are pivoted on the front ends of two vertically swinging horizontal rock arms 122 which are secured at their rear ends to a horizontal rock shaft 123 journaled transversely in the lower rear part of the machine. At its outer end the rock shaft 123 is provided with a depending rock arm 124 which is engaged by a rotary cam 125 on the adjacent part of the lower countershaft. When the salient or high part of the cam 125 engages with the rock arm 124, the supporting arms 122 and the parts connected therewith are raised and as this cam presents its low part to the rock arm 124, the supporting bars 120 and associated parts are lowered by gravity. The backward movement of the supporting bars and the upper and lower clamping bars 113, 115 is effected by means of springs 126 each connecting one of the supporting bars with the adjacent stationary part of the frame, but this movement of the parts is controlled by means of a vertically-turning cam 127 arranged in front of the lower part of the guide bar 85 and engaging with the rear side of the lower clamping bar 115. This cam is operated by means of a horizontal rock shaft 128 journaled transversely in suitable bearings on the frame and carrying the cam 127, an upright connecting rod 129 connected at its upper end with a rearwardly-projecting arm 130 on the rock shaft 128, while its lower end is connected with a vertically-swinging transverse rock arm 131 and a cam 132 secured to the longitudinal shaft 36 and engaging with the rock arm 131. When the high part of the cam 132 engages with the rock arm 131, the cam 127 is turned into the position shown in Figs. 10, 37–39, in which the clamping bars 113, 115 are moved into their foremost position. As the cam 132 presents its low face to the rock arm 131, the cam 127 is caused to recede under the pull of the spring 126 and thereby permit the bars 113, 115 to move into their rearward position, as indicated in Figs. 40 and 41. The upper or combination bar 113 is guided upon the lower pressing bar, so as to be compelled to move forwardly and backwardly therewith in the machine but capable of vertical movement independently thereof, this connection being preferably effected by means of guide screws 133 secured to the front side of the lower pressing bar and passing through vertical slots 134 in the guide plate 114 of the upper bar, as shown in Figs. 12, 37 to 41. The upper or combination bar 113 is yieldingly held in its elevated position in which it is separated from the lower presser bar by means of springs 135 engaging at one of their ends with shoulders, collars or nuts 136 on guide rods 137 depending from the lower side of the guide plate 114 and at their opposite ends with brackets 138 on the supporting bars in which the lower ends of the guide rods 137 slide vertically. The upward movement of the combination bar is limited by engagement of the lower ends of its slots 134 with the under side of the guide screws 133. The upper and lower bars 113, 115 remain in this separated position while the upper bar or jaw is effecting the upward turning of the front edge of the cover web, as indicated in Fig. 39, and while these two jaws or bars are moved rearwardly and the upper bar turns the edge of the cover web horizontally against the upper side of the body web, as shown in Fig. 40. When the upper bar has reached this uppermost position, further upward movement thereof independently of the lower pressing bar is prevented by means of a stop device coöperating with a stationary part of the machine, which stop device preferably consists of adjustable screw nuts 139 arranged on threaded portions of the guide rods 137 and adapted to engage with the under sides of stops 140 arranged on the adjacent part of the main frame, as shown in Figs. 40 and 41. After the upper folding and pressing bar or jaw 113 has been moved rearwardly into the position shown in Fig. 40 and is held against upward movement by engagement of its stops 139 engaging with the stops 140 of the frame, the lower presser bar 115 rises under the action of the cam 125 independently of the upper bar 113, as shown in Fig. 40, for pressing the assembled front edges of the body web and cover web and during this movement of the lower presser bar, the springs 135 are compressed and the guide screws 133 slide upwardly in the slots of the guide plate 114 which carry the upper or combination bar. During the initial portion of the subsequent downward movement of the lower presser bar, the same moves independently of the combination bar until the guide screws 133 engage with the lower ends of the slots 134 in the guide plate 114, then the combination bar and lower presser bar are moved forwardly together under the action of the cam 127 so as to clear the front ends of the assembled body web and cover web and then the combination bar and lower presser bar are lowered together by the action of the cam 125 into the position shown in Fig. 37 preparatory to beginning the next cycle of operations.

After the main portion of the front end of the cover web has been folded or turned over the front edge of the body web in the manner described, the front edges of these webs are grasped by the grippers of a carrying or transferring device, as shown in Fig. 33, and after being thus engaged by the grippers, the latter remain at rest a sufficient length of time to permit the upper rotary cutter 69 to pass transversely across the body web in rear of the cover web, as shown in Fig. 37, and sever a body strip from the body web, which strip has been previously adhesively connected with the cover web in the manner heretofore described. After the body strip or section has been thus severed from the body web, the transferring or carrying device which still grasps the strip and cover web moves these parts forwardly simultaneously relative to the place at which they were assembled, so as to cause a different portion of the cover web to be disposed in said assembly position, and until the rear edge of the body strip is arranged over the combination bar 113 and at the same time the body web is moved forward by its feeding mechanism but to a lesser extent than the cover web and the body strip connected therewith, the extent of this forward movement of the body web being such that its front end overlaps the glue-coated upper horizontal portion of the cover web in rear of the combination bar and the front end of the body web becomes adhesively connected with the cover web. When the cover web and the body strip reach the end of this forward step, the rear edge of the body strip is separated from the front edge of the body web by an intervening gap or space which is bridged by the slitted unsevered portion of the cover web between the same, as shown in Fig. 34. In this position of these parts, that portion of the cover web between the body strip and body web is severed on a transverse line, in the present instance, flush, or substantially so, with the rear edge of the body strip, providing a cover strip, blank or section of the cover web, the mechanism for this purpose comprising an upper cutter 141 which is adapted to engage with the upper surface of the presser or combination bar 113, which latter at this time forms a companion lower cutter member. The latter is provided on its upper side adjacent to its front corner or edge with a horizontal transverse surface 142, and the former, having peferably the form of a rotatable disk or circular blade, is adapted to engage and reciprocate horizontally and transversely thereacross with its lower edge and sever the cover web extending across the same. The upper cover cutter 141 is pivoted on a transversely-reciprocating carriage 143 which is guided in a way on the front side of the cross piece 68 and is actuated by means of an upright rock lever 144 pivoted at its lower end on the right hand side of the main frame and connected at its upper end by a connecting rod 145 with the cover cutter carriage 143, as shown in Fig. 12, a longitudinal crank shaft 146 journaled in the main frame parallel with the longitudinal shaft 36 on the side opposite the crank shaft 72 and having its crank 147 connected by a connecting rod 148 with the rock lever 144 between its upper and lower end, and means for imparting an intermittently rotating movement from the central longitudinal shaft 36 to the crank shaft 146, which means are best shown in Figs. 14 and 15, and which consist of the mutilated master gear wheel 75 mounted on the central longitudinal shaft 36 and engaging with a corresponding pinion 149 which is one-half the size of the master gear wheel 75 and which is provided on diametrically opposite sides with dwell faces which are adapted to engage with the concentric face of the master gear wheel and between said dwell faces with segmental gear portions which are adapted to be engaged successively by the gear portion of the master wheel, in the same manner in which the latter coöperates with the mutilated gear pinion 76 which reciprocates the cutter disk of the flange web cutter mechanism. The operation of the master gear wheel and pinion 149 is such that the latter is first turned one-half a revolution for carrying the cover web cutting disk across the cover web for severing the same and then remains at rest so that the cover web cutting disk 141 is retained on one side of this web a sufficient length of time to permit the same to be fed forward an extent equal to the width of another cover strip, then the pinion 149 is turned another half a revolution so as to carry the web-cutting disk transversely across this web to the other side thereof for severing another cover strip, this operation being repeated continuously while the machine is at work. The relative timing of the mechanism which shifts the body cutting disk and the cover cutting disk is such, in the present embodiment, that the body web cutting disk is first moved across the path of the body web after the transferring device has taken hold of the front edges of the assembled body web and cover web, as shown in Fig. 37, and after the severed body blank and cover have been moved forwardly to form a gap between this blank and the body web, then the cover cutter also moves transversely across the cover web, as shown in Fig. 38, in the same direction in which the body cutting disk has just moved, and then the body web cutting disk and cover web cutting disk return one after the other to the opposite side of the body web and cover web for cutting the next following strips from these webs, these operations being repeated continuously while the machine is at work.

In order to relieve the cover cutter from undue wear and to accommodate a cover of uneven thickness, or covers of different thicknesses, the cutter disk 141 is yieldingly connected to the carriage 143. Accordingly said cutter disk is mounted at the lower end of a plate 150, adapted to slide up and down in a recess in the face of the carriage 143, and yieldingly held down by a spring 151, mounted on a pin 152, and engaging freely the upper side of a pin 153 on the plate 150. Preferably, the edges of the recess which receive the plate 150 are undercut and the edges of the plate are beveled to engage therewith to retain the plate in relative position, one edge of the recess being formed by the undercut removable block 154, to enable the parts to be readily assembled. A pin 155 on the plate engages a slot 156 in the carriage to limit the downward movement of the plate and prevent the same from leaving the carriage when the cutter is to one side of and off the bar 113. The lateral edge of the combination bar is inclined or curved, as at 119, as before stated, to provide an easy passage for the cutter to and from the surface of the bar.

The transferring device which grasps the front edge of the cover and the body assembled therewith and moves the same forwardly is the sole means for advancing the cover web step by step and presenting its front end successively to the mechanism which assembles the same with the body web and severs a strip therefrom.

The preferred form of this transferring mechanism is constructed as follows:

In front of the cover cutting mechanism two transfer grippers are arranged side by side, each of which comprises a relatively stationary upper jaw 157, and a lower jaw 158 which is movable vertically toward and from the upper jaw. Each of the upper jaws is formed on or secured to the lower ends of the members of a bifurcated upright rock lever or arm 159 which swings in a vertical plane and is secured at its upper end to a horizontal rock shaft 160 journaled transversely in bearings on the adjacent upper part of the frame. This shaft is moved in the direction for carrying the gripper arms from the web cutters forwardly by means of an upright connecting rod 161 which is connected at its upper end with a rearwardly projecting rock arm 162 on the rock shaft 160 while its lower end is connected with one arm of an elbow lever 163 separated by a cam 164 secured to the lower countershaft and engaging with the other arm of the elbow lever 163. The return movement of the rock shaft 160 whereby the gripper arms are moved rearwardly or toward the web cutting mechanism is effected by means of a spring 165 which is preferably connected with the elbow lever 163 and the adjacent part of the main frame. The lower jaw 158 of each transfer gripper moves with the upper jaw toward and from the web cutters and is also capable of moving vertically toward and from its companion stationary jaw, for which purpose the lower gripper jaw is preferably provided on its front edge with an upwardly-projecting flange 166, which moves in vertical slots 167 formed on the adjacent lower parts of the respective gripper arm. Each of the lower gripper jaws is yieldingly held in its elevated or closed position by means of a pair of upright tension rods 168 arranged on opposite sides of the respective gripper arm and connected at their lower ends with opposite sides of the upright flange 166 of the lower gripper jaw, while their upper ends pass through transverse openings in the rock shaft 160, and coiled springs 169 each surrounding the upper end of one of said tension rods and bearing with its lower end against the upper side of said rock shaft, while its upper end bears against a nut or shoulder 170 arranged at the upper end of the respective tension rod. The downward movement of each lower gripper jaw for opening the gripper is effected by means of a horizontal transverse rock shaft 171 which is journaled parallel to the rock shaft 160 in bearings carried by the latter on one side of its center, rock arms 172 secured to the gripper opening shaft 171 and each connected with one of the tension rods 168, an upright connecting rod 173 connected at its upper end with a rock arm 174 at one end of the gripper opening shaft, and at its lower end with one arm of an elbow lever 175, and a cam 176 secured to the central longitudinal shaft 36 and engaging with the other arm of the elbow lever 175. When the cam 176 engages its high face with the elbow lever 175, the gripper opening shaft 171 is turned in the direction for moving the lower jaws of the grippers downwardly and when the low part or face of said cam is presented to said elbow lever, the springs 169 operate to raise the lower gripper jaws into their closed position and also turn the gripper opening shaft in the reverse direction. The mechanism for shifting the grippers bodily toward and from the web cutters and also opening and closing the same is so timed that when the transfer grippers are moved rearwardly the jaws thereof are opened so as to permit the same to receive the front edge of the cover web and body web between them in the rearmost position of these grippers and after the jaws of the grippers have been thus shifted into a position above and below the body web and cover web, the lower jaws of the grippers are caused to rise so as to grip the body web and cover web between the gripper jaws under the action of the springs 169. The transfer grippers are thus retained in their closed positions while effecting the first step of their forward movement so that the cover web and the severed body strip are carried forwardly therewith in position for severing the cover web at the rear of the severed body strip.

The glue for securing together the scarfed ends of the collar is applied to the same, preferably before the body strip is cut from the body web, and the means for this purpose shown in the drawings is so organized that the glue for adhesively securing these scarfed portions of the body strip is applied to that scarfed edge of the same which faces inwardly in the finished condition of the box and which is arranged at the left hand side of the body web while the same is arranged within the machine. This scarf gluing mechanism is preferably constructed as follows:

177 represents a glue supply pot or tank arranged on a stationary part of the machine adjacent to the left hand side of the path of the body web transversely in line with the front end of the same. The glue within this pot is preferably retained in a liquid condition by means of a jacket 178 arranged below the pot and through which hot water, steam or other heating medium is circulated for heating the glue and maintaining the same of the proper consistency. Within this glue pot is arranged a glue supply roller or wheel 179 which is mounted so as to turn vertically in a direction transversely of the machine and dip with its lower part in the bath of glue within the pot. This glue supply roller is rotated so as to stir up the glue within the pot and also for constantly bringing a fresh supply of glue to the top of the roller by means of a longitudinal shaft 180 journaled in bearings on the adjacent stationary part of the machine, and provided at its front end with a pinion 181 which meshes with a gear rim 182 on the rear part of the glue supply wheel, and a cross belt 183 passing around pulleys 184, 185 arranged on the lower countershaft and the rear end of the longitudinal shaft 180, respectively.

186 indicates a glue delivery roller engaging with its under side against the periphery of the glue supply roller and secured to the shaft 180 from which the same is driven by the gears 181, 182. As the glue supply and delivery rollers are rotated in contact with or close to each other the supply roller lifts the glue from the pot to the upper side of this roller, where the surplus is squeezed off and caused to run back into the pot by the delivery roller leaving only a thin film of glue adhering to the periphery of the delivery roller.

187 represents a dauber whereby glue is successively transferred from the upper part of the delivery roller to the scarfed surface of the body web on the upper side of its left edge and at the front end thereof preparatory to cutting off this end of the body web to form a body strip or blank. This dauber is mounted on the outer arm 188 of a vertically-swinging dauber rock lever, which is pivoted in a transverse position on the left end of the carriage which supports the body cutting disk, while its other arm 189 is provided with a roller or bearing member 190 which engages with the under side of a cam rail or track 191 arranged transversely of the machine and lengthwise on the under side of the cross piece 68. The dauber lever is yieldingly turned in the direction for engaging its roller 190 with the cam track by means of a spring 192, although the preponderating weight of the outer arm of this lever and the dauber mounted thereon will tend to keep the same in this position. The cam rail is provided on its outer portion with a low horizontal straight face 193 and on its inner portion with a notched recess or high face 194. While the body cutter carriage is at the left end of its stroke, the dauber is arranged toward the left of the glue delivery roller and the cam roller of the inner arm of the dauber lever engages with the low horizontal face of the cam rail. As the body cutter carriage moves toward the right, the dauber is moved with its lower part over the upper part of the periphery of the glue delivery roller and removes glue from the latter. While the dauber is moving inwardly over the glue delivery roller and toward the respective edge of the body web, the same is held in an elevated position out of contact with the parts of the machine below its path by the lower straight face of the cam rail until the dauber reaches the end of its movement toward the right, at which point the roller 190 on the dauber lever stands opposite the high face or recess 194 of the cam rail and is caused to rise under the action of the spring 192 and the weight of the dauber, thereby causing the latter to descend and deposit the glue carried by its under side upon the scarfed left edge of the body web adjacent to its front end, the relative timing and movement of the parts being so determined that the dauber reaches the end of its motion toward the right and is dropped when the same is vertically in line with this edge of the body web. While the dauber is thus in its lowered position in engagement with the left edge of the body web, the latter is moved forwardly by its feeding mechanism, so that such a portion of the scarfed edge of the body web is coated with glue by the dauber, equal the width of two body strips which are subsequently cut successively from the body web. By this means only one operation of the scarf-gluing mechanism is required for supplying the necessary glue for the scarfed joints of two body strips. During the initial portion of the movement of the body cutter carriage from right to left, the roller 190 of the dauber lever again engages the low straight face of the cam rail so as to lift the dauber clear of the adjacent lower parts of the machine and in position to sweep over the top of the glue delivery roller during the last portion of the movement in this direction. By thus holding the dauber clear of the adjacent lower parts of the machine, and only moving the same toward and from the scarfed edge of the body web, smearing of the machine with glue is avoided which otherwise would necessitate frequent cleaning thereof and also involve unnecessary waste of glue. The dauber is preferably constructed in the form of a circular body or roller 195 which is provided on its periphery with a plurality of brushes or fingers 196, any one of which may be brought into the operative position on the lower side of the dauber by turning the dauber on the outer arm of the dauber lever, for which purpose the dauber is pivotally secured upon this arm by means of a clamping screw 197, which latter, when loosened, permits the dauber to be turned to the required position, and when tightened, holds the dauber reliably in its adjusted position. By thus providing the dauber with a plurality of brushes or fingers, a finger or brush which becomes worn or excessively covered with accumulated glue can be quickly replaced by another finger without interrupting the operation of the machine. The dauber is preferably made of rubber in the form shown, but if desired, the same may be made of other material and of any other suitable form. For the purpose of permitting the dauber to be adjusted accurately relatively to the position of the scarfed left edge of the body web, the outer arm 188 of the dauber lever is made in sections which are adjustably connected by a slot and bolt connection 198, and whereby this arm may be shortened or lengthened as required to permit the dauber thereon to properly apply the glue for the scarfed joint of the body strips. For the purpose of increasing or decreasing the amount of glue which is supplied to the dauber, the glue supply roller is made vertically adjustable relatively to the glue delivery roller, the means for this purpose which are shown in the drawings being preferred and consisting of two vertically swinging adjusting levers 199 pivoted on the upper part of the scarf glue pot and carrying a horizontal rod or pin 200 on their lower arms upon which the glue delivery roller is journaled, a cross bar 201 engaging with the under side of the upper arms of the adjusting levers, two adjusting screws 202 arranged in threaded openings on the adjacent upper part of the glue pot and engaging with the upper sides of the upper arms of the adjusting levers, and an adjusting screw 203 turning loosely in an opening in the upper part of the scarf glue pot and engaging its threaded part in a threaded opening in the cross bar. Upon tightening the screws 202 and loosening the screw 203, the adjusting levers are turned so as to raise the glue supplying roller toward the delivery roller, thereby reducing the amount of glue which is delivered, while upon reversing this movement of the screws the rollers are separated and more glue is delivered.

Upon being carried forward by the transferring mechanism the body blank or strip and the cover strip are held by the jaws in the path of a former, around which the assembled body strip and cover strip, or collar blank, is folded and its scarfed ends joined to produce a continuous rectangular collar. The mechanism whereby the collar blanks are supported and carried during these folding operations is preferably constructed as follows:

An upper horizontal countershaft 204 is journaled in bearings on the adjacent part of the frame and is driven from the lower countershaft 41 by means of a chain belt 205 passing around sprocket wheels 206, 206' secured respectively to the lower and upper countershafts.

In front of the body and cover is arranged a form carrier which is rotatable in a vertical plane parallel with the length of the machine and which preferably consists of a hub 204' having a plurality of radial arms 205', four of the latter being preferably employed and arranged equidistant about the hub. This carrier is secured with its hub to a horizontal shaft 206' which is journaled transversely in a bearing on the adjacent part of the main frame and is rotated intermittently with the form carrier and associated parts by any suitable mechanism, so that it comes to rest at intervals with one of its arms projecting horizontally rearward toward the body and cover assembling mechanism, another projecting vertically downward toward the mechanism whereby the cover and the body are folded, and another projecting horizontally forward into the proper position relatively to the mechanism which applies the box body to the collar. The preferred mechanism for effecting this intermittent rotary movement of the form carrier comprises a mutilated pinion 207 mounted on the upper countershaft and provided on one-half of its periphery with gear teeth while the remaining half is plain and concentric, and a mutilated gear wheel 208 secured to the outer end of the rotatable carrier shaft and provided equidistant on its periphery with four toothed segments or sections which are adapted to be engaged successively by the toothed portion of the pinion 207 and four locking faces alternating with the toothed sections and adapted to be engaged successively by the plain concentric locking face of the pinion, the relative size and construction of this pinion and gear wheel being such that the gear wheel is turned one-quarter of a rotation by the pinion during each complete rotation of the latter and the rotatable carrier is held at rest after each quarter step forward to permit of performing the successive operations of securing thereto the previously assembled body and cover, folding them into a collar, and assembling the collar and the box body in the manner to be hereinafter described.

An additional locking mechanism is preferably provided for holding the form carrier accurately in place while at rest, which mechanism preferably consists of a locking lever 209 pivoted on the frame and provided on one of its arms with a pawl 210 which is adapted to engage with the teeth of the mutilated gear wheel 208 and a locking cam 211, formed on or secured to the mutilated pinion 207 and engaging with the other arm of the locking lever. The cam 211 is so formed that it turns the locking lever and disengages its pawl from the teeth of the gear wheel 208 just before the latter begins each step of its movement and again engages said pawl with said wheel after the same has completed each step.

At its outer end each carrier arm is provided with a form, former, mandrel or block 212 which is preferably of rectangular shape and upon which the assembled body and cover are folded into a collar. As will be seen, the collar blanks are preferably so disposed on their formers as to be folded in a plane parallel to the severed edge of the body blank.

Each former comprises a rectangular block, the sides of which are plane and of such a length as to receive the sections of the collar blank between the scores, with the corners of the former corresponding to the scored portions when the blank is folded around the former. At the base of the two lateral and the rear sides of the former is a flange 213, serving as a stop against which the collar blank impinges, and the rear side of the former has a recess 213' opening into the bottom of the former, for a purpose hereinafter apparent.

At 214 is represented a front jaw arranged transversely at the front edge of each former, and mounted on the outer end of a rock lever 215 which is pivoted on the adjacent part of the respective carrier arm, so as to be capable of turning in a vertical plane on an axis parallel with that of the rotatable form carrier. Upon rocking the lever 215, the front jaw is moved toward and from the front side of the former, and motion is communicated to this jaw by means of a transverse rock shaft 216 journaled in a bearing in the adjacent part of the respective carrier arm and provided with a gear segment 217 which meshes with a gear segment 218 on the inner arm of the rock lever 215, and a rock arm 219 secured to the right hand end of the rock shaft 216 and engaging with a cam 220, as hereinafter described. As the carrier rotates and a former approaches the horizontal position corresponding to the assembly mechanism of the body and cover, the jaw 215 is held away from the face of the former by the cam 220, and when the assembled body strip and cover strip have been moved into their proper position relative to the former, the jaw 214 is drawn toward the former by the spring 221, thus clamping the assembled body and cover to the former, and the jaw 214 remains in clamping position during the subsequent operation of folding the blank around the former and folding the "tab" over the edge of the collar, being released prior to the arrival of the respective former with the collar in the position at which the box body is applied to the collar.

Supported at the rear portion of each former is the mechanism for folding the tongue or tab of the cover over the edge of the scarfed joint of the collar. From the previous description it will be observed that the severed collar blank is provided opposite one of its scarfed edges with an extending tongue or tab forming an unfolded portion of the cover. When the collar blanks are clamped to the respective formers by the jaws 214, they are moved by the carrier devices to mechanism which folds the blank around the sides of the former and causes the scarfed ends of the blank to overlap at approximately the central portion of the rear face of the former, as will be hereinafter described. In this folded position the tab projects upwardly from the collar blank. In order to fold the "tab" over the scarfed joint of the collar and fasten the folded tab securely to the inside of the collar, the carrier is provided at the rear portion of each arm with a folding and pressing device. Journaled at the rear portion of each carrier arm is a rock shaft 222 extending parallel with the axis of the carrier. This shaft is provided with an outwardly extending arm 223 having an opening or slot 224 therethrough, said arm being located in approximately the same vertical plane as that assumed by the scarfed ends of the collar blank when said ends are overlapped in the formation of the collar. 225 represents a central rear clamping or presser jaw which is mounted on the outer end of an arm 226 capable of swinging in a vertical plane for carrying the jaw thereof toward and from the rear side of the central portion of the former opposite which the scarf joint of the collar is located. The arm 226 comprises a bifurcated portion, the sections or arms of which extend on opposite sides of the arm 223 and are journaled on the rock shaft 222. The end portion of the arm 223 is provided with an adjusting screw 227 extending therethrough and adapted to contact a shoulder 228 on the arm 226, the arm 223 and the arm 226 being connected by a spring 229 which retains the shoulder 228 and the adjusting screw in contact. By manipulating the screw the relative position of these two parts may be determined for a purpose which will hereinafter appear. Pivoted in the slot or opening 224 of the arm 223 eccentrically of the presser jaw is an outwardly extending folding finger 230 adapted to be positioned intermediate the presser jaw 225 and the former 212 and in vertical alinement with the position assumed by the tab and the scarfed joint of the collar when folded around the former 212. The finger 230 has a short extension 231 on the opposite side of its pivot and this extension is connected by a light spring 232 to a fixed portion of the carrier, and the connecting point between the finger 230 and the spring 232 is so located that said spring will tend to separate the outer end of the folding finger 230 from the presser jaw 225. The spring 229 attached to the presser arm 226 also assists in accomplishing this latter result. The shaft 222 is provided with a stop to limit the extent of the movement of the finger 230 under the influence of the spring 232, said stop being shown at 233 as a part of the arm 223. The folding device thus described is operated through the shaft 222 by means of an arm 234 having a roller 235 engaging the cam 236, hereinafter described. The shaft 222 is so situated with respect to the former and the jaw 225 and finger 230 are so located that as the jaw and finger are moved from their remote position toward the former 212 the outer end of the folding finger 230 strikes the tab and passes across the edge of the scarfed joint of the collar, wiping the tab thereover and folding the same into the recess in the former and against the inside of the collar. The outer face of that portion of the finger 230 which enters the recess in the former when in position in the recess, is designed to be flush with the outer face of the former and to practically fill the recess and be continuous therewith. In order to permit the presser jaw 225 to adapt its flat face to the flat surface of the overlapping rear collar sections, this jaw is mounted loosely on its arm, preferably by pivoting the same vertically thereto. As the finger 230 folds the tab across the collar and against the inside thereof the jaw on the end of the arm 226 is carried against the collar opposite the scarfed joint, and the folded tab and the scarfed ends of the body blank are pressed and squeezed together to securely hold them in position. In order to adjust the ultimate position of the face of the jaw 225 with relation to the joint in the pressing and squeezing operation, the adjusting screw 227 may be operated in an obvious manner. It is designed to operate the folding mechanism just described by means of the cam 236, and the shaft 222 is provided with an arm 237 connected by a comparatively strong spring 238 to a fixed point of the carrier. It will be observed that the spring is so situated with respect to the frame and the shaft as to form a resilient device or means for moving the folding fingers toward the former, their movement in the opposite direction being positively accomplished by the cam 236, as will hereinafter appear.

The folding finger and jaw are held in their squeezing or pressing position while the former moves toward the point where the box body is applied, the time being sufficient to set the glue and obtain a secure joint, and just before the box body is applied, the fingers are separated and withdrawn by another operating portion of the cam and against the resistance of the spring 238.

The cam mechanism for operating the clamping jaws 214 and the folding fingers 230 and jaws 225 may be of any suitable construction, but is preferably constructed and operated as follows:

Rotatably mounted on the shaft 206, at the right hand side of the carrier, are the two cams 220 and 236. Preferably these cams are secured together side by side, the cam 220 having two concentric portions 239 and 240, joined by inclined portions 241 and 242, and the cam 236 having also two concentric portions 243 and 244 joined by inclined portions 245 and 246. These cams are designed to give the proper motion to the jaws which clamp the collar blank to the former, and to the presser jaws and folding fingers which fold the tabs and press the scarfed joints of the collars, it being understood that in this embodiment positive motion to clamp and fold is produced by the springs hereinbefore referred to, the cams being constructed and operated to permit movement of the said several parts under the influence of the springs, and to positively operate said parts in the direction to withdraw the same at proper times. A rotary intermittent reciprocatory movement in a comparatively small arc is communicated to the cams 220 and 236 by means of a cam 247 on the shaft 204, through a rock lever 248 and a connecting rod 249 pivotally connected to lever 248 and an arm 250 secured to the cams. In order that the operation of these cams may be clearly understood, let it be assumed that a former has been moved to position opposite the assembly mechanism, and that a collar blank has just been transferred to place on the front side of the former at that point. The clamping jaw 214 will then be open, the concentric portion 239 of the cam 220 being then operating on the clamping jaw. With the collar in this position, the cam roller of the jaw 214 is just at the outer end of the incline 242 of the cam. The cam is now rotated a short distance to carry the incline 242 clockwise, and the spring 221 will close the jaw, the cam roller thereof following the incline under the influence of the spring 221. The collar blank being thus clamped to the former, the grippers 157, 158 are opened and move rearwardly to release the blank. The former is now moved to its lowermost stationary position, where the collar is folded therearound, the jaw 214 being held in clamping position on account of the concentric portion 240 of the cam 220. The concentric portion 240 also permits the cam to then move anti-clockwise without affecting the clamping jaw 214, and this movement is made prior to the time when the former reaches its lowermost position, in order to "set" the incline 242, to effect the next clamping operation at the assembly position, and also in order to "set" the incline 246 of the cam 236 to effect the folding of the tab.

When the former 212 carrying the blank reaches its lowest position, the collar is folded therearound, by devices hereinafter described, and after the collar is folded, the cams are again rotated clockwise as before. At this time, however, the cam roller of the folding finger and the presser jaw of the collar carrying former is just at the outer end of the incline 246, and the described movement of the cams will carry the incline 246 in line with said roller, thus enabling the spring 238 to move the folding finger and pressing jaw to fold the tab around the edge of the collar and press the folded parts and the scarfed joint. The former now makes another movement, carrying the folded and jointed collar to the front horizontal box body applying position. While so moving and while the cam rollers of the clamping jaw 214 and the presser jaw are on the concentric portions of the cams, the cams are again moved anti-clockwise to set the inclines 242 and 246, for succeeding operations. Just before the former carrying the now folded and pressed collar reaches the front horizontal position, the cam roller of the clamping jaw 214 rolls up the incline 241 of the now stationary cam 220, thus releasing said jaw and moving it away from the face of the former, and at approximately the same time the cam roller of the folding and pressing device rolls along the incline 245 to release the folding and pressing device. In the present embodiment the latter movement is only partially accomplished by the cam at this time, the complete removal of the folding and pressing device being effected as soon as the cam 236 makes another clockwise movement, thus carrying the concentric portion 243 in line with the roller. The concentric surfaces and the inclines of the respective cams are so proportioned and positioned, and the respective cams are so located relatively to each other, that clamping, folding and pressing, and releasing operations are practically simultaneously performed, though on different formers and collars.

As the former moves from the collar blank receiving position at the rear of the form carrier, the body and cover are still in their straight condition and project with their opposite ends horizontally from opposite sides of the former and the head carried thereby, as shown by dotted lines in Fig. 48. As this former approaches the lowermost position of the form carrier, a preliminary folding or bending of opposite ends of the collar blank against opposite ends of the former is effected, and after the former reaches the lowermost position and comes to rest, the bending or folding of the collar blank around the former is completed. The mechanism whereby these operations are performed is preferably constructed as follows:

251 represents a pair of folding horns or deflecting fingers which are arranged on opposite sides of the path of the end portions of the collar blank in advance of the position where the former comes to rest for completing the folding of the collar. These horns or fingers are secured at their lower ends to the adjacent stationary part of the machine and are provided on opposing sides with inclined faces which converge downwardly so that the ends of the collar blank upon sweeping downwardly and forwardly past these fingers, engage with the inclined edges of the fingers and are turned into a position in which they project rearwardly on opposite sides of the respective former and substantially parallel relatively to each other. The turning or bending of the collar blank at this time takes place on the front scores 10, 10 of the body blank and when thus bent the intermediate body sections (those between the scores 9 and 10) and the adjacent parts of the cover are arranged opposite the lateral sides of the former. After the former comes to rest in its lower horizontal position, the folding of the intermediate sections of the collar blank against opposite lateral sides of the former is completed, so that these portions or sections of the collar blank are parallel and at right angles to the central or front body section. The mechanism whereby this is accomplished consists of two side pressing or clamping jaws 252, 252 which are movable horizontally toward and from opposite lateral sides of the former when the latter is in position between the same, a pair of horizontally swinging rock arms 253 upon the free ends of which the clamping and pressing jaws are loosely mounted, so as to permit the latter to have a slight swiveling or free movement independent of these arms and may adapt themselves to the side or intermediate collar blank sections pressing the same against the former, upright front rock shafts 254 journaled in suitable bearings on the frame on opposite sides of the path of the former adjacent to where the front corners of the former come to rest in the lowered position of the latter and each carrying at its upper end one of the rock arms 253, a lower rock arm 255 secured to the lower end of each rock shaft 254, upright rear rock shafts 256 journaled in bearings on the frame on opposite sides of the path of the former and adjacent to where the rear corners of the former come to rest in the lowermost position of the former, a link 257 connecting the lower arm of each front rock shaft with one arm of a rock lever 258 on the lower end of the rear rock shaft on the same lateral side of the path of the former, a pair of vertically swinging rock levers 259 pivoted on the frame on opposite sides of the path of the former and each having its lower arm connected by a link 260 with the other arm of the rock lever 258 on the lower end of the rear rock shaft 256 on the same side of the path of the former, vertically rotatable cams 261 each adapted to engage the upper arm of one of the rock levers 259 and arranged on opposite sides of the path of the former, a horizontal cam shaft 262 journaled transversely in the adjacent stationary part of the machine and carrying the cams 261, and a gear pinion or wheel 263 secured to the cam shaft 262 and meshing with a similar wheel 264 on the upper countershaft for transmitting movement from the main shaft to said cam shaft. While the former together with the collar blank is carried into a position between the side clamping jaws 252, the latter are swung outwardly into a retracted position clear of said parts of the collar and the former by springs 265 each of which is connected at one end with a stationary part of the machine and at its opposite end with the outer arm of the rock lever 258 on one of the rear upright rock shafts, which springs operate to move the parts which actuate the side clamping jaws in the direction opposite to that in which they are moved by the cams 261. After the collar blank has come to rest between the side clamping jaws, the latter are moved inwardly for pressing the intermediate sections of the collar blank against opposite sides of the former, by engagement of the high faces of the cams 261 with the upper arms of the rock levers 259.

Immediately after the intermediate sections of the collar blank have been pressed against the sides of the former the end sections (those between the scores 9 and the edge) of the same are turned inwardly or toward each other and against the back of the former, so that these rear sections overlap each other with their scarfed portions. This operation of folding or bending the rear sections of the collar blank is effected by means of two rear folding and pressing jaws 266 which are mounted respectively on angular rear rock arms 267 arranged on the upper ends of the rear rock shafts 256. While the former together with the partially folded collar blank are moved forwardly to their lowermost or folding position, the end folding or pressing jaws 266 are moved laterally out of the path of the former. After the former comes to rest between the side clamping or pressing jaws and the latter are pressed against opposite lateral sides of the same, the rear folding jaws also begin to swing inwardly toward each other and against the rear side of the former under the action of the same cams which operate the side pressing jaws, thereby causing the end sections of the blank to be swung toward each other and against the rear side of the former. When the rear folding jaws have completed this inward or folding movement, the same are arranged with their faces transversely in line and the rear sections of the blank have been pressed against the rear side of the former. When this folding and pressing of these rear sections have been completed, the folding finger 230 and the presser jaw 225 are operated, as hereinbefore described, to fold the tab over the edge of the collar and press the scarfed joint, and the rear folding jaws are again swung laterally by the springs 265 together with the side clamping jaws into their retracted or inoperative position ready for operating upon the body and cover of the next following partially completed collar which is carried by the succeeding former. The relative timing of the cams 261 and the mechanism whereby the movement of the same is transmitted to the side and rear clamping jaws is such that the rear collar section which has its scarf facing outwardly is folded against the former slightly in advance of the other end collar section which has its scarf facing inwardly in the folded position of the collar, thereby avoiding interference between these sections when folding them against the rear of the former, and positioning the tab or tongue to project from the outer face of the collar, preliminary to being folded over the edge at the scarfed joint.

Thus far has been described mechanism for forming or producing tubular box elements or collars, providing a box neck and including mechanism for supplying continuous webs of flexible material, operating on the material to form a composite collar blank, and folding the blank into a collar adapted to be employed with other box elements in the formation of a complete box. When the former carrying the folded and pressed collar is moved from its lowermost position it approaches a front horizontal position and supports the collar while another box element or elements are associated therewith in the production of a box, the end face of the former assuming a vertical position, thus disposing of the opening of the collar in horizontally facing position. It is apparent that the collar may be removed from the former and coupled with other box elements in any suitable manner, but to the end of providing a completely automatic machine for the production of necked boxes it is preferred to support the collar on the former and deliver or feed thereto other supplemental box elements and assemble the several parts into a complete box. In the present embodiment box bodies are separately supported with respect to the collars and are assembled therewith, and it is also preferred to secure a ripping device, or cord, to the box and assemble the same therewith as other elements are assembled, the collar being preferably located in the box body so as to have a projecting portion or neck and forming a shoulder, the cord being preferably secured at one end between a wall of the box body and the collar and trailing therefrom, providing a substantial length sufficient to lie in the shoulder and adapted to rip or sever or free such articles or materials as may be secured to the box over the shoulder.

In assembling the collars and box bodies the box bodies are preferably interfitted, telescoped or slid on the collar when the former has reached, substantially, the front horizontal position and the preferred mechanism for feeding the box bodies preparing them for assembly and assembling them with the collars will now be described.

In the present instance, the box body consists of a rectangular head having flanges perpendicular thereto, and these box bodies may be formed by the mechanism disclosed in applicant's prior application before referred to properly equipped and adjusted for the purpose. Such a box body is illustrated in Fig. 59 and comprises the head 5 with an upstanding flange, the head being formed of material similar to that employed for the body of the collar, and the flange being formed of similar material covered with a thinner material similar to the "cover" of the collar, the thin material being turned in at the bottom and pasted to the bottom of the head to bind the head and flange together, and being also folded or bent over the upper edge of the flange and pasted against the inside of the flange.

Coming now to the description of the mechanism, a standard 268 is located in front of the frame of the machine at the right hand side thereof and supports at its upper end a frame 269 consisting of angle irons 270 extending horizontally from the standard to the frame of the machine. These angle irons are spaced apart approximately the length of the box bodies and on the upper surface of each angle iron is a way or track comprising flanged longitudinal box supporting and guiding members 271 adjustably fastened to the frame 269 so that they may be set laterally to more accurately agree with the length of the box bodies to be supported thereby. Each box supporting member is provided with a horizontal, projecting track 272 upon which the ends of the boxes are supported and guided. To the frame 269 is attached at either end rollers 273 and 274 over which passes a belt 275 composed of material, as leather, which will have sufficient frictional contact with the box bodies to move the same therewith. The roller 274, which is located at that end of the frame 269 joined to the frame of the machine, is operated by means of a pinion 276 fastened to the roller shaft and engaging with a gear 277 on a transversely extending shaft 278 supported in the frame of the machine and driven continuously, through the chain 279 and sprocket wheel 280, from the upper counter shaft through a sprocket wheel 281 secured to the upper counter shaft 204. As the upper counter shaft continuously rotates, continuous movement is communicated to the belt 275, and the box bodies, which are placed thereon by hand, are continuously fed forward between the members 271, being supported by the tracks 272 and the belt 275. In order to provide for adjustment of the tension of the belt, the roller 273 is supported in a movable bracket 282 adjustably attached to the frame 269. As the box bodies are moved forward by frictional contact with the belt and reach the end of their forward movement, there might be a tendency for the series of boxes to rise out of the guideway, or "buckle," as it were, and to prevent this and at the same time keep the box bodies in frictional contact with the belt, a tension device is provided consisting of a series of weights comprising rollers 283 journaled in a frame 284 pivotally connected to an arm 285, which latter is connected to a side of one of the angle irons at 286. By this construction, the weighted rollers 283 rest upon the bottoms of the box bodies, keeping said bodies in contact with the belt and preventing the buckling before referred to. At the same time the pivotal support of these rollers provides for their vertical movement to accommodate slight inaccuracies in the depths of the box bodies, and further provide that each of the series of rollers shall engage the box body immediately thereunder. At that portion of the trackway of the box bodies toward the end of their forward movement, the members 271 are provided with flanges 287 which overlap the box bodies and tend to maintain them in alinement.

As the box bodies are fed successively by the belt 275 they arrive at the end of their movement in a forward direction, coming beneath a rearwardly projecting plate 288, and are there held in position to be fed laterally to the left to the mechanism for applying glue in position to cause the collars and box bodies to be adhesively joined when assembled. In the present embodiment the glue is applied to the interior of said bodies. 289 is a glue supply reservoir or pot provided with chambered walls through which steam may be passed to heat said pot. This pot is located to the left of the angle irons 270, with its edge approximately level therewith, and extending over said pot are two supporting and guiding plates 290 for the box bodies. These plates extend at right angles to the ways 271, being provided with flanges 291, between and on which the box bodies slide from the belt feeding mechanism just described. Accurate adjustment of the distance between the guides 290 is permitted by means of the pin and slot connections 292. When the box bodies reach the end of their forward movement, mechanism is provided for intermittently moving them successively along the guides 290 to position over the glue in the pot.

Projecting upwardly from the bottom of the glue pot at a point corresponding to the center of the box when placed in glue applying position over the pot, is a guide rod or sleeve 293 having an upwardly and outwardly flaring, preferably conical, upper portion 294 for a purpose to be hereinafter described. Secured within the sleeve 293 is a rod 295 having a shoulder 296 extending upwardly from the end of the conical portion 294 of the sleeve 293. Mounted on the guide rod or sleeve 293 and adapted to reciprocate up and down thereon is a support or plate 297 preferably elongated, and having at its central portion, surrounding the guide rod, preferably four lugs 298 spaced 90° apart and serving as journal bearings for the axes of the glue applying arms or dauber fingers 299 of an expansible dauber.

the fingers of which are pivoted respectively to said lugs. Each dauber finger is gradually widened or outwardly tapered toward its upper extremity and terminates in a projecting portion 300 and a preferably plain narrow face 301, the length of the glue line to be applied, in this case substantially corresponding to the length of the sides or walls of the box body with which they contact, respectively. Passing through each of the arms 299 is a cam 302 comprising an adjustable screw which may be locked in adjusted position by means of the nut 303. The inner end of each screw contacts with the sleeve 293 throughout the movement of the plate 297 up and down thereon. The dauber fingers 299 are connected in diametrically opposed pairs by means of springs 304 which tend to retain the cams 302 against the rod 293. The end portions of the elongated plate 297 are secured to supporting and guiding rods 305 extending upwardly from the plate and being curved laterally and downwardly into the connecting rods 306. The rods 306 in connection with the rods 305 are designed to move up and down to introduce the dauber fingers 299 alternately into the box body, and into the glue, submerging the fingers in the glue, and in order that this operation may be performed the following mechanism is provided. The shaft 278 is extended to a convenient point near the glue carrier and on its end portion is provided with a cam 307. Mounted upon a downwardly extending bracket 308 is a rock arm 309 pivoted at 310 and provided at one end with the offset roller 311 which contacts with the cam 307. The other end of the rock arm 309 is pivotally connected to a cross plate 312 at the central portion thereof, said cross plate being yieldingly connected to the glue carrier connecting rods 306 by means of the springs 313. The rods 306 pass through openings in each end of the plate 312 and are retained thereon by the nuts 314 engaging the screw threaded ends of the rods 306. Nuts 315 are provided on each rod 306 between which and the extremity of the plate 312 the springs 313 are located. The nuts 315 serve as a means for adjusting the tension of the springs 313 and may serve at times as stops to limit the upward motion of the glue carrier.

The box bodies are placed in an inverted position on the belt which leads them toward the glue carrier. That is, they are placed on the belt with their open sides down, and when they are fed into position over the glue applying device they present their open sides to said device and the flanges of the plates 290, which support the boxes in glue applying position, are of such width as not to interfere with the application of glue to the inner sides of the walls of the box. As the shaft 278 rotates, the high portion of the cam 307 will operate the rock arm 309 to elevate the plate 297, and as said plate rises the cams 302 will be pressed outwardly by the flared upper end 294 of the sleeve 293 carrying the edges 301 of the dauber fingers outwardly against the inner face of the walls of the box opposite thereto, the glue on said arms being thus deposited upon the walls of the box, preferably in a thin line. The position of the flaring portion 294 is such that the arms 299 shall not have been pressed outwardly a sufficient distance to engage the walls of the box until said arms shall have entered the box. In this wise it will be seen that the thin line of glue is within the open end of the box and above the bottom of the box; i. e., it covers only a fraction of the depth of the box at this time. It is preferred to so proportion the parts of this gluer that the line of glue shall be applied to the inside wall of the box a short distance from its edge. Inward movement of the cams 292, should they pass beyond the upper limit of the surface 294, may be prevented by the extension of the shoulder 296, previously referred to.

In connection with the glue applying mechanism just described, means are provided for throwing the same into and out of operation without interfering with the continued operation of the other portions of the machine. This is accomplished by making the arm 309 in two parts 316 and 317 pivotally connected at 318. Preferably the part 316 consists of links pivoted at 318 upon opposite sides of the arm 317 at the end of the latter. Pivotally supported between the pair of links 316 is a latch 319, which may engage a shoulder 320, on the part 317, and when the latch 319 engages the shoulder 320 the parts 316 and 317 are locked in position and together form an arm of the rock lever 309. When the latch 319 is disengaged from the shoulder 320, movement of the part 317 by the cam 307 will no longer be effectively communicated to the part 316 so as to raise the cross plate 312 and, in consequence, the glue carrying device. A spring 321 is connected to the latch and the arm 316 to yieldingly maintain the latch in engagement with the shoulder 320. Thus the latch may be readily disengaged, as will be obvious. When the roller 311 on the rock arm 309 is engaged with the low part of the cam 307 the glue carrier has dropped to its lowest position and is submerged in the glue, the lowering of the glue carrier being due to gravity assisted by a spring 322, attached at one end to the extremity of the rock arm near the central portion of the cross plate 312 and at its other end to a convenient point on the frame or to a standard 323 in vertical alinement with the median line between the rods 306. In order to provide for the smooth and accurate operation of the rods 306 an elongated bearing sleeve 324 projects upwardly from the interior of the glue pot, the same being secured to the inner bottom portion of the pot by a screw threaded connection, permitting its removal. One of the rods 306 extends through the sleeve 324 and through the bottom of the pot. The other similar rod engages vertical and elongated bearings 325 in the flanges provided at the top and bottom of the pot. The upper end of the bearing sleeve 324 is situated above the glue level of the pot, thus permitting the free passage of the rod 306 without contacting the glue, and also avoiding leakage. It will be observed from the foregoing description that not only is a practical and efficient glue applying mechanism provided, but also one which may be readily taken apart and packed or repaired as may be desirable. Furthermore, the glue applying mechanism is particularly adapted to mechanism of the character herein described, though obviously capable of independent application.

The mechanism for moving or feeding the box bodies into glue applying position over the glue pot is preferably constructed as follows:

At the upper right hand portion of the machine is a frame portion consisting of substantially an I-beam horizontally arranged and extending transversely of the machine and comprising the upstanding web 326. The upper flange of the I-beam supports a guide plate in which is a longitudinal groove having an undercut wall 327, between which and a spaced removable plate 328, slides a guide rod 329 of a reciprocatory cross head. Besides rod 329 the reciprocating cross head comprises an inclined cross bar 330 connecting one end of the rod 329 with a lower rod 331 supported and sliding on the bottom flange of the I-beam and in the angle where said flange joins the I-beam. The rods 329 and 331 are of a sufficient length to retain the cross head in proper alinement during its reciprocations and to permit the cross head to have an amplitude of reciprocation corresponding with the distance from the end of the feeding channels for the bodies to the glue applying position of said bodies. Pivotally connected to the bottom end portion of the cross head is a picker rod 332 extending longitudinally of the cross head and provided with a transversely projecting arm 333 and a downwardly and laterally projecting picker 334, the latter being adapted to engage and move the box bodies from the feeding guideway to glue applying position as the cross head reciprocates. In order that the picker may accomplish this result, the inner end of the guideway is provided with a supporting and guiding plate 335, on which the arm 333 plays when moving in one direction. A switch comprising a tapered rod 336, one end of which is pivoted to an upstanding wall at 337, has its other end resting upon the guideway 335 at the end toward which the box bodies are fed and is yieldingly pressed against said guideway 335 by the spring 338 engaging a pin 339 projecting through a curved slot 340 in the upstanding wall 341. As the cross head reciprocates the picker 334 at the beginning of its inward movement is in a position to engage an outer wall of the box body which is at the end of the guideway formed by the bars 270, the arm 333 resting upon the guideway 335. As the cross head moves inwardly the picker feeds the box into glue applying position on the guides 290, at which position the supporting bar 333 has passed beneath and beyond the switch 336. As the picker reciprocates in the opposite direction the switch will be yieldingly held in the path of the rod 333 by its spring 338, and the picker will accordingly be lifted as the rod 333 follows the upper surface of the switch and thus carried over the succeeding box body, which at this time has been brought to the end of the feeding guideway. The rod 333 at the end of its reciprocation drops from the end of the switch 336 onto the guideway 335, thus carrying the picker into position to engage another box which is about to be fed into glue applying position. In order that the picker may be accurately positioned with respect to the box bodies as they rest in the guideway it is adjustably connected to the picker arm 332 by a pin and slot connection, as at 342. And in order to provide for the accurate placing of the box in glue applying position the picker arm 332 is adjustably connected to the cross head 331 by means of a pivoted arm 343 having an opening through which the arm 332 extends and in which it may be adjustably secured by means of the pin 344. The arm 333 is yieldingly held in contact with the guideway 335 by means of a spring 345 attached to the upper part of the cross head and to the member 343, preferably by means of the screw 344 which passes through a perforation in the lower end of the spring 345.

Reciprocating motion is communicated to the picker through the cross head by means of a connecting rod 346 pivoted at one end to an intermediate portion of the cross bar 330 of the cross head, the other end of the connecting rod being joined to a crank pin 347 adjustably connected to a disk wheel 348 journaled through an intermediate portion of the web 326 and located in front thereof. The rear end of the shaft of the wheel 348 is provided with a bevel pinion 349 which meshes with a bevel gear 350 on the shaft of the carrier. As the carrier shaft intermittently rotates, as previously described, intermittent rotary motion is communicated to the wheel 348 and the picker thus intermittently reciprocates in accordance with the movement of the carrier.

The box bodies, after glue has been applied thereto in the manner hereinbefore described, are fed successively and automatically from glue applying position into a downwardly open channel or guideway in line with the channel formed by the bars 290. This channel is practically a continuation of the channel 291 and is formed by depending plates 351 secured to opposite sides of the lower head of the I-beam. The plates 351 are provided with flanges 352 to support the edges of the boxes in their passage through the guideway, and means are provided for adjusting the distance between the plates 351 consisting of headed rods 353 projecting from one side of the lower head of the I-beam and receiving an exteriorly screw threaded sleeve 354, the threads of which engage threaded openings of the plates 351 and in the I-beam. Upon turning the sleeve 354 a plate 351 may be spaced more or less from its companion plate and secured in position by means of a screw 355 passing through a slot in the supporting flange of the plate into the head of the I-beam. A nut 356 is provided to lock the sleeve 354 in adjusted position. As the picker 334 reciprocates and draws a succeeding box body into glue applying position the forward end of said body engages the box which had been previously fed to glue applying position and feeds it forwardly toward the guideway formed by the plates 351, and eventually, by the continued operation of the picker mechanism, a series of box bodies will occupy said guideway throughout its extent or up to a point where the boxes are individually and intermittently fed forward by a pusher mechanism, as hereinafter described.

At the inner end of the I-beam is a plate 357 arranged transversely of the I-beam and longitudinally of the machine, this plate being adapted to support parts of the mechanism for carrying box bodies to the collars. The plate 357 has an opening 358 through which the box bodies pass as they are fed by the reciprocating picker. On the side of the plate 357, opposite the I-beam, a continuation of the guideways 351 is provided in order that the box bodies may be accurately guided and positioned after passing through the plate. Preferably this further guiding of the bodies is accomplished by means of a projecting flat horizontally arranged plate 359 having an upstanding flange whereby it is secured to the plate 357 at the upper horizontal edge of the opening 358, and adjustably fastened to said plate so that they may be spaced apart a proper distance, are guiding plates 360 having flanges 361 to support the edges of the box bodies. The plates and flanges 360, 361 form a termination of the guide passageway leading from the picker mechanism and a stop is provided at the end of the passageway to determine the position of the box bodies at this point. Said stop consists of a pawl 362 pivoted on a bracket secured above the plate 359 and held in position across the passageway at the side thereof by a spring 363. A carriage is adapted to intermittently coincide with the end of the passageway between the plates 351, and box body supports thereon intermittently aline with the sides of said passageway so that upon further feeding of the box bodies beyond the end of the guideway they will pass into said supports. As this carriage assumes position in front of the passageway it presses aside the stop 362, thus clearing the passageway for the entrance of the box bodies into the carriage.

In order to feed the box bodies from the end of the guide passageway into the carriage, above referred to, a pusher mechanism is provided consisting of a rod 364 pivoted at one end to a bracket 365 depending from the lower guiding and supporting rod 331 of the reciprocating cross head, which operates the picker. The rod 364 lies immediately below the guideway formed by the plates 351 and has two fingers 366 and 367 attached thereto, one at the outer end and one at a distance from said end, said fingers adapted to engage the inner face of a wall of a box and feed the same forwardly as the rod 364 moves in one direction. Secured to the plate 357 at the sides of the opening 358 therein are frame pieces 368 and 369. The frame piece 368 supports a vertically arranged plate 370 having a longitudinal, horizontally extending recess 371 on the wall of which is pivoted a switch 372 having a pin 373 passing through a curved slot in the plate 370 and engaged by a spring 374, which is so arranged as to hold the switch upwardly against the upper horizontal face of the recess 371. The switch 372 has an inclined face 375 and a face 376 continuous therewith, the lower wall of the recess 371 being inclined opposite the face 375, as at 377, and substantially parallel to said face when the switch is in upper position. On the opposite side of the pivot of the switch from the point thereof, the switch is provided with a curved portion 378 continuous with the face 376, continuing in a straight portion 379 to the point of the switch. The switch is pivoted at about the central portion of the vertical extent of the recess 371. Spaced from the lower portion of the plate 370 is the rod 380 and between the opposing faces of said plate and rod a slot 374' is provided centrally beneath the guideway for the boxes. The pusher rod 364 near its outer end and in this instance between the fingers 366 and 367, is provided with a depending lug 381, which in all positions of the pusher rod extends through the slot 374', serving as a guide for said rod. On the lateral face of the lug is secured a roller 382 which plays in the recess 371 between the switch 372 and the walls of said recess. The pusher rod 364 is yieldingly pressed upwardly toward the guideway for the boxes by devices hereinafter described. It will now be apparent that as the pusher rod 364 is reciprocated, the fingers 366 and 367 will be moved back and forth and in their forward movement will be guided by the straight upper horizontal wall of the recess 371, the yielding devices hereinafter referred to maintaining the roller 382 against the upper wall of said recess. As the pusher rod is moved forward the switch 372 is deflected against the resistance of the spring 374 and eventually the roller escapes the point of the switch and is received in a conforming opening 383 in the plate 370, which opening communicates with the recess 371. After the roller escapes the point of the switch the spring elevates the switch and when the pusher rod 364 moves in the opposite direction the face 375 of the switch causes the fingers to first move downwardly out of the path of the boxes, then rearwardly substantially horizontally, but still out of the path of the boxes, and finally upwardly, the roller 382 following the curved portion 378 of the switch and eventually contacting with the upper horizontal wall of the recess 371, at which time the fingers will again be in pushing position.

The piece 368 which supports the switch mechanism for the pusher, extends forwardly beyond the switch mechanism and with the piece 369 support a short downwardly open channel bar 384 having shoulders 385 and 386 to accommodate the contour of the finished product, the completed box being pushed into the guideway formed by the channel bar by the front pusher finger 366, and supported therein by the shoulders 386. A pivoted gravity operated stop comprising a pawl 387 is provided at the upper portion of this guideway, the tooth of the pawl projecting into the passageway through the piece 384 and having a cam surface 388 with which the boxes contact as they are ejected from the carriage. The pawl is lifted by the boxes as they enter the channel and they are prevented from retrograde movement by the tooth of the pawl, which returns to position across the passage.

The pusher rod 364 is yieldingly pressed upwardly by a plunger 389 guided in an opening in a lug 390 on the plate 357 and passing through an opening in a cross piece 391 supported a substantial distance below the plate on the rods 392, a spring 393 surrounding the rod and held between the cross piece 391 and an adjustable collar 394 on the rod.

The operation of the pusher mechanism is as follows: The box bodies are fed forwardly in the guideways 351 by the picker mechanism, and eventually the foremost box arrives at the end of the guideway adjacent the stop 362. Assuming the stop 362 to have been thrown aside by the carriage when in position to receive a box body, and the pusher rod 364 to have been drawn rearwardly and upwardly to pushing or feeding position, the finger 367 will contact with the box body which is immediately in rear of the one about to enter the carriage, while the end finger 366 will assume position beneath the box in the carriage and to which a collar has just been applied. The end finger, or ejecting finger, will take position immediately in rear of and close to the inside face of the front wall of the completed box, but the distance between the fingers is such that when the end finger is in the position described, the finger 367 is some distance in rear of the front wall of the box body with which it is about to cooperate, as above described. As the pusher moves forwardly its front finger 366 operates on the completed box to move it forwardly positively into the guideway of the channel plate 384, while the finger 367 is moving to the front wall of the box body immediately adjacent thereto. Thus the completed box is fed some distance forward before the rear finger 367 begins to push the box adjacent thereto. When the finger 367 engages the wall of its adjacent box, it pushes the box just ahead of it, and which is between the boxes engaged by these fingers, into the carriage. The purpose of moving the completed box some distance before feeding a box into the carriage is to obtain a substantial length of cord extending from the completed box, as will hereinafter appear.

The box bodies having been glued on their inner walls and fed to the end of the guideway adjoining the stop 362, as has been described, are to be assembled with the collars on the formers, it being also designed to provide the box with a ripping device, or cord, as previously explained.

The box bodies are fed by the pusher mechanism, in the manner explained, into the jaws of a carriage which supports them while they are assembled with the collars and the cord. In the preferred embodiment the carriage comprises a reciprocatory supporting element adapted to move back and forth from a position in which it is alined with the guideway containing the box bodies to a position in which the body will aline with the collar on the former.

The plate 357 is secured to the machine frame at approximately the level of the axis of the carrier, and vertically at the left hand portion of the guideway from which the box bodies are delivered to the carriage, extending across said guideway and having the transverse opening 358 allowing the box bodies to pass beyond the plate toward the carriage. On said plate or head 357 two supporting bearings 395, Figs. 121 and 124, preferably square in cross section, are located one on each side of and in horizontal alinement with a horizontal opening 396 in the plate. A bearing sleeve, Fig. 89, perpendicular to the plate 357 and extending on either side of said plate through the opening 396 is provided with laterally extending squared bearing, supporting and guiding rods 397 supported by and adapted to slide in said squared bearings 395. Journaled in this sleeve 398 is a shaft 399, one end thereof having a crank arm 400 to which one end of a connecting rod 401 is pivoted, the other end of the rod 401 extending downwardly and being pivoted to an arm of a rock lever 402 operated by a cam 403 on the continuously operating shaft 204, Fig. 110. To the opposite end of the shaft 399 is fastened the carriage comprising a jaw piece 404, of generally rectangular outline in plan view, and having two spaced upstanding arms 405 through which the shaft 399 passes and by means of which it is secured thereto. Two supporting members, arms, or jaws are pivoted one at each side of the piece 404, preferably by means of pins 406 passing through the lower lateral portions of the arms 405. Each jaw comprises a depending portion 407 of a length substantially the same as the part of the box body to be held, four spaced arms 408, 408, 409, 409 through which the pin 406 passes to pivotally connect the arm to the jaw piece 404, and a flange or hook 410 to support the edge of a box body. It will be understood that the piece 404, is of such width and the jaws are so spaced apart by their connections thereto, that a box body may be supported and preferably slightly gripped thereby at proper times, as hereinafter explained.

The arms 409, 409, are arranged between the arms 408, 408, and are sufficiently long to serve as lever arms to operated the jaw at proper times, these arms of the two jaws being pivotally connected to each other by toggle links 411, 411, which engage pins 412, 412, in the arms. Alongside each supporting jaw lies a stripper, Fig. 98, which comprises two hook arms 413, 413, spaced apart within the length of the supporting portions 407 of the jaws. Said hooks lie sufficiently below the parts 407 to take over the outer edge of the collar of the completed box and strip said box from the former, as will be explained hereinafter. The hooks of one of the strippers are spaced apart a sufficient distance to span the tab-folding device on the former. Each of the strippers has an upper bifurcated portion 414 engaging the pin 412 on each side of a toggle link 411 and between the longer arms or lever portions 409 of the supporting arms. The strippers are yieldingly held against the arms by a tension spring 415 connected to a pin 416 in the fork of each stripper. Each hooked portion of the stripper arms comprises a wall 417, to lend support to the collar in the stripping operation, and a recess 418 to enable the strippers to move a sufficient distance toward the box to take over the edge of the collar.

The toggle links 411 which operate the supporting jaws are forked at their inner ends and connected by a short shaft 419, Fig. 104, passing loosely through openings in the forks and pivotally connecting said links centrally between the jaws and beneath the shaft 399. Preferably the short shaft referred to consists of a rod having a threaded end portion and a slotted head. A short pin 420 is secured at one end to the shaft 419, and engages an opening 421 extending diametrically through the shaft 399. One end of a connecting rod 422 is loosely journaled on the shaft 399 over the opening 421, and in line with the pin 420, and in order that the shaft may rotate relatively to the rod 422, the journal portion of the latter has a segmental cutaway portion, as at 423, which will permit the shaft and pin to rotate a sufficient amount, in this instance approximately 90°. Extending longitudinally through the rod 422 is a plunger 424. This plunger 424 is of a shape and size to enter the opening 421 in the shaft 399 and contact with the end of the pin 420, in certain relationship of the parts. The outer end of the connecting rod is pivoted to an arm 425 of a hollow rock shaft 426, journaled in an extended bearing 427 secured to the plate 357. Said rock shaft 426 supports centrally a second rock shaft 428 having a tripping arm or finger 429, which intermittently engages one end of a trip lever 430 fulcrumed on the arm 425 intermediate its ends. The other end of the trip lever 430 is pivotally connected to the outer end of the plunger 424 by a pin and slot connection. The finger 429 is adapted to move the plunger 424 in a direction to engage the pin 420 at proper times, movement of the plunger in the opposite direction being accomplished by a spring 431 surrounding the plunger and engaging the bottom wall of the recess 432 in the rod and a collar 433 adjustably secured to the plunger. The recess 432 extends to the outer end of the rod 422 and is closed by a screw plug 434 against which the collar 433 abuts to limit its outward movement. The bearing sleeve 427 extends on either side of the plate 357 and is secured thereto by a shoulder 435 and a nut 436.

The connecting rod 422 is designed to move, or translate, the jaw piece 404 toward and from the former carrying the collar after said jaw piece has been rotated into position to coöperate with the former, and its operating mechanism is constructed and arranged as follows:

At the outer end of the hollow shaft 426 is secured an arm 437 by means of a pin 438, and on each side of the arm 437, Figs. 107, 108, and loosely mounted on the shaft 426 so as to be capable of oscillation on said shaft are links 439. Intermediate their outer ends the links 439 are connected by a bridge 440, through which extends a rod 441 pivotally connected at its inner end to the arm 437, at 442. The outer end of the rod 441 is threaded and engaged by a nut 443 between which and the bridge 440 is located a spring 444 surrounding the rod 441. A pin 445 connects the links 439 on one side of the bridge and passes through a slot 446 in the rod 441. To the outer ends of the links 439 is pivotally secured one end of an adjustable connecting rod 447, its other end being pivotally connected to a rock lever, Fig. 111, in turn pivotally supported on a bracket secured to the frame. Preferably this rock lever comprises two arms 448 having rollers adapted to engage an adjustable cam 449 mounted on the shaft 278 in a suitable position to engage said rock lever. By having the arms of the rock lever engage the cam on the opposite sides of the shaft a positive movement in either direction is given to the connecting rod 447 and to the parts to be operated thereby, and at the same time a smooth and even movement of the parts is effected. As the cam 449 rotates, positive movement is communicated to the rod 447 and through the spring 444 and the rod 441, to the arm 437, secured to the hollow shaft 426. By this construction it will be noted that a spring connection is effected between the links 439 and the arm 437, so that the links 439 may be moved a substantial distance by the cams 449 without motion of the arm 437, should the latter for any reason be obstructed in its motion, or otherwise be held from normal operation.

On the end of the shaft 428 outside of the outer link 439 is fastened an arm 450, connected by an adjustable rod 451 to a rock lever 452, having a roller which contacts with a cam 453 mounted on the shaft 278. The cam 453 is designed to move the trip finger 429 against one end of the trip lever 430 past said end, and when the trip finger 429 shall have escaped the end of the trip lever 430 the spring 431 will be permitted to quickly withdraw the plunger 424 from the opening 421 in the shaft 399, thus relieving any pressure on the toggles 411 due to the extended position of the plunger 424. The face of the cam 453 is therefore concentric with the shaft 278 for substantially its entire extent, there being a short projection 454 which effects a quick movement in one direction of the rock lever 452 and a consequent quick movement of the plunger 424. The trip finger 429 and the trip lever 430 are provided with suitably shaped engaging portions to easily and smoothly perform their function, in the present instance the engaging surfaces of these parts being curved so as to smoothly engage and pass each other.

The operation of the machine to feed box bodies from the end of the guideway, to which position they have been brought by the feeding mechanisms, hereinbefore described, will now be apparent. The jaw piece 404 assumes position in front of that end of the guideway for the boxes formed by the depending plates 360 with the jaws 407 forming practically continuations of said guiding and supporting jaws, though slightly spaced therefrom. In this position the stop 362 is pushed aside by the carriage which buts thereagainst when in position in front of the guideway. As the picker mechanism operates, the picker finger 367 engages the second foremost box body in the guideway and against the inside of the front wall of the said box body and pushes said box body forward, thus pushing the foremost box body into position between the supporting jaws 407. Approaching movement between the box body supporting jaws and the former is then effected and, as will be clear, the arm 400 will be rotated by the cam 403 through an arc of approximately 90°, and the jaw piece 404, which is fastened to the shaft 399, will rotate from its position in front of the guideway upwardly toward the approaching former which carries a completed collar, this movement of the jaw piece being in the same general plane as that in which the formers move, and the box body between the jaws will thus be carried in an arcuate path toward the collar on the approaching former with its open end presented outwardly from the jaw piece ready to receive said collar. The arrangement of the parts is such that the box body and collar overlappingly engage each other angularly with the plane of the edge of the collar disposed at an angle to the plane of the proximate, or approaching, open edge of the flange of the box body, prior to the completion of the movement of the former and jaw piece whereby they are alined, the upper strippers sliding along the surface of the collar, such arrangement tending to facilitate the engagement of the box body with the collar. When the box body and the collar shall have been moved by their respective carrying devices into alinement the shaft 399 will have been turned so as to place the opening 421 therein in alinement with the plunger rod 424. At this point in the operation of the machine the links 439 are moved by their operating cam, and the connecting rod 422 is operated to move the bearing sleeve 398 toward the former, and the box body carried by the jaws is pushed farther upon the collar on the former by a sliding rectilinear movement, thus telescoping the collar with the box body. It will be observed that the faces 407 of the box-supporting jaws intersect the hub of the member 408, so that portions of the hubs adjacent the point of intersection operate as abutments to urge the box body in the direction of the collar on the former as the carriage is moved toward the former. When the movement of the box body on the collar has been effected, the trip finger 429 engages the trip lever 430, thrusts the plunger rod 424 forwardly against the pin 420, and the movement of the pin through the toggle links 411 moves the jaws 407 toward each other and compresses the sides of the box body against the collar with a strong pressure, which, however, is relieved when the trip finger 429 passes the end of the trip lever, permitting the plunger rod to be immediately withdrawn under the influence of the spring 431.

As the jaw piece moves forwardly to apply the box body to the collar the stripping hooks 413 pass over opposite sides of the collar, being permitted to separate in order to pass the collar by the spring 415, the ends of the bottom stripper being permitted to move beyond the flange 213 of the former through the openings 214' in the flange of the former. Said hooks pass beyond the edge of the collar at the base of the former and are engaged with said edges when in this position by the spring 415. After the pressure of the jaws 407 on the sides of the box has been relieved the connecting rod 422 is moved in the opposite or rearward direction by its cam mechanism, assisted by a spring 550, Fig. 121, connected to the frame and the bearing sleeve, thus causing receding movement between the assembled elements and the former, carrying the jaw piece horizontally away from the former and with it the box and collar in assembled position, the stripper hooks acting to mechanically positively remove the assembled box from the former and to retain these latter in assembled relation during the recession. The box, having been drawn from the former, moves horizontally rearwardly with the jaw piece and is subsequently carried downwardly into position once more in alinement with the guideway for the box bodies, and also into alinement with the guideway formed by the plate 384 and the flanges 385, this latter movement being accomplished through the connecting rod 401 and its connections. A stop consisting of a fixed post or pin 455, restricts the movement of the jaw piece, and determines the position of accurate alinement with the guideway for the box bodies.

By the foregoing arrangement, the assembly of collars and box bodies designed to snugly fit is much facilitated and rendered automatically efficient. Especially when the collars and box bodies are made of paper and are of rectangular shape is the machine highly useful. The fact that the collars are inserted in the box bodies immediately after being formed is an advantage from one point of view, because the collars are moist and lend themselves more readily to the operation of the machine. On the other hand, because the collars are moist and are covered with thin cover paper, they are the more readily apt to be defaced and torn or rumpled, particularly when, as in the present embodiment, the uncovered edge of the composite collar is the one initially going into the box body. The composite blank, a form of which is illustrated in Fig. 55, has one edge surrounded by the cover material, this being the edge which is exposed when in assembled position in the box body. The opposite edge of the composite blank presents two plies; i. e., the severed edge of the body blank and the severed edge of the cover blank, and it will be noted that the severed edge of the body blank is not covered by the cover material,—is an uncovered edge. The folded portion of the cover material spans the grooves 9 and 10 in the body material, and, being thin, is deflected into such grooves when the composite blank of Fig. 55 is folded into a rectangular tubular element around the former 212. By forming the grooves by removal of the body material, as explained in the prior application hereinbefore referred to, the depth and width of the groove may be predetermined in accordance with the thickness of the body material operated upon and the character of the cover material to enter such grooves, so that sharp corners of the rectangular tubular element will result. When the composite blank is folded into the rectangular tubular element, or collar, the tab of the cover material, which extends from the edge of the composite blank, as clearly shown in Fig. 55, will be in position to be folded across the joint formed by the ends of the body blank coming together, and will secure the joint should the overlapping scarfed portions be insecure or should there be no overlap of the body material, as for instance, when the ends of the body material are merely abutted. When the tubular element, or collar, is on the former, or collar-supporting device, it will be noted that the uncovered edge is so disposed as to face toward the coöperative inserting means which carries the box body, whereas the covered or surrounded edge is at the opposite side of the former. The shoulder or flange 213 of the former is thus in a position to restrain movement of the collar in one direction, the openings 214' permitting the passage of the yielding, discharging collar-engaging dogs 417, which dogs are thus permitted to engage the opposite outer edges of the collar and discharge the assembled elements from the former in a direction tending to restrain movement of the collar out of the box body. The composite blank, when folded around the former 212, is pressed closely against the former adjacent the corners thereof, the folding jaws 252 and 266 coöperating with the corners of the former to make a close and accurate fit at the corners so as to accurately shape the collar and give it a predetermined size and, as well, to press the cover material against the body material so that, in the subsequent operation of inserting there will be less tendency for the cover material to be crumpled as, for instance, being tipped or rolled up by the inserting operation, should it be out of predetermined position. The liability of the rolling up referred to, and even of the crumpling or crushing of the collar wall or the box body wall, is not so remote when it is remembered that the collar and box body are of a size to nicely fit one another. Quite a small discrepancy in the predetermined position of one relative to the other may result in a waste product. It will be noted that the transfer grippers 157 and 158 operate to feed the composite blanks to the formers and into position to have an intermediate portion of the composite blank, such as a section between the grooves 10 clamped to the former, and the folding arms or members 252 and 266 hereinbefore referred to, move relative to said former to fold the other sections of the composite blank. Thus all the sections of the composite blank are simultaneously firmly clamped to the former, and by reason of the clamping of the intermediate section while the lateral sections are being folded therearound, there is practically no chance for the folded element to become loose on the former or for any of its sides to become bowed or out of predetermined position thereon. Furthermore, the collar is held in folded condition on the former while the tab-folding finger 230 operates to fold the tab and press it against the collar. In this wise a collar of a shape and dimension extremely accurate in accordance with a predetermined design and accurately positioned relative to the coöperating inserting means is produced.

The box body carriage coöperates with the box body and the rectangular former to effect the assembly of the collar with the box body and, as will have been seen, this carriage has approaching and receding movements relative to the former around which the collars are made. The box body carriage receives the box body from the box body supply device by the instrumentality of the finger 367, which pushes the box bodies along the channel 351 into the carriage. Thereupon the box body carriage, by the rotation of the shaft 399, rotates upwardly toward a former 212, which is approaching from the lowermost position of the former where the collar was folded therearound. It will be observed that the rotation of the shaft 399 toward the former is effected by the cam 403, but that, as before stated, the shaft 399 is rotated by the cam 403 only through an arc of approximately 90°. And it will be further noted that, by reason of the fact, as before stated, that the box body and the collar to be assembled engage each other angularly prior to the completion of the movement of the former and carriage whereby they are alined, the movement of the box body into the alined position referred to is effected in part by the upwardly rotating former, the collar upon which has come into engagement with the inner face of a side wall of the box body at a time when the axes of the box elements are inclined to each other and before the alined position referred to has been reached. Thus while the cam 403 effects the greater portion of the movement of the box body carriage to position in alinement with the approaching former, the remainder of the movement of this carriage is effected by the former 212 which operates, through the collar, on the side wall of the box body and lifts the carriage and the box body therewith into the alined position. This lifting of the box body puts a strain upon the upper side wall of the box body transversely of its plane and bends said upper side wall outwardly relative to the bottom or head of the box body so as to increase the difference in size of the box body and the collar, whereby the collar is eased into the box body at the meeting edges prior to entry of the full periphery of the one into the other. And it will be noted that this easing of one part into the other is especially desirable where, as in the present embodiment, the assembly is effected initially with the uncovered edge of the collar, this operation tending to preserve the predetermined shape of the box elements and there being practically no tendency to crush the body material or rumple or roll up the cover material, notwithstanding the edge of the cover material may be prominently presented. It will be observed that by the foregoing construction, the plane of some of the sides of the box body is disposed at an angle to the plane of the proximate sides of the collar both before and after initial insertion and prior to full peripheral insertion of one element in the other, so that the edges of the parts to be immediately overlapped and placed in proximate position will readily slide one into the other by reason of the increased difference in size between them, the facility of insertion being augmented by the disposal of a plane of a wall of one transversely of the plane of a wall of the other, and the accuracy of shape and size of the assembled parts being furthered because the assembly is made while the collar is on the former.

As the collar support and box body carriage come into position in which the collar and body are alined, the lower side of the collar will readily enter the box body. It is desirable, however, on account of unavoidable slight differences in size of the parts to be assembled, to positively guide the edge of this side of the collar into the box body, and this is effected by the beveled or curved outer face of the flange 410 (Fig. 100) against which the collar may wipe on its passage into full peripheral assembly with the body. After the collar and box body are brought into alined position and complete insertion is effected by further and rectilinear approaching movement between the former and the carriage, the jaws 407 are operated to press the assembled elements together, to insure their adherence, and to restore the normal, or rectangular, shape of the box body should it have been otherwise permanently deformed by the assembling operation. After the pressing just referred to, the discharge of the assembled elements from the former is effected, as before explained.

The mechanism thus far described will produce a covered collar from continuous webs and attach the same securely to a box body, thus forming a shouldered box in an efficient and automatic manner. It is further designed, however, to apply to the box at the shoulder thereof a cord which may be subsequently located between said shoulder and the edge of a box top, and bound in place preferably by a label, which may be employed to secure the top to the body and conceal the joint at this point. To this end devices are provided to feed and attach the cord, and to provide sufficient length thereof to be used in the manner explained, and preferably these devices comprise mechanism supported by and moving with the carriage, and including a carrying device or block supporting devices which participate in the application of the cord to the box. Preferably this block is supported to move in a plane substantially parallel to those sides of the box body which bridge the space between the box supporting arms or jaws and perpendicular to the plane of the box body, for reasons which will hereinafter appear.

The outer lateral face of the carriage is provided at each end with guide bars 456 having undercut ways, in which slides a plate 457 having beveled side edges to conform to the undercut portions of the guide bars. The plate 457 is adapted to move in a plane substantially parallel to those sides of the box bodies which bridge the space between the box supporting arms, and substantially perpendicularly thereto. Said plate at its inner end is adapted to abut the body of the carriage to limit its inward movement, and is yieldingly held in its inner position by a coil spring 458, Figs. 96, 97, 98, 103, attached to a bracket 459 on the end of the plate and to a pin 460 on the carriage body, the spring preferably being partially inclosed by the sides of the plate and body, which are cut out to accommodate the same. On the outside of the plate 457 at its lower portion is the supporting projection, carrying device, or block 461, above mentioned, the lower face of which, when the plate is in its innermost, or lowest position, is designed to be substantially flush or slightly below the position assumed by the edge of a wall of the box body when in position in the carriage. And, furthermore, the inner wall of the block when in its lowest position stands across the passage between the grippers outside the latter.

Upward or outward movement of the plate 457 and the block 461 attached thereto is effected by a lever 462 pivoted intermediate its ends to the frame of the machine at 463, one end of this lever having a slot 464 in which is secured a pivot pin 465 to which is attached the upper end of an adjustable connecting rod 466, the lower end of the connecting rod being pivoted to the outer end of a rock-lever 467, fulcrumed on the frame at 468, a spring 469 connecting the lever and frame and serving to yieldingly maintain the rod 466 in upper position. A cam 470 on the shaft 278 at proper times serves to depress the end of the lever 467, as will be hereinafter explained. The outer end of the lever 462, overhangs the carriage, and a short distance from that end is a pin 471, which loosely engages a slot 472 in the upper end of a connecting rod 473, the lower end of said connecting rod being pivoted to the plate 457 at a point 474 therein which corresponds approximately with the center of rotation of said plate when rotated with the carriage.

It will be noted that should the outer end of the lever 462 move upward when the pin 471 is below the upper wall of the slot 472, no upward motion will be communicated to the plate 457 until the pin shall have engaged said upper wall. To the outer end of the lever 462 beyond the pin 471 is secured a hook 475 capable of adjustment, as clearly shown. The end face of the block 461 which faces the former is provided with a narrow slot 476, preferably slightly inclined to the vertical when the carriage is in box body receiving position and opening through the bottom face 477 of the block, the inner wall of the slot where it meets the bottom face of the block being disposed at a point intermediate the ends of the box body wall adjacent thereto, and preferably adjacent that end of the box body wall which is nearest the former. The slot 476 where it emerges from the face 477, is preferably closely adjacent the inner face of the block 461, being separated therefrom by a comparatively thin portion of said block.

A cord 478, supported on a spool or otherwise, at some convenient point so as to be freely supplied, is threaded through a guiding opening 479 in the block 461, and thence into the slot 476, its end being designed to emerge from the bottom face of the block at the point where said face and the inner wall of the slot 476 meet. In order to maintain the cord at that portion of the slot and hold the same when desired, a tension or gripping device is provided comprising a thin gripping finger, or plate, 480, pivoted to the block at 481 so as to be movable edgewise in the slot 476. Preferably, the sides of this finger form a wedge, thinnest at its bottom end 482, and at that end being of the thickness of the width of the slot 476 at its inner end, so that when the finger is pressed inwardly against the inner wall of the slot it will press the cord against said wall and hold the same firmly with its end depending beyond the bottom face of the block. The gripping finger is provided with an operating device preferably comprising a rod 483 extending upwardly therefrom and provided with a lateral lug 484. A spring 485 normally keeps the tension finger pressed toward the inner wall of the slot 476. To facilitate threading the cord into the slot 476, the end face of the block 461 is cut away to disclose the end of the guiding opening 479, and the wall of the cut away portion is beveled or provided with a nose to easily guide the cord into the slot and beneath the tension finger.

Mounted at a suitable point on the frame is a bracket 486 having a portion 487 substantially horizontal, and pivotally mounted on the horizontal portion of the bracket is a trip or pawl 488 adapted to have substantially a horizontal movement, and preferably comprising ears 489 which extend on opposite sides of the bracket from a connecting plate 490. A spring 491 is secured to the bracket at one end and presses the pawl 488 laterally, the plate 490 contacting the bracket to determine the extreme lateral position of the pawl in one direction. The inner end of the plate 490 is adapted to contact the bracket at another point to restrict movement of the pawl in the opposite direction. The pawl 488 when in position is disposed to operate the gripping finger 480, as will hereinafter appear.

In this embodiment it is designed to secure the end of the cord to the box by placing it between the collar and the adjacent box body wall, and to accomplish this as the collar and the box body are assembled, provision is made for turning the end of the cord which depends from the bottom face of the block 461 over the edge of the box body wall so that when the collar and the box body are telescoped, as hereinbefore described, the end will be automatically located between the collar and wall, where it will be held by these glued parts. Pivoted at the end portion of the block 461 is a cord turning device comprising a downwardly extending rock lever or cord finger 492, having an inwardly inclined lower portion 493 terminating in an inwardly projecting nose portion 494 in alinement with the end wall of the slot 476, and with the cord depending therefrom. Preferably the nose has a flat upper face of sufficient extent transversely of the block to bridge the thin wall of the block at this point, and when moved across the face of said thin portion to project over the edge of the box body carrying the cord therewith which is pressed ahead of the nose by the upstanding outer face 495 of the nose portion. The cord finger 492 is pivoted between ears 496 also pivotally secured to the block or plate by a pin 497, to have a slight movement, and having a stop lug 498 with which an extension lug 499 of the cord finger lever may engage. The cord finger is provided with an arm 500, and a chain 501 extends from the outer portion of the arm 500 to the hook 475 on the lever 462. A spring 502 is connected to the arm 500 and to the block and operates to move the cord finger against the cord and across the edge of the box body in opposition to the movement imparted by the chain 501.

Fixed to the outer face of a laterally extending portion of the block 461 is a shear blade 503, with which coöperates another shear blade 504 pivoted to the block at 505, an arm 506 of which is pivotally attached to a link 507 having a slot 508 engaged by a pin 509 fixed to the carrier or jaw piece. When the completed boxes are ejected from the carrier the cord is designed to occupy a position between the shear blades and at a proper time will be severed thereby as the machine operates, as will appear hereinafter.

The operation of the cord applying and cutting mechanism will now be apparent. Assume a box body to have been pushed into the carriage and the cord to have been threaded through the guiding opening in the block to the slot, with its end depending from the bottom face of the block, the block being in its lowest position: Under these conditions the chain 501 is taut, thus keeping the nose of the cord finger away from the cord and box or in open position. The shears are in open position at this time, the pin 509 contacting the upper wall of slot 508. The gripping finger is free and is forced by the spring 485 against the cord in the slot. As the carriage begins to rotate the chain 501 slackens and the spring 502 throws the nose 494 against the cord and the latter across the edge of the box body, the nose holding the cord across the edge with its end projecting within the walls of the box body. On further rotation the cord operating parts remain as just stated, and when the box body is pushed onto the collar the cord is automatically seated between the adjacent walls of the collar and box body. Thus arranged, the box and collar are stripped from the former, and the carriage rotated in the opposite direction. At some point in the reverse rotation, preferably just prior to its completion, the lower portion of the lug 484 of the cord gripping device engages the pawl 488, which stops the motion of the tension finger. A slight further rotation relieves the grip on the cord, the high part of cam 470 operates on the rock lever 467 and the outer arm of lever 462 begins to rise. Before this the pin 471 was below the upper portion of the slot 472 in the connecting rod 473. As the arm of lever 462 rises the chain 501 is pulled to withdraw the nose piece from its position across the shoulder of the box, and this occurs before the pin 471 contacts the upper end of slot 472. When the nose is withdrawn, the pin 471 engages the end wall of the slot in rod 473, and the further upward movement of the lever 462 elevates the block, moving it relatively to the jaw piece. Both blades of the shears are elevated and remain in open position until the block has been elevated sufficiently to permit the box to pass it. The pusher then ejects the box from the carriage and the box carries the cord with it, drawing the cord freely, it being relieved of the tension, as explained. The pusher having operated to its limit, the trailing cord will be found between the blades of the shears and the pin 509 will be in contact with the lower wall of the slot 508. The cam 470 now gives a further slight upward movement to the block and as the rod 507 is now held by the pin 509, this slight upward movement closes the shears, thus severing the cord. At the same time the slight upward movement of the block is sufficient to permit the lug 484 to escape the pawl 488, and the spring 485 at once forces the gripping finger against the cord. The block now descends into position across the carriage to position the cord across the edge of the next box body, whereupon the operation described is repeated.

In the above described operation it will be noted that the spring 491 enables the lug 484 to freely pass the pawl when the carrier is rotating toward the former. It will further be observed that the extension of the cord from the point of attachment to the box to provide some length of cord for the purpose hereinbefore described is partly due to the disposition of the pusher fingers, the relation of which has been previously explained. The channel 384 into which the box is pushed from the carriage, has a slot 510 in its top in line with the cord, said slot allowing the cord to pass freely the edge of the channel without binding.

In order to partially dry the glue applied to the inside walls of the box bodies, an air blast pipe 511 having an elongated nozzle 512, opening toward the box bodies beneath the guideway leading from the expansible dauber is provided.

It will be observed that by the above described apparatus is produced a box having uniform continuous walls fully covered, and that the formation of the collar wall or neck wall comprises an efficient method for making box walls of flexible material and with little waste of the material. By folding the body blank and the cover blank and securing their ends by the scarfed or lapped joints, and subsequently folding the tongue of the cover over the joint to conceal the same, walls of practically uniform thickness throughout may be produced continuously and successively.

As many changes could be made in carrying out the above method, and in the above construction, and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent, is:—

1. In an apparatus of the character described, in combination, means for supporting box elements, means for assembling said elements to form a box member, and means for securing a cord to the box member.

2. In an apparatus of the character described, in combination, means for supporting a box collar and a box body, means adapted to telescope the body and collar to form a box, and means to secure a cord between the body and collar.

3. In an apparatus of the character described, in combination, means for supporting a box collar and a box body, means adapted to assemble the collar and the body to form a shouldered box, and means adapted to automatically coöperate with the aforesaid means to secure a cord at the shoulder.

4. In an apparatus of the character described, in combination, means for supporting a box collar and a box body, means adapted to telescope the body and collar to form a shouldered box, and means to secure a cord between the body and collar and extending from the shoulder.

5. In an apparatus of the character described, in combination, mechanism for forming a collar, means to support a box body, means adapted to assemble said collar and body to form a box, and means adapted to automatically coöperate with the aforesaid means to secure a cord to the box.

6. In an apparatus of the character described, in combination, mechanism for forming a collar, means to support a box body, means adapted to telescope the body and collar to form a box, and means to secure a cord between the body and collar.

7. In an apparatus of the character described, in combination, means to form a collar, means to support a box body, means adapted to telescope the body and collar to form a shouldered box, and means to secure a cord between the body and collar.

8. In an apparatus of the character described, in combination, means to form a collar, means to support a box body, means to secure the collar to the inner face of the box wall to project therefrom and form a shouldered box, and means to secure a cord between the collar and the box wall.

9. In an apparatus of the character described, in combination, means for supporting a collar, means for feeding a box body, means for telescoping the collar and body to form a box, and means to secure a cord between the collar and body.

10. In an apparatus of the character described, in combination, means for supporting a collar, means for feeding a box body, means for telescoping the collar and body to form a shouldered box, and means adapted to secure a cord between the collar and body at the shoulder.

11. In an apparatus of the character described, in combination, means for forming a collar, means for feeding a box body, means for telescoping the collar and body to form a box, and means to secure a cord between the collar and the body.

12. In an apparatus of the character described, in combination, means for forming a collar, means for feeding a box body, means for telescoping the collar and body to form a box, and means adapted to secure a cord between the collar and body at the shoulder.

13. In an apparatus of the character described, in combination, means for supporting a box collar and a box body, means to apply glue to one of said parts, means adapted to telescope the body and collar to secure them together, and means whereby a cord is located between the telescoped parts.

14. In an apparatus of the character described, in combination, means for supporting a box collar and a box body, means to apply glue to one of said parts, means adapted to telescope the body and collar to secure them together, and means to insert a cord between the body and collar whereby it may be secured by the glue.

15. In an apparatus of the character described, in combination, means for supporting box elements, means for applying glue to one of said elements, means to assemble said elements to form a shouldered box member, and means adapted to locate an end of a cord on the box member between the assembled parts.

16. In an apparatus of the character described, in combination, mechanism adapted to fold a collar-blank to form a collar, means to apply a box body to the collar to form a box, and means adapted to automatically coöperate with the aforesaid means to secure a cord to the box.

17. In an apparatus of the character described, in combination, means for forming a collar-blank having scarfed edges provided with adhesive and having a projecting tongue, means for folding the blank and superposing the scarfed edges, and means adapted to fold the tongue to cover the scarfed joint.

18. In an apparatus of the character described, in combination, means for supporting a blank having an end provided with adhesive, means for applying to the blank a cover having a sectional extension, means for folding a section over the edge of the blank, and joining the adhesive provided end of the blank with the opposite end, and means for folding another section over the edge of the joint.

19. In an apparatus of the character described, in combination, means for forming a collar-blank having scarfed edges, means for applying to the blank a cover having a sectional extension, means for folding a section over the edge of the blank, means for overlapping and adhesively joining the scarfed edges of the blank, and means for folding another section over the scarfed joint.

20. In an apparatus of the character described, in combination, means for feeding webs, means adapted to provide slits in one web, means to sever the other web, means to position the severed portion with its edges intersecting slitted portions of the slitted web, and means to sever the slitted web across the slitted portion.

21. In an apparatus of the character described, in combination, means for feeding webs, means adapted to provide slits in one web, means to sever the other web, means to position the severed portion with its edges intersecting slitted portions of the slitted web, and means to sever the slitted web across the slitted portion and substantially flush with one edge of the severed portion of the other web.

22. In an apparatus of the character described, in combination, means for feeding webs, means adapted to provide slits in one web, means to position the webs with the end of one web intersecting the slitted portion of the other, means to sever the slitted web across the slitted portion, and means to separately fold the resultant sections.

23. In an apparatus of the character described, in combination, means for feeding webs, means adapted to provide slits in one web, means to sever the other web, means to position the severed portion with its edges intersecting slitted portions of the slitted web, means to sever the slitted web across the slitted portion, and means to separately fold the resultant sections against the severed portion.

24. In an apparatus of the character described, in combination, means for feeding webs, means adapted to provide slits in one web, means to sever the other web, means to position the severed portion with its edges intersecting slitted portions of the slitted web, means to sever the slitted web across the slitted portion and substantially flush with one edge of the severed portion of the other web, and means to separately fold the resultant sections against the severed portion.

25. In an apparatus of the character described, in combination, means for feeding webs, means adapted to provide slits in one web, means to sever the other web, means to position the severed portion with its edges intersecting slitted portions of the slitted web, means to sever the slitted web across the slitted portion, means to fold a part of the slitted portion over the edge of the severed portion of the other web, means to join the ends of the severed portion, and means to fold the other part of the slitted portion over the edge of the joint.

26. In an apparatus of the character described, in combination, means for feeding webs, means whereby blanks are severed from said webs, positioned and secured one on the other with a tab extending from the edge of one of the severed portions, means for joining the ends of the combined blanks to form a collar, and means for folding the tab over the edge of the collar at the joint.

27. In an apparatus of the character described, in combination, means for feeding a body web, means for feeding a cover web and assembling the same with the body web so that the front end of the cover web projects beyond the front end of the body web, and means for folding a portion of the front end of the cover web around the front end of the body web leaving a projecting tongue of the cover web, comprising a bar having a movement around the front edge of the body web.

28. In an apparatus of the character described, in combination, means for feeding and positioning a body web and a cover web so that the front end of the cover web projects beyond the front end of the body web, a bar extending the width of the cover web and comprising a folding portion less than the length of the bar, and means for moving said bar around the front end of the body web to fold a portion of the cover web on the body web and leave a projecting unfolded portion.

29. In an apparatus of the character described, in combination, means for feeding and positioning a body web and a cover web so that the front end of the cover web projects beyond the front end of the body web, a bar extending the width of the cover web and comprising a folding portion less than the length of the bar, means for moving said bar around the front end of the body web to fold a portion of the cover web on the body web and leave a projecting unfolded portion, and means coöperating with the bar to press together the body web and the cover web.

30. In an apparatus of the character described, in combination, means for feeding and positioning a body web and a cover web so that the front end of the cover web projects beyond the front end of the body web, a bar extending the width of the cover web and comprising a folding portion less than the length of the bar, means for moving said bar around the front end of the body web to fold a portion of the cover web on the body web and leave a projecting unfolded portion, and a presser bar adapted to coöperate with the first bar.

31. In an apparatus of the character described, in combination, means for feeding and positioning a body web and a divided cover web so that the front end of the cover web projects beyond the front end of the body web, means for folding a section of the front end of the cover web around the front end of the body web and pressing together the folded parts, comprising a combined folding and pressing bar adapted to move around the front edge of the body web to one side thereof for folding a section of the cover web thereon, and a presser bar movable toward and from the opposite side of the body and the folded part of the cover web.

32. In an apparatus of the character described, in combination, means for feeding and positioning a body web, and a divided cover web so that the front end of the cover web projects beyond the front end of the body web, a presser bar opposite the sections of the divided web and having a folding extension terminating in line with a line of division between the sections, and means for moving the bar around the front edge of the body web.

33. In an apparatus of the character described, in combination, means for feeding and positioning a body web and a divided cover web so that the front end of the cover web projects beyond the front end of the body web, a plate in front of the ends of the webs comprising an opening opposite a section of the cover web, a pressing flange projecting therefrom, a folding flange also projecting therefrom opposite the other section of the cover web, means to move the plate to fold a section of the cover web around the end of the body web, and a presser bar adapted to move toward and from said pressing flange.

34. In an apparatus of the character described, in combination, a folding element adapted to span a web and comprising a plate, a folding flange projecting angularly therefrom, and an opening in the plate adjacent the end of the flange.

35. In an apparatus of the character described, in combination, a vertically arranged plate having a horizontally projecting flange and an opening adjacent the end of the flange, and a second plate alongside the first and movable toward and from the flange.

36. In an apparatus of the character described, in combination, a carriage comprising relatively movable arms adapted to support a box, toggle links connected to the arms, means to operate the links to move the arms toward and from each other, and means to move the carriage.

37. In an apparatus of the character described, in combination, a carriage comprising relatively movable arms adapted to support a box, toggle links connected to the arms, means to move the carriage, and means whereby at a point in the movement of the carriage the links are operated to move the arms toward and from each other.

38. In an apparatus of the character described, in combination, a carriage comprising pivoted supporting arms, links connected to said arms, a pin connected to said links, means to move the carriage, and a plunger adapted to operate said pin to move the arms toward and from each other.

39. In an apparatus of the character described, in combination, relatively movable members having flanges adapted to support a box, means to move said members toward each other to press the box, and means to quickly release the moving force without causing disengagement of the box from said members.

40. In an apparatus of the character described, in combination, relatively movable members having angularly disposed flanges adapted to support a box, means to move said members while preserving their relative position, means to move said members toward each other thereby exerting pressure on the box, and means to quickly release the moving force while maintaining the box in supported position on said members.

41. In an apparatus of the character described, in combination, concentric shafts, means to oscillate the same, a second shaft, relatively movable members adapted to support a box and carried by said second shaft, connections between the members and the second shaft to oscillate the members without changing their relative position, connections between the members and one of the concentric shafts to oscillate the members in a path intersecting the path of first oscillation, without changing their relative position, and connections between the members and the other concentric shaft to move the members toward and from each other.

42. In an apparatus of the character described, in combination, a supporting plate, means for supporting a rod thereon to slide but not to rotate, a bearing sleeve carried by the rod, a shaft extending through said sleeve, a box supporting carriage on the shaft, and means to oscillate the shaft.

43. In an apparatus of the character described, in combination, a supporting plate, means for supporting a rod thereon to slide but not to rotate, a bearing sleeve carried by the rod, a shaft extending through said sleeve, a box supporting carriage on the shaft, and means to reciprocate the rod.

44. In an apparatus of the character described, in combination, a supporting plate, means for supporting a rod thereon to slide but not to rotate, a bearing sleeve carried by the rod, a shaft extending through said sleeve, a box supporting carriage on the shaft, means to oscillate the shaft, and means to reciprocate the rod.

45. In an apparatus of the character described, in combination, a shaft mounted to axially turn and to reciprocate transversely to its axis, relatively movable box supporting members carrier by said shaft, means to oscillate said shaft to move the box supporting members bodily without changing their position relative to each other, means to reciprocate the shaft between the beginning and the end of said oscillatory movement, and means to move the box supporting members toward and from each other at a predetermined point of their bodily movement.

46. In an apparatus of the character described, in combination, a collar support, relatively movable box supporting and pressing members, a shaft, and operating connections between the shaft and the members to cause the members to apply the box to the collar and to press the box and collar together.

47. In an apparatus of the character described, in combination, means for supporting a box, means for directing a cord across the edge of the box, means for supporting a collar, and means for assembling the body, collar and cord.

48. In an apparatus of the character described, in combination, means for supporting a box, means for directing a cord across the edge of the box, means for supporting a collar, means for assembling the body, collar, and cord, and means for providing a length of cord extending from the assembled box.

49. In an apparatus of the character described, in combination, means for supporting a box, means for directing a cord across the edge of the box, means for supporting a collar, means for assembling the body, collar and cord, and means for severing the cord.

50. In an apparatus of the character described, in combination, means for supporting a box, means for directing a cord across the edge of the box, means for supporting a collar, means for assembling the body, collar and cord, and means for severing the cord at a point to provide a length thereof extending from the assembled box.

51. In an apparatus of the character described, in combination, an oscillatory carriage adapted to support a box body, a supporting piece adapted to reciprocate on the carriage, and means carried by the supporting piece to direct a cord across the edge of the box body.

52. In an apparatus of the character described, in combination, an oscillatory carriage adapted to support a box body, a supporting piece adapted to reciprocate on the carriage, and means carried by the supporting piece to direct a cord across the edge of the box body and to tension the cord.

53. In an apparatus of the character described, in combination, a carriage adapted to support a box body, a supporting piece adapted to reciprocate on the carriage, and means carried by the supporting piece to direct a cord across the edge of the box body to tension the cord and to cut the cord.

54. In an apparatus of the character described, in combination, an oscillatory carriage adapted to support a box body, cord supporting means adapted to slide thereon, a yielding cord finger on the sliding support, means to slide the supporting means relatively to the carriage to cause the cord finger to move transverse to the box body to direct the cord across the edge of the box body, and means to withdraw the cord finger.

55. In an apparatus of the character described, in combination, a collar support, a carriage adapted to support a box body, a sliding support, cord applying means and cord cutting means carried by the sliding support, means to assemble the body and collar, and means to move the sliding support with respect to the carriage to attach the cord to the box and sever the cord.

56. In an apparatus of the character described, in combination, a box body support, cord carrying and cutting means comprising a sliding supporting piece, a cord finger pivoted thereto and adapted to direct the cord across the box body, shearing mechanism comprising a knife pivoted on the sliding support, and means whereby movement of the supporting piece directs the cord across the edge of the box and subsequently cuts the same at a distance from the point where the cord is attached to the box.

57. In an apparatus of the character described, in combination, a support, means for forming a box collar thereon, means for applying a box body to the collar while on said support, and means for stripping the structure so formed from the support.

58. In an apparatus of the character described, in combination, a support for a box collar, relatively movable members adapted to support a box, stripping mechanism connected to the relatively movable members, and means for moving the members to apply the box to the collar and strip the combined box structure from the support.

59. In an apparatus of the character described, in combination, a support for a box collar, relatively movable members adapted to support a box, stripping fingers pivotally connected to the members, and means for simultaneously applying the box to the collar and placing the fingers in stripping engaging position with the box.

60. In an apparatus of the character described, in combination, a carriage comprising relatively movable supporting arms adapted to contact a box, stripper fingers pivotally connected respectively to said arms, and springs to move the fingers toward each other.

61. In an apparatus of the character described, in combination, means for supporting a box element, means for applying a second box element to the first, and means carried by the second means to press the elements together transversely of their faces.

62. In an apparatus of the character described, in combination, a carriage comprising relatively movable arms adapted to support a box, toggle links pivoted to said arms, stripper fingers pivoted to said arms in line with the pivotal connection between the arms and links, and comprising hooks, springs connecting said stripper fingers and adapted to yieldingly hold the hooks in substantial alinement with the supporting arms, and means to move the toggle links to open and close the arms.

63. In an apparatus of the character described, in combination, a support, a plate pivoted thereon having an inclined slot, a circular rotatable knife mounted in said slot, a spring adapted to yieldingly restrain the knife from movement in the slot, a bell crank, a link pivotally connected to the plate and the bell crank, a rock shaft, an arm thereon, and a rod connected to the arm and to the bell crank.

64. In an apparatus of the character described, in combination, a support for a collar having an extended tab, a folding finger, and means to move said finger across the edge of the collar and to position between the walls thereof to fold the tab around the edge of the collar.

65. In an apparatus of the character described, in combination, a former having a recessed portion adapted to support a collar having a tab opposite said recess, a folding finger, and means to move the finger across the edge of the collar and into said recess opposite the wall of the collar to fold the tab around the edge of the collar.

66. In an apparatus of the character described, in combination, a former having a recessed portion adapted to support a collar having an extending portion opposite said recess, a folding finger, means to move said finger across the edge of the collar and into the recess opposite the wall of the collar to fold the extending portion around the edge of the collar, a presser finger, and means to move the presser finger to squeeze the folded parts between it and the folding finger.

67. In an apparatus of the character described, in combination, a shaft, an arm secured thereto, a folding finger pivoted to said arm, a presser finger pivoted to said shaft, means for yieldingly connecting the arm and the presser finger, means to hold the folding finger apart from the presser finger, a head adapted to support a part to be folded, and means to rock the shaft toward and from the head.

68. In an apparatus of the character described, in combination, a shaft, an arm secured thereto, a folding finger pivoted to said arm, a presser finger pivoted to said shaft, a light spring connecting the arm and the presser finger, a stronger spring adapted to hold the folding finger apart from the presser finger, a head adapted to support a part to be folded, and means to rock the shaft toward and from the head.

69. In an apparatus of the character described, in combination, a shaft, an arm secured thereto, a presser finger pivotally mounted on the shaft, a spring connecting the arm and finger, and means for adjusting the relation between said arm and finger.

70. In an apparatus of the character described, in combination, a shaft, an arm secured thereto, a presser finger pivoted on the shaft, a folding finger pivoted on the arm on a different center from the pivot of the presser finger, means for yieldingly maintaining the ends of the folding finger and the presser finger apart, a former, and means for rocking the shaft to move the fingers to and from the former.

71. In an apparatus of the character described, in combination, a shaft, a folding finger pivotally connected thereto, a presser finger pivoted thereto on a different center from the folding finger, and means whereby the folding and presser fingers are moved toward and from each other.

72. In an apparatus of the character described, in combination, a guideway for a series of contiguous boxes, an endless carrier adapted to move in the guideway, and weights pivotally connected to the guideway to prevent the boxes from buckling in the guideway, said guideway comprising a flange projecting into the guideway above the boxes.

73. In an apparatus of the character described, in combination, a carriage adapted to support a box, means to support a cord, means adapted to secure the cord to the box, means adapted to move the box and thereby provide a trailing portion of cord and means adapted to sever said cord at a point remote from said box.

74. In an apparatus of the character described, in combination, a carriage adapted to support a box body, means adapted to support a collar, means adapted to support a cord, mechanism whereby the box body, collar and cord are assembled to produce a box, means to move the box to provide a trailing cord, and means to sever the cord.

75. In an apparatus of the character described, in combination, a former comprising a rectangular block having a shoulder around three sides, a recess opening into two angularly situated faces of the block, the shoulder on one side having a recess in alinement with the recess in the side, and slots on opposite sides of said recesses.

76. In an apparatus of the character described, in combination, a movable former, a folding finger pivotally mounted thereon, and a presser jaw pivotally mounted thereon and adapted to coöperate with said finger to press a folded element therebetween.

77. In an apparatus of the character described, in combination, a movable former and a folding device carried thereby comprising a rock shaft, a folding finger movably mounted on the shaft, a presser jaw movably mounted on the shaft, and means adapted to cause the finger and jaw to move toward and from each other.

78. In an apparatus of the character described, in combination, a movable former and a folding device carried thereby comprising a rock shaft, a folding finger movably mounted on the shaft, a presser jaw movably mounted on the shaft, and means adapted to cause the finger and jaw to move toward the former.

79. In an apparatus of the character described, in combination, a movable former and a folding device carried thereby comprising a rock shaft, a folding finger movably mounted on the shaft, a presser jaw movably mounted on the shaft, and means adapted to cause the finger and jaw to move toward and from each other, comprising an arm on the rock shaft adapted to move the jaw in one direction.

80. In an apparatus of the character described, in combination, a movable former and a folding device carried thereby comprising a rock shaft, a folding finger movably mounted on the shaft, a presser jaw movably mounted on the shaft, and means adapted to cause the finger and jaw to move toward the former, comprising an arm on the rock shaft adapted to move the jaw.

81. In an apparatus of the character described, in combination, a movable former, a folding finger and presser jaw mounted thereon, and means adapted to move the finger and jaw toward and from the former comprising springs movable with the former and adapted to move the parts in one direction.

82. In an apparatus of the character described, in combination, a movable former, a folding finger and a presser jaw mounted thereon to move toward and from the former and toward and from each other, and means to positively move the finger and jaw in one direction.

83. In an apparatus of the character described, in combination, a movable former, a folding finger and a presser jaw mounted thereon to move toward and from the former and toward and from each other, springs adapted to move the finger and jaw toward the former, and cam mechanism adapted to positively cause their movement in the opposite direction.

84. In an apparatus of the character described, in combination, a former, a folding finger and a presser jaw mounted thereon adapted to move toward and from each other, elastic connections to the finger and jaw adapted to cause movement toward the former, and means to positively move the finger and jaw from the former.

85. In an apparatus of the character described, in combination, a former, a presser jaw pivoted thereon, a folding finger eccentrically pivoted with respect to the presser jaw and movable toward and from the same, and means to move the finger and jaw toward and from the former.

86. In an apparatus of the character described, in combination, a former, a shaft carried thereby having an arm, a presser jaw pivotally connected to the shaft, a folding finger pivoted on the arm and movable toward and from said jaw, and means to move the finger and jaw toward and from the former.

87. In an apparatus of the character described, in combination, a former, a rock shaft thereon having an arm, a presser jaw concentrically pivoted on the rock shaft, a folding finger pivoted on the arm eccentric to the jaw, a spring between the arm and jaw adapted to yieldingly hold the same in contact, a spring connected to the folding finger and the former, a spring connected to the rock shaft and adapted to cause movement in one direction, and means to cause positive movement of the rock shaft in the opposite direction.

88. In an apparatus of the character described, in combination, a movable former, means adapted to feed a blank thereto, means mounted thereon adapted to clamp a blank thereto, and means carried thereby adapted to fold the blank.

89. In an apparatus of the character described, in combination, a movable former, means adapted to feed a blank thereto, clamping and folding mechanisms carried thereby, and means to operate said mechanisms to secure a blank to the former and fold the same.

90. In an apparatus of the character described, in combination, a rotary former, clamping and folding mechanisms mounted on the former and adapted to clamp and fold a collar-blank, cam mechanism mounted concentrically with the former, operating connections between the cam mechanism and the clamping and folding mechanism, means to rotate the former, and means to operate the cam mechanisms.

91. In an apparatus of the character described, in combination, a rotary former, clamping and folding mechanisms mounted thereon and adapted to clamp and fold a collar-blank, a cam mounted concentrically to the former, operating connections between the cam and the clamping and folding mechanisms, means to rotate the former step by step, and means adapted to oscillate the cams.

92. In an apparatus of the character described, in combination, a rotary former, a folding and pressing device pivoted thereon adapted to move toward and from the former, a cam mounted concentrically to the former, means to oscillate the cam intermittently, means to rotate the former step by step, means whereby the movement of the cam in one direction causes the folding and pressing device to move toward the former to fold and press a collar-blank, and means whereby the movement of the former causes the release of the folding and pressing device.

93. In an apparatus of the character described, in combination, a rotary carrier comprising a plurality of formers, folding mechanisms thereon for each former, a cam mounted concentrically to the carrier, means to oscillate the cam, means to rotate the carrier intermittently, means whereby the movement of the cam in one direction causes the folding mechanism of a former to move toward a former to fold a collar-blank, and the folding mechanism of another former to move therefrom, and means whereby the movement of the carrier causes the folding mechanism of a former to move therefrom.

94. In an apparatus of the character described, in combination, a rotary carrier comprising a plurality of formers, folding and pressing mechanism thereon for each former, a cam mounted concentrically to the carrier, means to oscillate the cam, means to rotate the carrier intermittently, means whereby the movement of the cam in one direction causes the folding and pressing mechanism of a former to move toward a former to fold a collar-blank, and the folding and pressing mechanism of another former to move therefrom, and means whereby the movement of the carrier causes the folding and pressing mechanism of a former to move therefrom.

95. In an apparatus of the character described, in combination, a rotary carrier comprising a plurality of formers, clamping mechanism for each former mounted on the carrier, folding and pressing mechanism for each former mounted on the carrier, a cam mounted concentrically to the carrier, means to oscillate the cam, means to rotate the carrier intermittently, means whereby the movement of the cam in one direction causes a clamping mechanism and a folding and pressing mechanism to move toward a former and another clamping mechanism and folding and pressing mechanism to move from a former, and means whereby the movement of the carrier causes a folding mechanism to move from a former.

96. In an apparatus of the character described, in combination, an oscillatory carriage comprising relatively movable box supporting arms, a movably mounted supporting block, and a cord gripping finger carried by the block.

97. In an apparatus of the character described, in combination, an oscillatory carriage comprising relatively movable box supporting arms, a movably mounted supporting block, and a cord cutting mechanism carried by the block.

98. In an apparatus of the character described, in combination, devices adapted to hold box elements, respectively, means adapted to cause relative movement between said holding devices to assemble said elements to form a box member, and means adapted to secure a cord to the box member between said assembled elements.

99. In an apparatus of the character described, in combination, a device adapted to hold a collar, a device adapted to hold a flange, said devices being movable relatively to each other in the same general plane, means adapted to move one of said devices toward the other and cause the plane of the edge of the collar to be disposed at an angle to the plane of the proximate edge of the flange, and means adapted to cause said collar and flange to overlap each other with the sides of the collar and flange parallel to each other.

100. In an apparatus of the character described, in combination, a movable device adapted to hold a collar, a movable device adapted to hold a flange, said devices being movable relatively to each other in the same general plane, means adapted to move one of said devices toward the other and cause the plane of the edge of the collar to overlap and be disposed at an angle to the plane of the proximate edge of the flange, and means adapted to thereafter cause said collar and flange to overlap each other with the sides of the collar and flange parallel to each other.

101. In an apparatus of the character described, in combination, a device adapted to hold a collar, a device adapted to hold a flange, means adapted to move one of said devices toward the other and cause the plane of the edge of the collar to overlap and be disposed at an angle to the plane of the proximate edge of the flange, and means adapted to cause said collar and flange to overlap each other with the sides of the collar and flange parallel to each other, and means adapted to assemble a cord with said collar and flange.

102. In an apparatus of the character described, in combination, a device adapted to hold a collar, a device adapted to hold a flange, means adapted to move one of said devices toward the other and cause the plane of the edge of the collar to overlap and be disposed at an angle to the plane of the proximate edge of the flange, means adapted to thereafter cause said collar and flange to overlap each other with the sides of the collar and flange parallel to each other, and means adapted to cause a cord to be disposed between the collar and flange when overlapped.

103. In an apparatus of the character described, in combination, a device adapted to hold a collar, a device adapted to hold a flange, means adapted to move one of said devices toward the other and cause the plane of the edge of the collar to be disposed at an angle to the plane of the proximate edge of the flange, means adapted to cause said collar and flange to overlap each other with the sides of the collar and flange parallel to each other, and means adapted to dispose a cord between points of adjacent planes of the elements to be assembled prior to the overlapping of said points of said planes.

104. In an apparatus of the character described, in combination, a device adapted to hold a collar, a device adapted to hold a flange, means adapted to move one of said devices toward the other and cause the plane of the edge of the collar to be disposed at an angle to the plane of the proximate edge of the flange, means adapted to cause said collar and flange to overlap each other with the sides of the collar and flange parallel to each other, and means adapted to dispose a cord across the proximate edge of one of the members to be overlapped prior to overlapping said members.

105. In an apparatus of the character described, in combination, a device adapted to hold a collar, a device adapted to hold a flange, means adapted to move one of said devices toward the other and cause the plane of the edge of the collar to be disposed at an angle to the plane of the proximate edge of the flange, means adapted to cause said collar and flange to overlap each other with the sides of the collar and flange parallel to each other, and means adapted to dispose a cord across the proximate edge and between the sides of one of the members to be overlapped prior to overlapping said members.

106. In an apparatus of the character described, in combination, a device adapted to hold a collar, a device adapted to hold a flange, means adapted to move one of said devices toward the other and cause the plane of the edge of the collar to be disposed at an angle to the plane of the proximate edge of the flange, means adapted to cause said collar and flange to overlap each other with the sides of the collar and flange parallel to each other, and means adapted to dispose a cord across the proximate edge of one of the members to be overlapped prior to overlapping said members and to hold said cord during the overlapping movement.

107. In an apparatus of the character described, in combination, a collar holder, a supporting member, relatively movable box body supporting jaws carried by said member, means adapted to move said member to cause the box body to telescopically assemble with the collar, and means adapted to cause said jaws to press the collar and body together after assembly.

108. In an apparatus of the character described, in combination, a collar holder, a supporting member, relatively movable box body supporting jaws pivotally mounted on said member, means adapted to move said member to cause the box body to telescopically assemble with the collar, and means adapted to cause said jaws to press the collar and body together after assembly comprising a trip lever and a trip finger adapted to cooperate with said lever.

109. In an apparatus of the character described, in combination, a collar holder, a supporting member, relatively movable box body supporting jaws pivotally mounted on said member, means adapted to move said member to cause the box body to telescopically assemble with the collar, means adapted to cause said jaws to press the collar and body together after assembly comprising a movable pin on said member, and links connecting said pin and said jaws.

110. In an apparatus of the character described, in combination, a collar holder, a supporting member, relatively movable box body supporting jaws pivotally mounted on said member, means adapted to move said member to cause the box body to telescopically assemble with the collar, means adapted to cause said jaws to press the collar and body together after assembly comprising a movable pin on said member, and links connecting said pin and said jaws, a reciprocating plunger adapted to contact said pin, a trip lever connected to said plunger, and a movable trip finger adapted to contact said lever.

111. In an apparatus of the character described, in combination, a collar holder, a rock shaft, pivoted box body supporting jaws carried by said shaft, means adapted to move said shaft to cause the box body to telescopically assemble with the collar, comprising a pin disposed in an opening in said shaft, links pivotally connected to said pin and said jaws, a rock arm, a rod loosely journaled on said shaft, and having a slot in alinement with said pin, said rod pivotally connected to said rock arm, a plunger mounted on said rod and adapted to engage said pin, and means adapted to cause said plunger to move said pin in a direction to cause movement of said jaws toward each other when said collar and box are assembled.

112. In an apparatus of the character described, in combination, a collar holder, a supporting member, oppositely disposed box body supporting jaws carried by said member, means adapted to move said member to cause the box body to telescopically assemble with the collar, and a plurality of relatively movable fingers adapted to move with said supporting member and strip the assembled elements from said holder.

113. In an apparatus of the character described, in combination, a collar holder, a supporting member, oppositely disposed box body supporting jaws pivoted on said member, means adapted to move said member to cause the box body to telescopically assemble with the collar, and a plurality of oppositely disposed relatively movable fingers pivoted on said jaws respectively adapted to move with said supporting member and strip the assembled elements from said holder.

114. In an apparatus of the character described, in combination, a collar holder, a supporting member, oppositely disposed box body supporting jaws pivoted on said member, means adapted to move said member to cause the box body to telescopically assemble with the collar, means adapted to move said jaws toward each other when the collar and body are assembled, and a plurality of oppositely disposed relatively movable fingers pivoted on said jaws respectively, adapted to move with said supporting member and strip the assembled elements from said holder.

115. In an apparatus of the character described, in combination, mechanism adapted to form a box collar comprising a body strip and a cover strip, means adapted to support another box element comprising a flange adapted to receive said collar, and means adapted to assemble said elements.

116. In an apparatus of the character described, in combination, mechanism adapted to form a box collar comprising a body strip and a cover strip, means adapted to support a box body comprising a flange, and means adapted to cause said collar and flange to telescopically engage each other.

117. In an apparatus of the character described, in combination, mechanism adapted to form a box collar comprising a body strip and a cover strip, means adapted to support a box body comprising a flange, means adapted to cause said collar and flange to telescopically engage each other, and means adapted to attach one end of a cord to said assembled elements.

118. In an apparatus of the character described, in combination, means for supporting box elements, means adapted to automatically supply box elements to said means, means adapted to assemble said elements to form a box member, and means adapted to automatically coöperate with said assembly means to adhesively attach a cord to said member.

119. In an apparatus of the character described, in combination, means for forming a collar-blank having beveled edges adapted to overlap and a projecting tongue, means for folding the blank and overlapping the beveled edges, and means adapted to fold the tongue to cover the joint formed by said overlapping edges.

120. In an apparatus of the character described, in combination, means for feeding webs into position with the edge of one extending beyond the edge of another, means to divide the extended portion into sections, means adapted to fold one of said sections over the edge of the other web, and means adapted to sever said webs on lines longitudinally spaced from the advancing edges of said webs, respectively.

121. In an apparatus of the character described, in combination, means for feeding webs into position with the edge of one extending beyond the edge of another, means to divide the extended portion into sections longitudinally of one web, means adapted to fold one of said sections over the edge of the other web, and means adapted to sever said webs on lines longitudinally spaced from the advancing edges of said webs, respectively.

122. In an apparatus of the character described, in combination, means adapted to supply a plurality of continuous webs, means adapted to feed said webs and superpose end portions thereof with the interposition of adhesive, the edge of one extending beyond the edge of the other, means adapted to divide said extended portion into sections, means adapted to fold one of said sections over the edge of the other web, and adhesively secure the same thereto, and means adapted to sever said webs on lines spaced from the advancing edges of said webs, respectively.

123. In an apparatus of the character described, in combination, mechanism adapted to feed a body strip and a cover strip, slitting mechanism, severing mechanism, folding mechanism, and means adapted to cause said mechanisms to coöperate to superpose said strips so that an edge of the cover strip extends beyond the edge of the body strip, provide a slit in the extended portion of said cover strip, fold the extended portion at one side of said slit around the adjacent portion of the body strip, sever said strips to produce superposed blanks, fold said blanks at an angle to the plane of folding of said first mentioned fold thereby forming a tubular element, and fold said extended portion at the other side of said slit onto said tubular element over the adjacent edge of said tubular element opposite the joint thereof.

124. In an apparatus of the character described, in combination, mechanism adapted to intermittently feed a body strip and a cover strip, severing mechanism comprising a movably mounted slitting knife, folding mechanism, and means adapted to cause said mechanisms to coöperate to superpose said strips so that an edge of the cover strip extends beyond the edge of the body strip, said knife to slit said cover strip while the latter is in motion and thereby provide a slit in the extended portion of said cover strip, fold the extended portion at one side of said slit around the adjacent portion of the body strip, sever said strips to produce superposed blanks, fold said blanks at an angle to the plane of folding of said first-mentioned fold thereby forming a tubular element, and fold said extended portion at the other side of said slit onto said tubular element over the adjacent edge of said tubular element opposite the joint thereof.

125. In an apparatus of the character described, in combination, mechanism adapted to intermittently feed a body strip and a cover strip, slitting mechanism comprising a rotary slitting disk mounted to move toward and from said cover strip, severing mechanism, folding mechanism, and means adapted to cause said mechanisms to coöperate to superpose said strips so that an edge of the cover strip extends beyond the edge of the body strip, press said disk against said cover strip when the latter is in motion, to thereby provide a slit in the extended portion of said cover strip, fold the extended portion at one side of said slit around the adjacent portion of the body strip, sever said strips to produce superposed blanks, fold said blanks at an angle to the plane of folding of said first-mentioned fold thereby forming a tubular element, and fold said extended portion at the other side of said slit onto said tubular element over the adjacent edge of said tubular element opposite the joint thereof.

126. In a apparatus of the character described, in combination, mechanism adapted to intermittently feed a body strip and a cover strip, slitting mechanism, comprising a rotary spring pressed slitting disk mounted to move toward and from said cover strip, severing mechanism, folding mechanism, and means adapted to cause said mechanisms to coöperate to superpose said strips so that an edge of the cover strip extends beyond the edge of the body strip, press said disk against said cover strip when the latter is in motion, to thereby provide a slit in the extended portion of said cover strip, fold the extended portion at one side of said slit around the adjacent portion of the body strip, sever said strips to produce superposed blanks, fold said blanks at an angle to the plane of feeding of said first-mentioned fold thereby forming a tubular element, and fold said extended portion at the other side of said slit onto said tubular element over the adjacent edge of said tubular element opposite the joint thereof.

127. In an apparatus of the character described, in combination, mechanism adapted to intermittently feed a body strip and a cover strip, slitting mechanism, comprising a rotary slitting disk mounted to move toward and from said cover strip, severing mechanism, folding mechanism, and means adapted to cause said mechanisms to coöperate to superpose said strips so that an edge of the cover strip extends beyond the edge of the body strip, press said disk against spaced alined portions of said cover strip when the latter is in motion, to thereby provide a slit in the extended portion of said cover strip, fold the extended portion at one side of said slit around the adjacent portion of the body strip, sever said strips to produce superposed blanks, fold said blanks at an angle to the plane of folding of said first-mentioned fold thereby forming a tubular element, and fold said extended portion at the other side of said slit onto said tubular element over the adjacent edge of said tubular element opposite the joint thereof.

128. In an apparatus of the character described, in combination, mechanism adapted to feed a body strip and a cover strip, slitting mechanism, severing mechanism comprising a plurality of transversely operating cutters, folding mechanism, and means adapted to cause said mechanisms to coöperate to superpose said strips so that an edge of the cover strip extends beyond the edge of the body strip, provide a slit in the extended portion of said cover strip, fold the extended portion at one side of said slit around the adjacent portion of the body strip, sever said strips to produce superposed blanks, fold said blanks at an angle to the plane of folding of said first-mentioned fold thereby forming a tubular element, and fold said extended portion at the other side of said slit onto said tubular element over the adjacent edge of said tubular element opposite the joint thereof.

129. In an apparatus of the character described, in combination, mechanism adapted to feed a body strip and a cover strip, slitting mechanism, severing mechanism comprising a plurality of transversely operating cutters, folding mechanism, and means adapted to cause said mechanisms to coöperate to superpose said strips so that an edge of the cover strip extends beyond the edge of the body strip, provide a slit in the extended portion of said cover strip, fold the extended portion at one side of said slit around the adjacent portion of the body strip, cause said cutters to respectively sever said strips at different times to produce superposed blanks, fold said blanks at an angle to the plane of folding of said first-mentioned fold thereby forming a tubular element, and fold said extended portion at the other side of said slit onto said tubular element over the adjacent edge of said tubular element opposite the joint thereof.

130. In an apparatus of the character described, in combination, mechanism adapted to feed a body strip and a cover strip, slitting mechanism, severing mechanism comprising a plurality of transversely operating cutters, folding mechanism, and means adapted to cause said mechanisms to coöperate to superpose said strips so that an edge of the cover strip extends beyond the edge of the body strip, provide a slit in the extended portion of said cover strip, fold the extended portion at one side of said slit around the adjacent portion of the body strip, cause said cutters to respectively sever said strips, at different times at equal distances from the folded edge of the first-mentioned fold to produce superposed blanks, fold said blanks at an angle to the plane of folding of said first-mentioned fold thereby forming a tubular element and fold said extended portion at the other side of said slit onto said tubular element over the adjacent edge of said tubular element opposite the joint thereof.

131. In an apparatus of the character described, in combination, mechanism adapted to feed a body strip and a cover strip, slitting mechanism, severing mechanism, folding mechanism comprising a cover strip folding jaw movable relatively to said strip, and means adapted to cause said mechanisms to coöperate to superpose said strips so that an edge of the cover strip extends beyond the edge of the body strip, provide a slit in the extended portion of said cover strip, move said folding jaw against the extended portion of the cover strip and fold the extended portion thereof at one side of said slit around the adjacent portion of the body strip, sever said strips to produce superposed blanks, fold said blanks at an angle to the plane of folding of said first-mentioned fold thereby forming a tubular element, and fold said extended portion at the other side of said slit onto said tubular element over the adjacent edge of said tubular element opposite the joint thereof.

132. In an apparatus of the character described, in combination, mechanism to feed a body strip and a cover strip, slitting mechanism disposed to slit the cover strip within the width of the body strip, means adapted to cause said mechanisms to coöperate to superpose said strips so that a slitted edge of the cover strip extends beyond the edge of the body strip, a combined folding and pressing jaw transversely disposed relative to said body strip at one side of the slit of said extended portion, means adapted to move said combined folding and pressing jaw around the edge of said body strip to fold the cover strip thereon at one side of the slitted portion, a presser jaw disposed to coöperate with said combined folding and pressing jaw to press said interfold parts, severing mechanism, supplementary folding devices, and means adapted to cause said severing mechanism and supplementary folding devices to operate to sever said strips to produce superposed blanks, fold said blanks at an angle to the plane of folding of said first-mentioned fold thereby forming a tubular element, and fold said extended portion at the other side of said slit onto said tubular element over the adjacent edge of said tubular element opposite the joint thereof.

133. In an apparatus of the character described, in combination, mechanism adapted to feed a body strip and a cover strip, slitting mechanism disposed to slit the cover strip within the width of the body strip, means adapted to cause said mechanisms to coöperate to superpose said strips so that a slitted edge of the cover strip extends beyond the edge of the body strip, a jaw transversely disposed relative to said body strip adjacent the front edge thereof, said jaw comprising a folding portion terminating adjacent said slit at one side thereof, and a pressing portion at opposite sides of said slit, means adapted to move said jaw around the edge of said body strip to fold the cover strip thereon at one side of the slitted portion, a presser jaw disposed to coöperate with the pressing portion of said first-mentioned jaw to press the assembled body strip and cover strip at opposite sides of said slit, severing mechanism, supplementary folding devices, and means adapted to cause said severing mechanism and supplementary folding devices to operate to sever said strips to produce superposed blanks, fold said blanks at an angle to the plane of folding of said first-mentioned fold thereby forming a tubular element, and fold said extended portion at the other side of said slit onto said tubular element over the adjacent edge of said tubular element opposite the joint thereof.

134. In an apparatus of the character described, in combination, mechanism adapted to feed a body and a cover strip, slitting mechanism disposed to slit the cover strip within the width of the body strip, means adapted to cause said mechanisms to coöperate to superpose said strips so that a slitted edge of the cover strip extends beyond the edge of the body strip, a jaw transversely disposed relative to said body strip adjacent the front edge thereof, said jaw comprising a cutter platen, co-extensive with the width of the cover strip, a folding portion terminating adjacent said slit at one side thereof, and a pressing portion at opposite sides of said slit, means adapted to move said jaw around the edge of said body strip to fold the cover strip thereon at one side of the slitted portion, a presser jaw disposed to coöperate with the pressing portion of said first-mentioned jaw to press the assembled body strip and cover strip at opposite sides of said slit, severing mechanism, supplementary folding devices, and means adapted to cause said severing mechanism and supplementary folding devices to operate to sever said strip to produce superposed blanks, fold said blanks at an angle to the plane of folding of said first-mentioned fold thereby forming a tubular element, and fold said extended portion at the other side of said slit onto said tubular element over the adjacent edge of said tubular element opposite the joint thereof, one of said severing mechanisms being disposed to pass across said cutter platen to sever said cover strip.

135. In an apparatus of the character described, in combination, mechanism adapted to feed a body strip and a cover strip, slitting mechanism disposed to slit the cover strip within the width of the body strip, means adapted to cause said mechanisms to coöperate to superpose said strips so that a slitted edge of the cover strip extends beyond the edge of the body strip, a plate transversely disposed relative to the path of the body strip, a combined folding and pressing jaw projecting from said plate in a plane substantially parallel to the direction of feed of said body strip, said plate having an opening adapted to receive the extended portion of the cover strip at one side of said slit, means adapted to move said plate so as to move said combined folding and pressing jaw around the edge of said body strip to fold the cover strip thereon at one side of said slitted portion, a presser jaw disposed to coöperate with said combined folding and pressing jaw to press said interfolded parts, severing mechanism, supplementary folding devices, and means adapted to cause said severing mechanisms and supplementary folding devices to operate to sever said strips to produce superposed blanks, fold said blanks at an angle to the plane of folding of said first-mentioned fold thereby forming a tubular element, and fold said extended portion at the other side of said slit onto said tubular element over the adjacent edge of said tubular element opposite the joint thereof.

136. In an apparatus of the character described, in combination, mechanism adapted to feed a body strip and a cover strip, slitting mechanism, severing mechanism, blank transfer mechanism, folding mechanism, comprising a plurality of formers intermittently movable in an endless path, and means adapted to cause said mechanisms to coöperate to successively superpose said strips so that an edge of the cover strip extends beyond the edge of the body strip, provide a slit in the extended portion of said cover strip, fold the extended portion at one side of said slit around the adjacent portion of the body strip, sever said strips to produce superposed blanks, transfer said blanks to said formers, fold said blanks on said respective formers at an angle to the plane of folding of said first-mentioned fold thereby forming a tubular element, and fold said extended portion at the other side of said slit onto said tubular element over the adjacent edge of said tubular element opposite the joint thereof.

137. In an apparatus of the character described, in combination, mechanism adapted to feed a body strip and a cover strip, slitting mechanism, severing mechanism, blank transfer mechanism, folding mechanism comprising a plurality of formers intermittently movable in an endless path, blank gripping jaws one for and movable with each former adapted to retain blanks thereon, and means adapted to cause said mechanisms to coöperate to successively superpose said strips so that an edge of the cover strip extends beyond the edge of the body strip, provide a slit in the extended portion of said cover strip, fold the extended portion at one side of said slit around the adjacent portion of the body strip, sever said strips to produce superposed blanks, transfer said blanks to said formers, fold said blanks on said respective formers at an angle to the plane of folding of said first-mentioned fold thereby forming a tubular element, and fold said extended portion at the other side of said slit onto said tubular element over the adjacent edge of said tubular element opposite the joint thereof.

138. In an apparatus of the character described, in combination, mechanism adapted to feed a body strip and a cover strip slitting mechanism, severing mechanism, blank transfer mechanism, folding mechanism comprising a plurality of formers intermittently movable in an endless path, blank gripping jaws one for and movable with each former adapted to retain blanks thereon, stationary folding horns on opposite sides of the path of said formers, and means adapted to cause said mechanisms to coöperate to successively superpose said strips so that an edge of the cover strip extends beyond the edge of the body strip, provide a slit in the extended portion of said cover strip, fold the extended portion at one side of said slit around the adjacent portion of the body strip, sever said strips to produce superposed blanks, transfer said blanks to said formers, fold said blanks on said respective formers at an angle to the plane of folding of said first-mentioned fold thereby forming a tubular element, and fold said extended portion at the other side of said slit onto said tubular element over the adjacent edge of said tubular element opposite the joint thereof.

139. In an apparatus of the character described, in combination, mechanism adapted to feed a body strip and a cover strip, slitting mechanism, severing mechanism, blank transfer mechanism, folding mechanism comprising a plurality of formers intermittently movable in an endless path, stationary folding horns on opposite sides of the path of said formers intermediate positions of rest of said formers, a pair of side pressing jaws on opposite sides respectively of the path of said formers adjacent a position of rest of said formers, and means adapted to cause said mechanisms to coöperate to successively superpose said strips so that an edge of the cover strip extends beyond the edge of the body strip, provide a slit in the extended portion of said cover strip, fold the extended portion at one side of said slit around the adjacent portion of the body strip, sever said strips to produce superposed blanks, fold said blanks on said respective formers at an angle to the plane of folding of said first-mentioned fold thereby forming a tubular element, and fold said extended portion at the other side of said slit onto said tubular element over the adjacent edge of said tubular element opposite the joint thereof.

140. In an apparatus of the character described, in combination, mechanism adapted to feed a body strip and a cover strip, slitting mechanism, severing mechanism, blank transfer mechanism, folding mechanism comprising a plurality of formers intermittently movable in an endless path, stationary folding horns on opposite sides of the path of said formers intermediate positions of rest of said formers, a pair of side pressing jaws and a pair of rear folding and pressing jaws on opposite sides respectively of the path of said formers adjacent a position of rest of said formers, and means adapted to cause said mechanisms to coöperate to successively superpose said strips so that an edge of the cover strips extends beyond the edge of the body strip, provide a slit in the extended portion of said cover strip, fold the extended portion at one side of said slit around the adjacent portion of the body strip, sever said strips to produce superposed blanks, fold said blanks at an angle to the plane of folding of said first-mentioned fold thereby forming a tubular element, and fold said extended portion at the other side of said slit onto said tubular element over the adjacent edge of said tubular element opposite the joint thereof.

141. In an apparatus of the character described, in combination, mechanism adapted to feed a body strip and a cover strip, slitting mechanism, severing mechanism, folding mechanism comprising a tongue folding finger, and means adapted to cause said mechanism to coöperate to superpose said strips so that an edge of the cover strip extends beyond the edge of the body strip, provide a slit in the extended portion of said cover strip, fold the extended portion at one side of said slit around the adjacent portion of the body strip thereby leaving a tongue of the cover strip, sever said strips to produce superposed blanks, fold said blanks at an angle to the plane of folding of said first-mentioned fold thereby forming a tubular element, and cause said finger to fold said tongue onto said tubular element over the adjacent edge of said tubular element opposite the joint thereof.

142. In an apparatus of the character described, in combination, mechanism adapted to feed a body strip and a cover strip, slitting mechanism, severing mechanism, folding mechanism comprising a tongue folding finger, and means adapted to cause said mechanism to coöperate to superpose said strips so that an edge of the cover strip extends beyond the edge of the body strip, provide a slit in the extended portion of said cover strip, fold the extended portion at one side of said slit around the adjacent portion of the body strip thereby leaving a tongue of the cover strip, sever said strips to produce superposed blanks, fold said blanks at an angle to the plane of folding of said first-mentioned fold thereby forming a tubular element, and cause said finger to fold said tongue onto said tubular element over the adjacent edge of said tubular element opposite the joint thereof and said finger and presser jaw to press said last-mentioned folded parts.

143. In an apparatus of the character described, in combination, mechanism adapted to feed a body strip and a cover strip, slitting mechanism, severing mechanism, blank transfer mechanism, folding mechanism comprising a plurality of formers intermittently movable in an endless path, a tongue folding finger carried with each former, and means adapted to cause said mechanisms to coöperate to successively superpose said strips so that an edge of the cover strip extends beyond the edge of the body strip, provide a slit in the extended portion of said cover strip, fold the extended portion at one side of said slit around the adjacent portion of the body strip thereby leaving a tongue of the cover strip, sever said strips to produce superposed blanks, transfer said blanks to said formers, fold said blanks on said respective formers at an angle to the plane of folding of said first-mentioned fold thereby forming a tubular element, and cause said fingers to fold said tongue onto said tubular element over the adjacent edge of said tubular element opposite the joint thereof.

144. In an apparatus of the character described, in combination, mechanism adapted to feed a body strip and a cover strip, slitting mechanism, severing mechanism, blank transfer mechanism, folding mechanism comprising a plurality of formers intermittently movable in an endless path, a tongue folding finger carried with each former, a blank gripping jaw carried with each former adapted to retain blanks thereon, and means adapted to cause said mechanisms to coöperate to successively superpose said strips so that an edge of the cover strip extends beyond the edge of the body strip, provide a slit in the extended portion of said cover strip, fold the extended portion at one side of said slit around the adjacent portion of the body strip, thereby leaving a tongue of the cover strip, sever said strips to produce superposed blanks, transfer said blanks to said formers, fold said blanks at an angle to the plane of folding of said first-mentioned fold thereby forming a tubular element, and cause said finger to fold said tongue onto said tubular element over the adjacent edge of said tubular element opposite the joint thereof.

145. In an apparatus of the character described, in combination, mechanism adapted to feed a body strip and a cover strip, slitting mechanism, severing mechanism, blank transfer mechanism, folding mechanism comprising a plurality of formers intermittently movable in an endless path, a tongue folding finger carried with each former, a blank gripping jaw carried with each former adapted to retain blanks thereon, a presser jaw adapted to coöperate with said finger, and means adapted to cause said mechanisms to coöperate to successively superpose said strips so that an edge of the cover strip extends beyond the edge of the body strip, provide a slit in the extended portion of said cover strip, fold the extended portion at one side of said slit around the adjacent portion of the body strip thereby leaving a tongue of the cover strip, sever said strips to produce superposed blanks, transfer said blanks to said formers, fold said blanks at an angle to the plane of folding of said first-mentioned fold thereby forming a tubular element, and cause said finger to fold said tongue onto said tubular element over the adjacent edge of said tubular element opposite the joint thereof, and said finger and presser jaw to press said last-mentioned folded parts.

146. In an apparatus of the character described, in combination, mechanism adapted to feed a body strip and a cover strip, slitting mechanism, severing mechanism, folding mechanism comprising a plurality of formers intermittently movable in an endless path, a tongue folding finger carried with each former and movable relative thereto, an oscillatory cam adapted to move said fingers, and means adapted to cause said mechanisms to coöperate to successively superpose said strips so that an edge of the cover strip extends beyond the edge of the body strip, provide a slit in the extended portion of said cover strip, fold the extended portion at one side of said slit around the adjacent portion of the body strip, sever said strips to produce superposed blanks, fold said blanks on said formers at an angle to the plane of folding of said first-mentioned fold thereby forming a tubular element, and fold said extended portion at the other side of said slit onto said tubular element over the adjacent edge of said tubular element opposite the joint thereof.

147. In an apparatus of the character described, in combination, a plurality of collar supports movable in an endless path, mechanism adapted to cause collars to be mounted on said respective supports, a box body supporting carriage, mechanism adapted to feed box bodies to said carriage, and mechanism adapted to cause relative movement of said carriage and each of said collar supports in succession toward each other to assemble the collars and box bodies carried thereby.

148. In an apparatus of the character described, in combination, a plurality of collar supports intermittently movable in an endless arcuate path, mechanism adapted to cause collars to be mounted on said respective supports, a box body supporting carriage mounted to move in an arcuate path, mechanism adapted to feed box bodies to said carriage, and mechanism adapted to cause relative movement of said carriage and each of said collar supports in succession toward each other to assemble the collars and box bodies carried thereby.

149. In an apparatus of the character described, in combination, a collar support, mechanism adapted to cause a collar to be mounted on said support, a box body supporting carriage comprising oppositely disposed box body supporting jaws, mechanism adapted to feed box bodies to said carriage between said jaws, and mechanism adapted to cause relative movement between said carriage and collar support to assemble the collar and box body respectively supported thereby.

150. In an apparatus of the character described, in combination, a collar support, mechanism adapted to cause a collar to be mounted on said support, a box body supporting carriage comprising oppositely disposed box body supporting jaws movable toward and from each other, mechanism adapted to feed box bodies to said carriage, mechanism adapted to cause relative movement between said carriage and collar support to telescopically assemble the collar and box body respectively supported thereby, and means adapted to move said jaws toward each other after said assembly.

151. In an apparatus of the character described, in combination, a collar support, mechanism adapted to cause a collar to be mounted on said support, a box body supporting carriage comprising a jaw piece, oppositely disposed members pivoted to said piece and having box-supporting flanges, mechanism adapted to feed box bodies to said carriage onto said flanges, mechanism adapted to cause relative movement between said carriage and collar support to assemble the collar and box body respectively supported thereby, and means adapted to move said jaws to press said members therebetween and said collar support after their assembly.

152. In an apparatus of the character described, in combination, a collar support, mechanism adapted to cause a collar to be mounted on said support, a box body supporting carriage, mechanism adapted to feed box bodies to said carriage comprising an open guideway for box bodies and a reciprocatory pusher adapted to enter and leave the boxes in said guideway, and mechanism adapted to cause relative movement between said carriage and collar support to assemble the collar and box body respectively supported thereby.

153. In an apparatus of the character described, in combination, a collar support, mechanism adapted to cause a collar to be mounted on said support, a box body supporting carriage, mechanism adapted to feed box bodies to said carriage comprising an open guideway for box bodies, a reciprocatory slide, a rod pivoted thereto, a pusher finger on said rod in alinement with said guideway and means adapted to move said rod to cause said finger to engage a box in said guideway as the slide moves in one direction and to cause said finger to disengage said box as said slide moves in the other direction, and mechanism adapted to cause relative movement between said carriage and collar support to assemble the collar and box body respectively supported thereby.

154. In an apparatus of the character described, in combination, a collar support, mechanism adapted to cause a collar to be mounted on said support, a box body supporting carriage, mechanism adapted to feed box bodies to said carriage comprising an open guideway for box bodies, a reciprocatory slide, a rod pivoted thereto, a pusher finger on said rod in alinement with said guideway and means comprising a guide carried by said rod, a track with which said guide contacts and a spring-pressed switch, adapted to move said rod to cause said finger to engage a box in said guideway as the slide moves in one direction and to cause said finger to disengage said box as said slide moves in the other direction, and mechanism adapted to cause relative movement between said carriage and collar support to assemble the collar and box body respectively supported thereby.

155. In an apparatus of the character described, in combination, a collar support, mechanism adapted to cause a collar to be mounted on said support, a guideway for box bodies, a box body supporting carriage adapted to assume position in alinement with said guideway, mechanism adapted to feed box bodies into and out of said carriage comprising a reciprocatory member and a pair of pusher fingers fastened thereto, and mechanism adapted to cause said carriage to move toward said collar support to assemble a collar and box body and back to alinement with said guideway between successive reciprocations of said member.

156. In an apparatus of the character described, in combination, a collar support, mechanism adapted to cause a collar to be mounted on said support, a box body supporting carriage, mechanism adapted to feed box bodies to said carriage, a guideway for box bodies, a pusher finger adapted to reciprocate in alinement with said guideway and toward and from the same, means adapted to reciprocate said finger comprising devices to yieldingly press said finger toward the guideway, and mechanism adapted to cause relative movement between said carriage and collar support to assemble the collar and box body respectively supported thereby.

157. In an apparatus of the character described, in combination, a former, mechanism adapted to cause a blank to be folded into a collar on said former, a box body supporting carriage, mechanism adapted to feed box bodies to said carriage, and mechanism adapted to cause said carriage to move in an arcuate path toward said former to assemble the collar and box body respectively supported thereby.

158. In an apparatus of the character described, in combination, a collar support, mechanism adapted to cause a collar to be mounted on said support, a carriage support movable toward and from said collar support, a box body supporting carriage rotatably mounted on said carriage support, means adapted to reciprocate said carriage support and to oscillate said carriage, and means adapted to feed box bodies to said carriage.

159. In an apparatus of the character described, in combination, a collar support, mechanism adapted to cause a collar to be mounted on said support, a box body supporting carriage, mechanism adapted to feed box bodies to said carriage, and mechanism adapted to cause relative rotary and translatory reciprocatory movement between said carriage and collar support to assemble the collar and box body respectively supported thereby.

160. In an apparatus of the character described, in combination, a collar support, mechanism adapted to cause a collar to be mounted on said support, a box body supporting carriage, mechanism adapted to feed box bodies to said carriage, mechanism adapted to cause relative arcuate movement between said carriage and collar support and thereby cause the partial assembly of the collar and box body with the plane of the edge of the collar overlapping the plane of the proximate edge of the box body, and means adapted to cause a relative rectilinear movement of the collar and box body after said overlapping to complete the assembly of the collar and box body.

161. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, and mechanism adapted to remove the assembled collar and box body from its support.

162. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, and mechanism adapted to remove the assembled collar and box body from its support comprising means adapted to engage the collar.

163. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, and mechanism adapted to remove the assembled collar and box body from its support comprising hook arms mounted on said carriage and adapted to take over the edge of the collar.

164. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, and mechanism adapted to remove the assembled collar and box body from its support, comprising a pair of oppositely disposed pivoted hook arms adapted to take over the edge of the collar and a spring connecting said arms.

165. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, and mechanism adapted to remove the assembled collar and box body from its support comprising stripper arms having box-supporting walls and hooks adapted to engage the edge of said collar.

166. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, and mechanism adapted to automatically coöperate with the aforesaid elements to attach a cord to said assembled elements.

167. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, and mechanism adapted to attach a cord to said assembled elements comprising a cord-holding device mounted on said carriage.

168. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, and mechanism adapted to attach a cord to said assembled elements comprising a cord-holding device mounted on said carriage, said cord-holding device comprising a cord-tensioning finger.

169. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, and mechanism adapted to attach a cord to said assembled elements comprising a reciprocatory finger adapted to turn a portion of the cord across the open edge of the box body.

170. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, mechanism adapted to automatically coöperate with the aforesaid elements to attach a cord to said assembled elements, and mechanism adapted to sever said cord at a point to leave a length of cord attached to said assembled elements.

171. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, mechanism adapted to attach a cord to said assembled elements comprising a cord-holding device mounted on said carriage, and mechanism adapted to sever said cord comprising a cutting edge mounted on said cord-holder.

172. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, mechanism adapted to attach a cord to said assembled elements comprising a cord-holding device mounted on said carriage, and mechanism adapted to sever said cord comprising a shear blade fixed to said cord-holder.

173. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, mechanism adapted to attach a cord to said assembled elements comprising a cord-holding device mounted on said carriage, and mechanism adapted to sever said cord comprising a shear blade fixed to said cord-holder, a coöperative shear blade pivoted on said cord-holder and means adapted to cause the latter blade to oscillate relatively to said fixed blade.

174. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, mechanism adapted to attach a cord to said assembled elements, comprising a cord-holding device mounted on said carriage and movable relative thereto, a shearing device carried by said cord-holding device, and connections between said shearing device and said carriage whereby said shearing device is operated to sever the cord upon relative movement of said carriage and cord-holding device in a predetermined direction.

175. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, mechanism adapted to attach a cord to said assembled elements comprising a cord-holding device mounted on said carriage and movable relative thereto, a shearing device carried by said cord-holding device, and connections between said shearing device and said carriage whereby said shearing device is operated to sever the cord upon relative movement of said carriage and cord-holding device in a predetermined direction, said connections involving a relatively movable pin and slot.

176. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, mechanism adapted to attach a cord to said assembled elements, mechanism adapted to sever said cord, and devices adapted to feed the cord relative to said severing mechanism before the operation of the latter.

177. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, mechanism adapted to attach a cord to said assembled elements, mechanism adapted to sever said cord, and devices adapted to move the assembled box elements and cord relative to said severing mechanism before the operation of the latter.

178. In an apparatus of the character described, in combination, a collar support, mechanism adapted to cause a collar to be mounted on said support, a box body supporting carriage, mechanism adapted to feed box bodies to said carriage, mechanism adapted to cause relative movement between said carriage and collar support to assemble the collar and box body respectively supported thereby, mechanism adapted to attach a cord to said assembled elements, mechanism adapted to sever said cord, and devices adapted to move the assembled box elements and cord relative to said severing mechanism before the operation of the latter, comprising a reciprocatory pusher adapted to move into and out of the box in said carriage.

179. In a box making machine, the combination of means to form a duplex strip of foundation and finishing material, means to fold an edge of the finishing material over the edge of the foundation strip, means to fold said duplex strip and join the ends together to form a neck, and means to insert the neck and secure the same in a box.

180. In a box making machine, the combination of means to feed a strip of adhesive-coated finishing material and a strip of foundation material into mutual contact, means to press the two strips to form a duplex strip, means to fold an edge of the finishing material over the edge of the foundation strip, means to fold the said duplex strip and join the ends to form a neck, and means to insert and secure the neck within a box.

181. In combination, a foundation strip supply, a finishing strip supply, means operating to feed the finishing strip and a length of foundation strip into mutual contact, means to press the two strips together to form a duplex strip, strip consuming mechanism intermittently operated in timed relation to the operation of the feeding means, and means to sever the finishing material connecting successive duplex strips.

182. In combination, a foundation strip supply, a finishing strip supply, means operating to feed the finishing strip and a length of foundation strip into mutual contact, means to press the two strips together to form a duplex strip, means to sever the material connecting successive duplex strips, means to fold the duplex strip and join the ends to form a neck, and means to insert the neck and secure the same within a box.

183. In combination, a foundation strip supply, a finishing strip supply, a receiving die, means operating intermittently to feed the finishing strip and a length of the foundation strip to the receiving die one beneath the other in the order named, means coacting with the die to press the two strips together to form a duplex strip, means to sever the finishing material connecting successive duplex strips, means to mold the duplex strip and join the ends to form a neck, and means to insert and secure the neck within a box.

184. In an apparatus of the character described, in combination, means adapted to effect the insertion of one box element in another, and means automatically coöperative with said means to attach a cord to the assembled elements.

185. In an apparatus of the character described, in combination, a box body supply device, mechanism adapted automatically to coöperate with said device to effect the assembly of collars with box bodies from said supply device, comprising means adapted to dispose the plane of a wall of a collar transversely of the plane of that part of the flange of the box body to be adjacent thereto in the assembled relation of said box elements, prior to assembly thereof, and means adapted to automatically coöperate with the aforesaid mechanism to attach a cord to the assembled elements.

186. In an apparatus of the character described, in combination, a box body supply device, mechanism adapted automatically to coöperate with said device to effect the assembly of collars with box bodies from said supply device, comprising means adapted to dispose the plane of a wall of a collar transversely of the plane of that part of the flange of the box body to be adjacent thereto in the assembled relation of said box elements, prior to assembly thereof, and means adapted to automatically coöperate with the aforesaid mechanism to direct a cord between the meeting edges of the collars and box bodies during their assembly.

187. In an apparatus of the character described, in combination, means adapted to successively form box collars, said means comprising an angular former and devices adapted to fold a blank around said former, means adapted to successively support box bodies, and means adapted to cause approaching movement between the successive collars and box bodies, respectively, to assemble the same.

188. In an apparatus of the character described, in combination, means adapted to successively form box collars, said means comprising an angular former and devices adapted to fold a blank around said former, means adapted to successively support box bodies, means adapted to cause approaching movement between said former and said support to thereby assemble a collar with a box body and relative receding movement between said former and the assembled collar and box body to disengage said former from said assembled elements, and means adapted to engage the edge of said collar to retain the collar and box body in assembled relation during said recession.

189. In an apparatus of the character described, in combination, means adapted to successively form box collars, said means comprising blank feeding devices and blank folding devices, said blank folding devices including an angular former around which a blank is folded, the blank feeding devices being adapted to feed blanks to said former, means adapted to support successive box bodies, means adapted to cause relative approaching movement between the collar on said former and the box body in position to be assembled therewith to thereby effect the insertion of said collar in said box body, and relative receding movement between said former and said assembled collar and box body to effect the disengagement of said former, means adapted to dispose adhesive on one of said elements to be assembled and at a point to cause said collar and box body to be adhesively joined when assembled, and means adapted to positively restrain movement of the assembled elements toward the former on said recessional movement.

190. In an apparatus of the character described, in combination, means comprising a former and coöperative folding devices adapted to fold successive collar blanks into collars, means whereby box elements including flanges are automatically supplied to the apparatus and successively supported in position opposite the openings in successive collars, means adapted at intervals to cause relative approaching movement between said former and said support to cause a collar and a flange to telescopically assemble, and relative receding movement between said former and said assembled elements to disengage said former from said assembled elements, a guideway into which the assembled elements are successively discharged, and means adapted to restrain the assembled elements in said guideway from movement toward the flange elements approaching assembly position.

191. In an apparatus of the character described, in combination, a shaft mounted to turn on its axis and to reciprocate transversely of its axis, relatively movable but supporting members carried by said shaft, means adapted to oscillate said shaft to move the box supporting members bodily, and means adapted to move the box supporting members toward and from each other comprising toggle links connected to said members.

192. In an apparatus of the character described, in combination, a shaft mounted to turn on its axis and to reciprocate transversely of its axis, relatively movable box supporting members carried by said shaft, means adapted to oscillate said shaft to move the box supporting members bodily, and means adapted to move the box supporting members toward and from each other comprising toggle links connected to said members, a pin connected to said links and a plunger adapted to move said pin.

193. In an apparatus of the character described, in combination, a shaft mounted to turn on its axis and to reciprocate transversely of its axis, relatively movable box supporting members carried by said shaft, means adapted to oscillate said shaft to move the box supporting members bodily, and means adapted to move the box supporting members toward and from each other comprising toggle links connected to said members, a pin connected to said links, a plunger adapted to move said pin in one direction, a spring adapted to move said pin in the opposite direction and a trip device adapted to effect movement of said plunger against the resistance of said pin.

194. In an apparatus of the character described, in combination, a shaft mounted to turn on its axis and to reciprocate transversely of its axis, relatively movable box supporting members carried by said shaft, means adapted to oscillate said shaft to move the box supporting members bodily, means adapted to move the box supporting members toward and from each other comprising toggle links connected to said members; a pin connected to said links, a plunger adapted to move said pin in one direction, a spring adapted to move said pin in the opposite direction, and means comprising a trip lever and a coöperative rocking trip finger adapted to effect positive movement of said plunger in a direction to move said pin.

195. In an apparatus of the character described, in combination, a plurality of forms adapted to support box collars, means adapted to translate said forms, and means adapted to press together in succession adhesively joined collars and flanges telescopically assembled on said forms.

196. In an apparatus of the character described, in combination, a plurality of forms adapted to support box collars, means adapted to translate said forms, means adapted to press together in succession adhesively joined collars and flanges telescopically assembled on said forms, and means adapted to strip the assembled collars and flanges from said forms.

197. In an apparatus of the character described, in combination, an angular former, means for forming an angular box collar thereon, means for applying a box body to the collar while on said former, and means for stripping the assembled box body and collar from the former.

198. In an apparatus of the character described, in combination, a device adapted to hold a collar, a device adapted to hold a flange, means adapted to move one of said devices toward the other and thereby cause the plane of the edge of the collar to be disposed at an angle to the plane of the proximate edge of the flange, and means adapted thereafter to cause approaching movement between said devices to cause said collar and flange to overlap, with the sides of the collar and flange parallel to each other.

199. In an apparatus of the character described, in combination, a plurality of web feeding mechanisms, a plurality of mechanisms adapted to sever blanks from said webs, web folding mechanism, slitting mechanism, and means whereby the aforesaid mechanisms automatically coöperate to form a composite blank composed of a slitted section of one web, the portion at one side of the line of said slit superposed on the opposite faces of a section of another web and across one edge thereof.

200. In an apparatus of the character described, in combination, a plurality of web feeding mechanisms, a plurality of mechanisms adapted to sever blanks from said webs, web folding mechanism, slitting mechanism, and means whereby the aforesaid mechanisms automatically coöperate to form a composite blank composed of a slitted section of one web, the portion at one side of the line of said slit superposed on the opposite faces of a section of another web and across one edge thereof, the portion of said slitted section at the other side of the line of said slit forming a projecting tongue.

201. In an apparatus of the character described, in combination, a plurality of web feeding mechanisms, a plurality of mechanisms adapted to sever blanks from said webs, web folding mechanism, slitting mechanism, means whereby the aforesaid mechanisms automatically coöperate to form a composite blank composed of a slitted section of one web, the portion at one side of the line of said slit superposed on the opposite faces of a section of another web and across one edge thereof, the portion of said slitted section at the other side of the line of said slit forming a projecting tongue, mechanism adapted to fold said composite blank on lines transverse to said edge into a tubular element, and mechanism adapted to fold said tongue over the edge of the tubular element.

202. In an apparatus of the character described, in combination, a plurality of web feeding mechanisms, a plurality of mechanisms adapted to sever blanks from said webs, web folding mechanism, slitting mechanism, means whereby the aforesaid mechanisms automatically coöperate to form a composite blank composed of a slitted section of one web, the portion at one side of the line of said slit superposed on the opposite faces of a section of another web and across one edge thereof, the portion of said slitted section at the other side of the line of said slit forming a projecting tongue, mechanism adapted to fold said composite blank on lines transverse to said edge into a tubular element and superpose the ends of the intermediate blank, and mechanism adapted to fold said tongue over the edge of the tubular element opposite the superposed ends of said intermediate blank.

203. In an apparatus of the character described, in combination, a plurality of web feeding mechanisms, a plurality of mechanisms adapted to sever blanks from said webs, web folding mechanism, web slitting mechanism, and means whereby the aforesaid mechanisms automatically coöperate to form a composite blank composed of a slitted section of one web, the portion at one side of the line of said slit superposed on the opposite faces of a section of another web and across one edge thereof.

204. In an apparatus of the character described, in combination, a plurality of web feeding mechanisms, a plurality of mechanisms adapted to sever blanks from said webs, web folding mechanism, slitting mechanism comprising a rotatable cutter and means adapted to move said cutter alternately into and out of cutting coöperation with one of said webs, and means whereby the aforesaid mechanisms automatically coöperate to form a composite blank composed of a slitted section of one web, the portion at one side of the line of said slit superposed on the opposite faces of a section of another web and across one edge thereof, a portion of said slitted section at the other side of said line forming a projecting tongue.

205. In an apparatus of the character described, in combination, a plurality of web feeding mechanisms, a plurality of mechanisms adapted to sever blanks from said webs, web folding mechanism, slitting mechanism comprising a rotatable cutter and means adapted to move said cutter alternately into and out of cutting coöperation with one of said webs, means whereby the aforesaid mechanisms automatically coöperate to form a composite blank composed of a slitted section of one web, the portion at one side of the line of said slit superposed on the opposite faces of a section of another web and across one edge thereof, a portion of said slitted section at the other side of said line forming a projecting tongue, mechanism comprising an angular former adapted to fold said composite blank on lines transverse to said edge into a tubular element, and means adapted to fold said tongue over the edge of said tubular element.

206. In an apparatus of the character described, in combination, a plurality of web feeding mechanisms, a plurality of mechanisms adapted to sever blanks from said webs, web folding mechanism, slitting mechanism comprising a rotatable cutter and means adapted to move said cutter alternately into and out of cutting coöperation with one of said webs, means whereby the aforesaid mechanisms automatically coöperate to form a composite blank composed of a slitted section of one web, the portion at one side of the line of said slit superposed on the opposite faces of a section of another web and across one edge thereof, a portion of said slitted section at the other side of said line forming a projecting tongue, mechanism comprising an angular former adapted to fold said composite blank on lines transverse to said edge into a tubular element, and means adapted to fold said tongue over the edge of said tubular element and press said tongue against the opposite face of the intermediate folded blank.

207. In an apparatus of the character described, in combination, a plurality of web feeding mechanisms, a plurality of mechanisms adapted to sever blanks from said webs, web folding mechanism, web slitting mechanism, means whereby the aforesaid mechanisms automatically coöperate to form a composite blank composed of a slitted section of one web, the portion at one side of the line of said slit superposed on the opposite faces of a section of another web and across one edge thereof, a portion of said slitted section at the other side of the line of said slit forming a projecting tongue, and mechanism comprising a plurality of movable formers adapted to fold successive composite blanks on lines transverse to said edge into tubular elements, respectively.

208. In an apparatus of the character described, in combination, a plurality of web feeding mechanisms, a plurality of mechanisms adapted to sever blanks from said webs, web folding mechanism, web slitting mechanism, means whereby the aforesaid mechanisms automatically coöperate to form a composite blank composed of a slitted section of one web, the portion at one side of the line of said slit superposed on the opposite faces of a section of another web and across one edge thereof, a portion of said slitted section at the other side of the line of said slit forming a projecting tongue, mechanism comprising a movable angular former adapted to fold said composite blank on lines transverse to said edge into a tubular element, and a finger carried by said former adapted to fold said tongue over the edge of said tubular element.

209. In an apparatus of the character described, in combination, a plurality of web feeding mechanisms, a plurality of mechanisms adapted to sever blanks from said webs, web folding mechanism, web slitting mechanism, means whereby the aforesaid mechanisms automatically coöperate to form a composite blank composed of a slitted section of one web, the portion at one side of the line of said slit superposed on the opposite faces of a section of another web and across one edge thereof, a portion of said slitted section at the other side of the line of said slit forming a projecting tongue, mechanism comprising a movable angular former adapted to fold said composite blank on lines transverse to said edge into a tubular element, a folding finger and a pressing jaw carried by said former, means adapted to move said finger so as to fold said tongue around the edge of said tubular element, and means adapted to cause approaching movement between said finger and jaw to press the last-mentioned fold therebetween.

210. In an apparatus of the character described, in combination, means adapted to automatically coöperate to assemble a collar and a box body comprising a support for one of said elements, a device between which and said support there are relative approaching and receding movements, said device being adapted to coöperate with the other element to effect the assembly of said elements by said approaching movement, means adapted to cause said approaching and receding movements, and means comprising collar-engaging dogs between which and said support there are relative approaching and receding movements adapted to engage the collar at opposite sides to effect discharge of the assembled elements from said support.

211. In an apparatus of the character described, in combination, means adapted to automatically coöperate to assemble a collar and a box body comprising a support for one of said elements, a device between which and said support there are relative approaching and receding movements, said device being adapted to coöperate with the other element to effect the assembly of said elements by said approaching movement, means adapted to cause said approaching and receding movements, and means comprising a pair of spring-pressed pivotally mounted dogs between which and said support there are relative approaching and receding movements, adapted to engage the collar of the assembled elements to effect discharge of the assembled elements from said support.

212. In an apparatus of the character described, in combination, means adapted to automatically coöperate to assemble a collar and a box body comprising a former on which the collar is supported, a device between which and said former there are relative approaching and receding movements, said device being adapted to coöperate with the other element to effect the assembly of said elements by said approaching movement, means adapted to cause said approaching and receding movements, and means comprising yielding dogs between which and said former there are relative approaching and receding movements adapted to engage the assembled elements at opposite sides to effect discharge of the assembled elements from said support, said former having a flange adapted to restrain movement of the collar in one direction, said flange having openings for the passage of said dogs.

213. In an apparatus of the character described, in combination, means adapted to automatically coöperate to assemble a collar and a box body comprising a support for one of said elements, a device between which and said support there are relative approaching and receding movements, said device being adapted to coöperate with the other element and said support to effect the assembly of said elements by said approaching movement, means adapted to cause said approaching and receding movements, means whereby said receding movement effects the discharge of said assembled elements from their support, a channel into which said assembled elements are delivered, and a yielding dog intersecting said channel adapted to prevent retrograde movement in said channel to said assembly means.

214. In an apparatus of the character described, in combination, means adapted to automatically coöperate to assemble a collar and a box body comprising a rectangular support for one of said elements, a pair of abutments between which and said support there are relative approaching and receding movements, said abutments being adapted to coöperate with the other element and said support to effect the assembly of said elements by said approaching movement, means adapted to cause said approaching and receding movements, means comprising collar-engaging dogs, between which and said support there are relative approaching and receding movements, adapted to engage the assembled elements to effect discharge thereof from said support, and means comprising a channel adapted to conduct one of said elements to coöperative position relative to said abutments.

215. In an apparatus of the character described, in combination, a rectangular former, means adapted to apply a combined body and cover blank to said former, said blank comprising spaced grooves in the body portion spanned by the cover portion, said grooves being produced by the removal of the material of the body portion of the blank, means coöperating with said former to fold said blank at the groove portions and around said former and cause portions of said cover to enter said grooves, and means, between which and said former there is relative approaching movement, adapted to effect the insertion of said collar and said former in a box body.

216. In an apparatus of the character described, in combination, a former, mechanism adapted to form a composite blank of body material and cover material with one edge of the body material exposed by the cover material, means adapted to coöperate with said former to effect the insertion of a collar thereon into a box body, and means adapted to fold said composite blank on said former into a collar with said exposed edge, when on the former, facing toward said coöperative inserting means.

217. In an apparatus of the character described, in combination, a rectangular former, means adapted to apply a combined body and cover blank to said former, said blank comprising spaced grooves in the body portion spanned by the cover portion, one edge of said body portion being surrounded by the cover portion, means coöperating with said former to fold said blank at the groove portions and around said former and cause portions of said cover to enter said grooves, thereby disposing the surrounded edge at one side of said former, and means between which and said former there are relative approaching and receding movements, adapted to effect the assembly of a box body with said folded element, and, initially, with the edge of said folded element opposite said surrounded edge.

218. In an apparatus of the character described, in combination, a rectangular former, means adapted to form a composite blank composed of a body blank and a cover blank with a portion of the cover blank disposed on opposite sides of the body blank and across one edge thereof, the opposite edge of the body blank being uncovered by said cover blank, said forming means comprising devices adapted to cause said body and cover blank to be adhesively secured and pressed together, means adapted to fold said composite blank around said former, and means, between which and said former, there are relative approaching and receding movements, adapted to effect the insertion of said folded composite blank into a box body and, initially, with the uncovered edge of said folded composite blank.

219. In an apparatus of the character described, in combination, a rectangular former, means adapted to form a composite blank composed of a grooved body blank and a cover blank with a portion of the cover blank disposed on opposite sides of the body blank and across one edge thereof, the opposite edge of the body blank being uncovered by said cover blank, said forming means comprising devices adapted to cause said body and cover blank to be adhesively secured and pressed together, means, comprising folding arms adapted to fold said composite blank around said former and simultaneously to press the folded composite blank closely against the former adjacent the corners of the former, and means, between which and said former there are relative approaching and receding movements, adapted to effect the insertion of said folded composite blank into a box body.

220. In an apparatus of the character described, in combination, a rectangular former, means adapted to form a composite blank composed of a grooved body blank and a cover blank with a portion of the cover blank disposed on opposite sides of the body blank and across one edge thereof, the opposite edge of the body blank being uncovered by said cover blank, said forming means comprising devices adapted to cause said body and cover blank to be adhesively secured and pressed together, means comprising folding arms adapted to fold said composite blank around said former and simultaneously to press the folded composite blank closely against the former adjacent the corners of the former, and means, between which and said former there are relative approaching and receding movements, adapted to effect the insertion of said folded composite blank into a box body and, initially, the uncovered edge of said folded composite blank.

221. In an apparatus of the character described, in combination, an angular former, means adapted to fold a composite blank, composed of body and cover material, on said former into a tubular element and hold the same in folded condition thereon, and means adapted thereafter to fold a tab of the cover material across the joint of and press the same against the tubular element into conformity therewith.

222. An apparatus of the character described comprising, in combination, mechanism adapted to assemble a collar and a box body and to increase the difference in size between the collar and box body at the meeting edges prior to entry of the full periphery of one into the other, to facilitate such entry, said mechanism comprising a device adapted to support the collar and a device, between which and said support there are relative approaching and receding movements, adapted to coöperate with the box body to effect said assembly.

223. An apparatus of the character described comprising, in combination, mechanism adapted to assemble a collar and a box body and to increase the difference in size between the collar and box body at the meeting edges prior to entry of the full periphery of one into the other, to facilitate such entry, said mechanism comprising a device adapted to support the collar and a device, between which and said support there are relative approaching and receding movements, adapted to coöperate with the box body to effect said assembly, one of said devices having means, adapted to coöperate with the box element directly coöperative with the other device, to increase the difference in size between the collar and box body at the meeting edges prior to full peripheral assembly.

224. An apparatus of the character described comprising, in combination, mechanism adapted to assemble a collar and a box body and to increase the difference in size between the collar and box body at the meeting edges prior to entry of the full periphery of one into the other, to facilitate such entry, said mechanism comprising a device adapted to support the collar and a device, between which and said support there are relative approaching and receding movements, adapted to coöperate with the box body to effect said assembly, said collar supporting device comprising a member adapted to coöperate with the device coöperative directly with said box body to deflect the plane of a side of the box body into a position transversely of the plane of the proximate side of the collar.

225. An apparatus of the character described comprising, in combination, a box body supply device, and mechanism adapted automatically to coöperate with said device to effect assembly of collars and box bodies comprising means adapted to increase the difference in size between the collar and box body at the meeting edges prior to entry of the full periphery of one into the other, to facilitate such entry.

226. An apparatus of the character described comprising, in combination, a box body supply device, mechanism adapted automatically to coöperate with said device to effect assembly of collars and box bodies comprising means adapted to increase the difference in size between the collar and box body at the meeting edges prior to entry of the full periphery of one into the other, to facilitate such entry, and means adapted to press said box elements together after their assembly to restore the normal size thereof.

227. An apparatus of the character described comprising, in combination, a box body supply device, mechanism adapted automatically to coöperate with said device to effect assembly of collars and box bodies comprising means adapted to increase the difference in size between the collar and box body at the meeting edges prior to entry of the full periphery of one into the other, to facilitate such entry, means adapted to press said box elements together after their assembly to restore the normal size thereof, and a device adapted to apply adhesive to one of said box elements prior to their assembly.

228. An apparatus of the character described comprising, in combination, a box body supply device, and mechanism adapted automatically to coöperate with said device to effect assembly of collars and box bodies comprising a rectangular collar support movable with said collar into a box body so as to bring the collar into contact with a side of the box body, and movable thereafter transversely of the plane of said side of the box body thereby coöperating to deflect said side outwardly.

229. In an apparatus of the character described, in combination, means adapted to feed composite blanks having an uncovered edge, means adapted to supply box bodies, and mechanism adapted to automatically coöperate with the aforesaid means to form said banks into collars and assemble said collars with box bodies from said supply comprising means adapted to increase the difference in size between the collar and box body to be assembled and thereby ease the box body into assembly relation with said collar and initially with the uncovered edge of said collar.

230. In an apparatus of the character described, in combination, means adapted to feed composite blanks having an uncovered edge, means adapted to supply box bodies, and mechanism adapted to automatically coöperate with the aforesaid means to form said blanks into collars and assemble said collars with box bodies from said supply comprising means adapted to increase the difference in size between the collar and box body to be assembled and thereby ease the box body into assembly relation with said collar and initially with the uncovered edge of said collar, said last-mentioned means comprising a rectangular former having a shoulder adapted to restrain movement of said collar on said former on the initial assembly of the box body therewith.

231. In an apparatus of the character described, in combination, a box body supply device, and mechanism adapted automatically to coöperate with said device to effect the assembly of collars with box bodies from said supply device comprising means adapted to dispose the plane of a wall of a collar transversely of the plane of that part of the flange of the box body to be adjacent thereto in the assembled relation of said box elements, prior to assembly thereof.

232. In an apparatus of the character described, in combination, a box body supply device, and mechanism adapted automatically to coöperate with said device to effect the assembly of collars with box bodies from said supply device comprising means adapted to dispose the plane of a wall of a collar transversely of the plane of that part of the flange of the box body to be adjacent thereto in the initial partially assembled relation of said box elements.

233. In an apparatus of the character described, in combination, a rectangular support for a collar, a support for a rectangular box body, and means adapted to cause said supports to automatically coöperate to assemble said collar with said box body and bend a side of said box body outwardly to thereby ease the collar into the box body.

234. In an apparatus of the character described, in combination, a rectangular support for a collar, a support for a rectangular box body, and means adapted to cause relative movement between said supports to dispose a side of said collar within the edge of the box body with the axes of the two box elements inclined to each other to thereby partially assemble said elements.

235. In an apparatus of the character described, in combination, a rectangular support for a collar, a support for a rectangular box body, means adapted to cause relative movement between said supports to dispose a side of said collar within the edge of the box body with the axes of the two box elements inclined to each other to thereby partially assemble said elements, and means adapted to cause further relative movement between said supports to complete the assembly.

236. In an apparatus of the character described, in combination, means adapted to feed composite blanks composed of cover material and body material, the body material being grooved and the grooves spanned by the cover material, means adapted to supply box bodies, and means adapted to fold said blanks into rectangular tubular elements and assemble them in the box bodies, respectively, comprising means adapted to increase the difference in size between the rectangular tubular elements and the box bodies at their meeting edges prior to entry of the full periphery of one into the other, to facilitate their entry, said folding means comprising a rectangular former adapted to produce sharp external corners on the tubular elements opposite the grooves in the body material.

237. In an apparatus of the character described, in combination, means adapted to feed composite blanks composed of cover material and body material, the body material being grooved and the grooves spanned by the cover material, and having one edge uncovered by the cover material, means adapted to supply box bodies, and means adapted to fold said blanks into rectangular tubular elements and assemble them in the box bodies, respectively, comprising means adapted to increase the difference in size between the rectangular tubular elements and the box bodies at their meeting edges prior to entry of the full periphery of one into the other, to facilitate their entry, said folding means comprising a rectangular former adapted to produce sharp external corners on the tubular elements opposite the grooves in the body material, and said assembly means being arranged to effect the assembly of the box body initially with the uncovered edge of said tubular element.

238. In an apparatus of the character described, in combination, means adapted to cause a rectangular collar and a rectangular box body to approach each other to be assembled, and means coöperative with said approach means to displace the edge of a side of one of said box elements from alinement with the plane of a side of the other until initial assembly has been effected.

239. In an apparatus of the character described, in combination, means adapted to cause a rectangular collar and a rectangular box body to approach each other to be assembled, and means coöperative with said approach means to bend the flange of the box body relative to the head thereof prior to full assembly and to maintain such bend until the full periphery of one is inserted in the other.

240. In an apparatus of the character described, in combination, a box body supply device, and mechanism adapted to automatically coöperate with said device to effect the assembly of collars and box bodies comprising means adapted to cause a body and collar to approach and partially assemble with each other while the axes of said box elements are inclined to each other.

241. In an apparatus of the character described, in combination, a box body supply device, and mechanism adapted to automatically coöperate with said device to effect the assembly of collars and box bodies comprising means adapted to cause a body and collar to approach and partially assemble with each other while the axes of said box elements are inclined to each other and means adapted thereafter to further assemble said box elements by an axial movement of one relative to the other.

242. In an apparatus of the character described, in combination, a box body supply device, and mechanism adapted to automatically coöperate with said device to effect the assembly of collars and box bodies comprising means adapted to cause a body and collar to approach and partially assemble with each other at one side while the axes of said box elements are inclined to each other, and a device adapted to positively guide the edge of one of said elements over the edge of the other at the opposite side.

243. In an apparatus of the character described, in combination, a box body supply device, and mechanism adapted to automatically coöperate with said device to effect the assembly of collars and box bodies comprising means adapted to cause a body and collar to approach and partially assemble with each other at one side while the axes of said box elements are inclined to each other, a device adapted to positively guide the edge of one of said elements over the edge of the other at the opposite side, and means adapted thereafter to further assemble said box elements by an axial movement of one relative to the other.

244. In an apparatus of the character described, in combination, a box body supply device, and mechanism adapted to automatically coöperate with said device to effect the assembly of collars and box bodies comprising rotary means adapted to cause a body and collar to approach and partially assemble with each other while the axes of said box elements are inclined to each other.

245. In an apparatus of the character described, in combination, a rectangular former, means adapted to form a composite blank of body and cover material, with a tab of the cover material extending from the edge of said blank, means adapted to coöperate with said former to fold said composite blank into a collar, a finger adapted to fold said tab across the joint of said collar while the blank is held in folded condition on said former, a box body supply device, and means adapted to coöperate with a box body of said supply to effect the insertion of said collar in said box body.

246. In an apparatus of the character described, in combination, a rectangular former, means adapted to form a composite blank of body and cover material, with a tab of the cover material extending from the edge of said blank, means adapted to coöperate with said former to fold said composite blank into a collar, a finger adapted to fold said tab across the joint of said collar while the blank is held in folded condition on said former, a box body supply device, and means adapted to coöperate with a box body of said supply to effect the insertion of said collar in said box body and increase the difference in size between said box elements at the meeting edges prior to the entry of the full periphery of one into the other.

247. In an apparatus of the character described, in combination, a rectangular former, means adapted to form a composite blank of body and cover material, with a tab of the cover material extending from the edge of said blank, means adapted to coöperate with said former to fold said composite blank into a collar, a finger adapted to fold said tab across the joint of said collar while the blank is held in folded condition on said former, a box body supply device, and means adapted to coöperate with a box body of said supply to effect the insertion of said collar and said former in said box body and increase the difference in size between said box elements at the meeting edges prior to the entry of the full periphery of one into the other.

248. In an apparatus of the character described, in combination, a rectangular former, means adapted to form a composite blank, means adapted to coöperate with said former to fold said composite blank into a collar comprising a device to clamp an intermediate section of said blank to one side of said former and members movable relative to said former adapted to fold the other sections on said former, said members being arranged to firmly press the folded sections against the former adjacent the corners thereof, a box body supply device, and means adapted to coöperate with a box body of said supply to effect the insertion of said collar in said box body while said collar is on said former.

249. In an apparatus of the character described, in combination, a rectangular former, means adapted to form a composite blank composed of body material and cover material, with one edge of the body material covered by the cover material and the opposite edge exposed, means adapted to coöperate with said former to fold said composite blank into a collar comprising a device to clamp an intermediate section of said blank to one side of said former and members movable relative to said former adapted to fold the other sections on said former, said members being arranged to firmly press the folded sections against the former adjacent the corners thereof, a box body supply device, and means adapted to coöperate with a box body of said supply to effect the insertion of said collar in said box body and, initially, of said exposed edge of said collar.

250. In an apparatus of the character described, in combination, a rectangular former, means adapted to form a composite blank, means adapted to coöperate with said former to fold said composite blank into a collar, a box body supply device, means adapted to coöperate with a box body of said supply to effect the insertion of said collar in said box body and increase the difference in size between said box elements at the meeting edges prior to the entry of the full periphery of one into the other, and means, between which and said former there are relative approaching and receding movements, adapted to engage opposite outer edges of said collar and discharge the assembled elements from said former in a direction tending to restrain movement of said collar out of said box body.

251. In an apparatus of the character described, in combination, a rectangular former, means adapted to form a composite blank composed of body material and cover material with one edge of the body material covered by the cover material and the opposite edge exposed, means adapted to coöperate with said former to fold said composite blank into a collar comprising a device to clamp an intermediate section of said blank to one side of said former, members movable relative to said former adapted to fold the other sections on said former, said members being arranged to firmly press the folded sections against the former adjacent the corners thereof, a box body supply device, and means adapted to coöperate with a box body of said supply to effect the insertion of said collar in said box body and, initially, of said exposed edge of said collar, and increase the difference in size between said box elements at the meeting edges prior to the entry of the full periphery of one into the other.

252. In an apparatus of the character described, in combination, a rectangular former, means adapted to form a composite blank composed of body material and cover material with one edge of the body material covered by the cover material and the opposite edge exposed and with a tab of the cover material extending from one edge, means adapted to coöperate with said former to fold said composite blank into a collar comprising a device to clamp an intermediate section of said blank to one side of said former, members movable relative to said former adapted to fold the other sections on said former, said members being arranged to firmly press the folded sections against the former adjacent the corners thereof, a finger adapted to fold said tab across the joint of said collar while the blank is held in folded condition on said former, a box body supply device, means adapted to cooperate with a box body of said supply to effect the insertion of said collar in said box body and, initially, of said exposed edge of said collar by a dispositioning of the plane of a side wall of one box element transversely of the plane of the proximate wall of the other box element prior to the entry of the full periphery of one into the other, and means, between which and said former there are relative approaching and receding movements, adapted to engage opposite outer edges of said collar and discharge the assembled elements from said former in a direction tending to restrain movement of said collar out of said box body.

253. In an apparatus of the character described, in combination, a rectangular former, means adapted to fold a composite blank around said former into a rectangular collar comprising a member adapted to clamp an intermediate section of the blank to one side of said former, said composite blank being composed of body and cover material, the body material being grooved on lines corresponding with and on the inside of the corners of the collar, and the cover material extending around one edge of the body material and exposing the opposite edge, and having a tab, a folding finger, means adapted to cause said folding finger to fold the tab of the cover material across the joint of the collar, said blank folding means comprising devices to hold the blank in folded condition on the former during the folding of said tab, and devices to firmly press the sides of the collar against the former adjacent the corners of the former, a box body supply device, means adapted to coöperate with a box body of said supply to effect the insertion of said collar in the box body and, initially, the insertion of the exposed edge thereof, and means adapted to press the sides of the assembled collar and box body together after complete insertion of the collar in the box body.

254. In an apparatus of the character described, in combination, a rectangular former, means adapted to fold a composite blank around said former into a rectangular collar comprising a member adapted to clamp an intermediate section of the blank to one side of said former, said composite blank being composed of body and cover material, the body material being grooved in lines corresponding with and on the inside of the corners of the collar, and the cover material extending around one edge of the body material and exposing the opposite edge, and having a tab, a folding finger, means adapted to cause said folding finger to fold the tab of the cover material across the joint of the collar, said blank folding means comprising devices to hold the blank in folded condition on the former during the folding of said tab, and devices to firmly press the sides of the collar against the former adjacent the corners of the former, a box body supply device, means adapted to coöperate with a box body of said supply to effect the insertion of said collar in the box body and, initially, the insertion of the exposed edge thereof, by disposing the plane of a side of the box body transversely of the plane of the proximate side of the collar prior to and during the initial insertion of the full periphery of the collar into the box body, and means adapted to press the sides of the assembled collar and box body together after complete insertion of the collar in the box body.

255. In an apparatus of the character described, in combination, a rectangular former, means adapted to fold a composite blank around said former into a rectangular collar comprising a member adapted to clamp an intermediate section of the blank to one side of said former, said composite blank being composed of body and cover material, the body material being grooved on lines corresponding with and on the inside of the corners of the collar, and the cover material extending around one edge of the body material and exposing the opposite edge, and having a tab, a folding finger, means adapted to cause said folding finger to fold the tab of the cover material across the joint of the collar, said blank folding means comprising devices to hold the blank in folded condition on the former during the folding of said tab, and devices to firmly press the sides of the collar against the former adjacent the corners of the former, a box body supply device, means adapted to coöperate with a box body of said supply to effect the insertion of said collar in the box body and, initially, the insertion of the exposed edge thereof, by disposing the plane of a side of the box body transversely of the plane of the proximate side of the collar prior to and during the initial insertion of the full periphery of the collar into the box body, and coöperative means adapted to engage the opposite sides of the edge of the collar to effect discharge of the assembled elements from said former.

256. In an apparatus of the character described, in combination, a rectangular former, means adapted to fold a composite blank around said former into a rectangular collar comprising a member adapted to clamp an intermediate section of the blank to one side of said former, said composite blank being composed of body and cover material, the body material being grooved on lines corresponding with and on the inside of the corners of the collar, and the cover material extending around one edge of the body material and exposing the opposite edge, and having a tab, a folding finger, means adapted to cause said folding finger to fold the tab of the cover material across the joint of the collar, said blank folding means comprising devices to hold the blank in folded condition on the former during the folding of said tab, and devices to firmly press the sides of the collar against the former adjacent the corners of the former, a box body supply device, means adapted to coöperate with a box body of said supply to effect the insertion of said collar in the box body and, initially, the insertion of the exposed edge thereof, and increase the difference in size between said box elements at the meeting edges prior to the entry of the full periphery of one into the other, and means adapted to press the sides of the assembled collar and box body together after complete insertion of the collar in the box body.

257. In a box making machine, the combination of means to form a duplex strip of foundation and finishing material, means to fold an edge of the finishing material over the edge of the foundation strip, means to fold said duplex strip and join the ends together to form a neck, and means to insert the neck and secure the same in a box, said last-mentioned means comprising mechanism adapted to dispose the plane of a wall of the collar transversely of the plane of that part of the flange of the box body to be adjacent to said wall in the assembled relation prior to assembly thereof.

258. In a box making machine, the combination of means to form a duplex strip of foundation and finishing material, means to fold an edge of the finishing material over the edge of the foundation strip, means to fold said duplex strip and join the ends together to form a neck, and means to insert the neck and secure the same in a box, said last-mentioned means comprising mechanism adapted to bend a side wall of said box body outwardly to thereby ease the collar into the box body.

259. In an apparatus of the character described, in combination, mechanism adapted to form a box collar comprising a body strip and a cover strip, means adapted to support another box element comprising a flange adapted to receive said collar, and means adapted to assemble said elements initially by a movement of the box body such that a side wall thereof initially engages the side wall of the collar.

260. In an apparatus of the character described, in combination, a collar support, a box body support, means adapted to cause relative approaching movement therebetween to effect the insertion of the collar in the box body, and a member adapted to guide the edge of a side of one of said box elements out of alinement with the edge of the proximate side of the other box element on the insertion of the one element in the other.

261. In an apparatus of the character described, in combination, a collar support, a box body support, means adapted to cause relative approaching movement therebetween to effect the insertion of the collar in the box body, and a member adapted to be disposed opposite the edge of a side of one of said box elements to guide the edge of said side past the edge of the proximate side of the other box element on the insertion of the one element in the other.

262. In an apparatus of the character described, in combination, a rectangular collar support adapted to move in a rotary path, a box body support adapted to rotatively oscillate in the same general plane as said collar support moves and toward and from said collar support, means comprising a cam adapted to effect the rotary approach of said box body support toward said collar support and cause a side of said collar to be inserted in said box body, and means adapted thereafter to completely insert the collar in said body in predetermined position.

263. In an apparatus of the character described, in combination, a movable support, means movable relative to said support adapted to position a cord, said means comprising a cord tensioning device and a cord turning device, and means whereby the movement of said support causes the gripping and releasing of the cord by said tensioning device.

264. In an apparatus of the character described, in combination, a movable support, means movable relative to said support adapted to position a cord, said means comprising a cord tensioning device and a cord turning device, means whereby the movement of said support causes the gripping and releasing of the cord by said tensioning device, a cord cutter movable relative to said support, and means whereby relative movement between said cutter and said support operates said cutter.

265. In an apparatus of the character described, in combination, an oscillatory box element support, means carried by and movable relative to said support adapted to position a cord comprising a pivoted cord gripping finger, and a pivoted cord turning finger, means whereby the movement of said support in one direction causes said gripping finger to grip the cord and movement in the opposite direction causes it to relieve said grip, and means whereby the movement of said positioning means in the direction which causes said cord gripping operation causes said turning finger to turn the cord.

266. In an apparatus of the character described, in combination, an oscillatory box element support, means carried by and movable relative to said support adapted to position a cord comprising a pivoted cord gripping finger and a pivoted cord turning finger, means whereby the movement of said support in one direction causes said gripping finger to grip the cord and movement in the opposite direction causes it to relieve said grip, and means whereby the movement of said positioning means in the direction which causes said cord gripping operation causes said turning finger to turn the cord, said second-mentioned means comprising a pawl in the path of said gripping means.

267. In an apparatus of the character described, in combination, an oscillatory box element support, means carried by and movable relative to said support adapted to position a cord comprising a pivoted cord gripping finger and a pivoted cord turning finger, means whereby the movement of said support in one direction causes said gripping finger to grip the cord and movement in the opposite direction causes it to relieve said grip, and means whereby the movement of said positioning means in the direction which causes said cord gripping operation causes said turning finger to turn the cord, said last-mentioned means comprising a lever adapted to move the cord turning finger in one direction and a spring to move it in the opposite direction.

268. In an apparatus of the character described, in combination, an oscillatory box element support, means carried by and movable relative to said support adapted to position a cord comprising a pivoted cord gripping finger and a pivoted cord turning finger, means whereby the movement of said support in one direction causes said gripping finger to grip the cord and movement in the opposite direction causes it to relieve said grip, and means whereby the movement of said positioning means in the direction which causes said cord gripping operation causes said turning finger to turn the cord, said second-mentioned means comprising a pawl in the path of said gripping means, and said last-mentioned means comprising a lever adapted to move the cord turning finger in one direction and a spring to move it in the opposite direction.

269. In an apparatus of the character described, in combination, a rotary oscillatory box element support, means carried by and movable relative to said support adapted to position a cord comprising a pivoted cord gripping finger and a pivoted cord turning finger, said gripping finger having an operating extension, means comprising a pawl disposed in the path of said extension and a spring adapted to operate said gripping finger as said support is oscillated, a lever, a spring adapted to move said cord turning finger in a direction to turn the cord, and a flexible connection between said cord turning finger and said lever adapted to move said latter finger in the opposite direction.

270. In an apparatus of the character described, in combination, a rotary oscillatory box element support, means carried by and movable relative to said support adapted to position a cord comprising a pivoted cord gripping finger and a pivoted cord turning finger, said gripping finger having an operating extension, means comprising a pawl disposed in the path of said extension and a spring adapted to operate said gripping finger as said support is oscillated, a lever, a spring adapted to move said cord turning finger in a direction to turn the cord, a flexible connection between said cord turning finger and said lever adapted to move said latter finger in the opposite direction, and means to which said positioning means is pivotally joined movably connected to said lever to effect movement of the latter relative to said support.

271. In an apparatus of the character described, in combination, a rotary oscillatory box element support, means carried by and movable relative to said support adapted to position a cord comprising a pivoted cord gripping finger, an ear pivoted to said positioning means and a cord turning finger pivoted to said ear, said gripping finger having an operating extension, means comprising a pawl disposed in the path of said extension and a spring adapted to operate said gripping finger as said support is oscillated, a lever, a spring adapted to move said cord turning finger in a direction to turn the cord, and a flexible connection between said cord turning finger and said lever adapted to move said latter finger in the opposite direction.

272. In an apparatus of the character described, in combination, a rotary oscillatory box element support, means carried by and movable relative to said support adapted to position a cord comprising a pivoted cord gripping finger and a pivoted cord turning finger, said gripping finger having an operating extension, means comprising a pawl disposed in the path of said extension and a spring adapted to operate said gripping finger as said support is oscillated, a lever, a spring adapted to move said cord turning finger in a direction to turn the cord, a flexible connection between said cord turning finger and said lever adapted to move said latter finger in the opposite direction, a pair of relatively movable cutter blades carried by said positioning means, a link connected to one of said blades, and a pin on said support adapted to coöperate with said link to effect relative movement between said blades upon relative movement between said positioning means and said support.

In testimony whereof I affix my signature in presence of two witnesses.

CARLOS HOLLY.

Witnesses:
DANA E. SHERMAN,
GEORGE W. RILEY.

Correction in Letters Patent No. 1,253,690.

It is hereby certified that in Letters Patent No. 1,253,690, granted January 15, 1918, upon the application of Carlos Holly, of Lockport, New York, for an improvement in "Box-Machines," an error appears in the printed specification requiring correction as follows: Page 50, strike out lines 67-76, inclusive, comprising claim 181; and that the said Letters Patent should be read with this correction therein that the same may conform to the record of the case in the Patent Office.

Signed and sealed this 16th day of April, A. D., 1918.

[SEAL.]

F. W. H. CLAY,

*Acting Commissioner of Patents.*

Cl. 93—39.